(12) United States Patent
Kisanuki et al.

(10) Patent No.: US 8,089,020 B2
(45) Date of Patent: Jan. 3, 2012

(54) GAS-INSULATED SWITCHING APPARATUS

(75) Inventors: Osamu Kisanuki, Chiyoda-ku (JP);
Hitoshi Sadakuni, Chiyoda-ku (JP);
Masato Kawahigashi, Chiyoda-ku (JP)

(73) Assignee: Mitsubishi Electric Corporation,
Chiyoda-Ku, Tokyo (JP)

( * ) Notice: Subject to any disclaimer, the term of this patent is extended or adjusted under 35 U.S.C. 154(b) by 430 days.

(21) Appl. No.: 12/441,191

(22) PCT Filed: Sep. 19, 2007

(86) PCT No.: PCT/JP2007/068178
§ 371 (c)(1),
(2), (4) Date: Mar. 13, 2009

(87) PCT Pub. No.: WO2008/068944
PCT Pub. Date: Jun. 12, 2008

(65) Prior Publication Data
US 2009/0261069 A1    Oct. 22, 2009

(30) Foreign Application Priority Data

Dec. 5, 2006 (JP) .................................. 2006/324214

(51) Int. Cl.
*H01H 33/14* (2006.01)
(52) U.S. Cl. ................ 218/7; 218/13; 218/51; 218/154; 361/612
(58) Field of Classification Search ................ 218/7, 13, 218/51, 154; 361/612
See application file for complete search history.

(56) References Cited

U.S. PATENT DOCUMENTS

| | | | | |
|---|---|---|---|---|
| 7,414,827 B2 * | 8/2008 | Kashiwa et al. | .............. | 361/612 |
| 7,675,738 B2 * | 3/2010 | Fukunaga et al. | ............ | 361/612 |
| 7,764,486 B2 * | 7/2010 | Otsuka et al. | ................. | 361/612 |

FOREIGN PATENT DOCUMENTS

JP     58-222706 A     12/1983
(Continued)

OTHER PUBLICATIONS

International Search Report (PCT/ISA/210) dated Dec. 17, 2007.

*Primary Examiner* — Truc Nguyen
(74) *Attorney, Agent, or Firm* — Buchanan Ingersoll & Rooney PC

(57) ABSTRACT

[Object] A compact gas-insulated switching apparatus in which the space for arranging a gas breaker module may be reduced, and the space for arranging a circuit wiring may be reduced in the vertical direction is proposed.

[Means for Resolution] Gas circuit breakers for respective phases of a breaker module have the reference axial lengths having the same length between the first and second vertical planes and arranged so as to extend in the first direction, first circuit wirings for the respective phases of a first circuit wiring module are configured with gas-insulated buses respectively and are extended in parallel to each other along the second direction which is orthogonal to the first direction, the first circuit wirings for the respective phases are positioned at the respective apexes of a right angled isosceles triangle, the first circuit wirings respectively for the phase A and the phase B are positioned at both ends of the short side of the right angled isosceles triangle and are arranged on a third vertical plane positioned between the first vertical plane and the second vertical plane so as to extend in parallel thereto.

19 Claims, 24 Drawing Sheets

FOREIGN PATENT DOCUMENTS

| | | |
|---|---|---|
| JP | 59-185107 A | 10/1984 |
| JP | 61-142910 A | 6/1986 |
| JP | 4-308405 A | 10/1992 |
| JP | 6-78422 A | 3/1994 |
| JP | 7-123544 A | 5/1995 |
| JP | 7-193925 A | 7/1995 |
| JP | 8-149626 A | 6/1996 |
| JP | 10-229614 A | 8/1998 |
| JP | 10-257620 A | 9/1998 |
| JP | 11-8916 A | 1/1999 |
| JP | 2000-50435 A | 2/2000 |

* cited by examiner

GAS-INSULATED SWITCHING APPARATUS

TECHNICAL FIELD

The present invention relates to a gas-insulated switching apparatus including a breaker module having gas circuit breakers respectively for phase A, phase B and phase C, a first circuit wiring module having first circuit wirings respectively for the phase A, the phase B and the phase C, and a second circuit wiring module having second circuit wirings respectively for the phase A, the phase B and the phase C, in which the gas circuit breaker for the phase A opens and closes the electric connection between the first circuit wiring for the phase A and the second circuit wiring for the phase A, the gas circuit breaker for the phase B opens and closes the electric connection between the first circuit wiring for the phase B and the second circuit wiring for the phase B, and the gas circuit breaker for the phase C opens and closes the electric connection between the first circuit wiring for the phase C and the second circuit wiring for the phase C, respectively.

BACKGROUND ART

In FIGS. 1 to 3 in JP11-8916A (Patent Document 1), there is disclosed a gas-insulated switching apparatus in which gas circuit breakers respectively for the phase A, the phase B and the phase C are arranged on a common horizontal arrangement plane in a state of being shifted by the module dimension M from each other in the direction of the axial length thereof, and the first circuit wirings respectively for the phase A, the phase B and the phase C are arranged in parallel to each other so as to be orthogonal to the gas circuit breakers of the respective phases. In FIG. 8 and FIG. 9 in Patent Document 1, there is disclosed a gas-insulated switching apparatus in which the respective gas circuit breakers respectively for the phase A, the phase B and the phase C are arranged in parallel to each other on the common horizontal arrangement plane without being shifted from each other, but the first circuit wirings respectively for the phase A, the phase B and the phase C are shifted in the vertical direction from each other by the axial distance s so as to be orthogonal to the gas circuit breakers for the respective phases.

Patent Document 1: JP11-8916A, in particular, FIGS. 1 to 3 and the description thereof, FIG. 8, FIG. 9 and the description thereof

DISCLOSURE OF INVENTION

Problems to be Solved by the Invention

However, in the gas-insulated switching apparatus disclosed in FIGS. 1 to 3 in Patent Document 1, since the gas circuit breakers for the respective phases are arranged in the state of being shifted from each other by the module dimension M in the direction of the axial length thereof, the space for arranging the gas circuit breakers for the respective phases is enlarged in the direction of the axial length of the gas circuit breakers. In the case of the gas-insulated switching apparatus disclosed in FIG. 8 and FIG. 9 in Patent Document 1, the first circuit wirings for the respective phases are arranged in the state of being shifted from each other in the vertical direction by the axial distance s, the space for arranging the first circuit wirings is enlarged in the vertical direction.

The present invention proposes an improved gas-insulated switching apparatus in which the enlargement of the arrangement space is reduced so as to be placed in a more compact space.

Means for Solving the Problem

A gas-insulated switching apparatus according to the present invention includes a breaker module having gas circuit breakers respectively for a phase A, a phase B and a phase C and being arranged with axial lines of the gas circuit breakers for the respective phases extended in parallel to each other in the first direction on a common horizontal arrangement plane, first vertical tubes respectively for the phase A, the phase B and the phase C connected vertically to one end portions of the respective gas circuit breakers for the respective phases, a first circuit wiring module arranged above the breaker module and including first circuit wirings respectively for the phase A, the phase B and the phase C connected to the gas circuit breakers for the respective phases through the first vertical tubes for the respective phases, second vertical tubes respectively for the phase A, the phase B and the phase C connected vertically to the other end portions of the respective gas circuit breakers for the respective phases, and a second circuit wiring module including second circuit wirings for the phase A, the phase B and the phase C connected respectively to the gas circuit breakers for the respective phases through the second vertical tubes for the respective phases, the gas circuit breaker for the phase A opening and closing the electric connection between the first circuit wiring for the phase A and the second circuit wiring for the phase A, the gas circuit breaker for the phase B opening and closing the electric connection between the first circuit wiring for the phase B and the second circuit wiring for the phase B and the gas circuit breaker for the phase C opening and closing the electric connection between the first circuit wiring for the phase C and the second circuit wiring for the phase C, wherein the first vertical tubes for the respective phases are arranged on a first vertical plane extending orthogonally to the common horizontal arrangement plane, the second vertical tubes for the respective phases are arranged on a second vertical plane extending in parallel to the first vertical plane, the gas circuit breakers for the respective phases of the breaker module have the reference axial lengths having the same length between the first and second vertical planes, the first circuit wirings for the respective phases of the first circuit wiring module are configured with gas-insulated buses extending in parallel to each other along the second direction which is orthogonal to the first direction, the first circuit wirings for the respective phases are positioned at the respective apexes of a right angled isosceles triangle, the first circuit wirings respectively for the phase A and the phase B are positioned at both ends of the short side of the right angled isosceles triangle and arranged on a third vertical plane extending between the first vertical plane and the second vertical plane in parallel thereto, and the first circuit wiring for the phase C is arranged on a fourth vertical plane extending between the first vertical plane and the third vertical plane in parallel thereto.

ADVANTAGES OF THE INVENTION

According to the gas-insulated switching apparatus in the present invention, the first vertical tubes for the respective phases are arranged on the first vertical plane extending orthogonally to the common horizontal arrangement plane, the second vertical tubes for the respective phases are arranged on the second vertical plane extending in parallel to the first vertical plane, the gas circuit breakers for the respective phases of the breaker module have the reference axial lengths having the same length between the first and second vertical planes, the first circuit wirings for the respective phases of the first circuit wiring module are configured with gas-insulated buses extending in parallel to each other along the second direction which is orthogonal to the first direction, the first circuit wirings for the respective phases are positioned at the respective apexes of a right angled isosceles triangle, wherein the first circuit wirings respectively for the phase A and the phase B are positioned at both ends of the short side of the right angled isosceles triangle and arranged on the third vertical plane extending between the first vertical plane and the second vertical plane in parallel thereto, and the first circuit wiring for the phase C is arranged on the fourth vertical plane extending between the first vertical plane and the third vertical plane in parallel thereto. Therefore, the space for arranging the gas circuit breaker modules for the respective phases may be reduced, and the space for arranging the first circuit wirings for the respective phases of the first circuit wiring modules may be reduced in the vertical direction, so that a compact gas-insulated switching apparatus is achieved.

Objects, characteristics, perspectives and advantages of the present invention will further be apparent from the detailed description in conjunction with drawings. ////

BEST MODE FOR CARRYING OUT THE INVENTION

Figure 1:
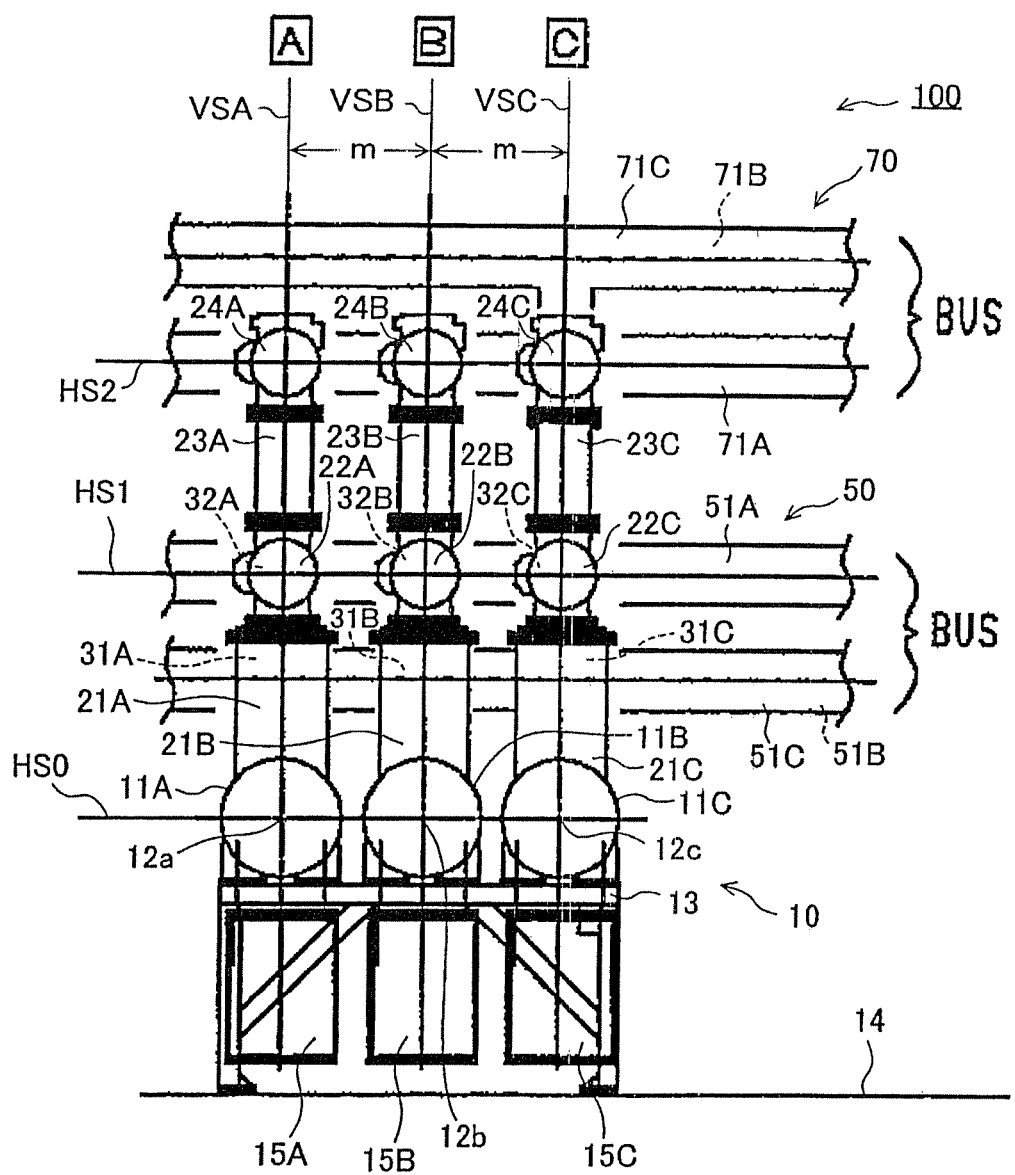
FIG. 1 is a left side view of a gas-insulated switching apparatus according to Embodiment 1 of the present invention.

Referring now to the drawings, several embodiments of the present invention will be described below.

Embodiment 1

Figure 2:
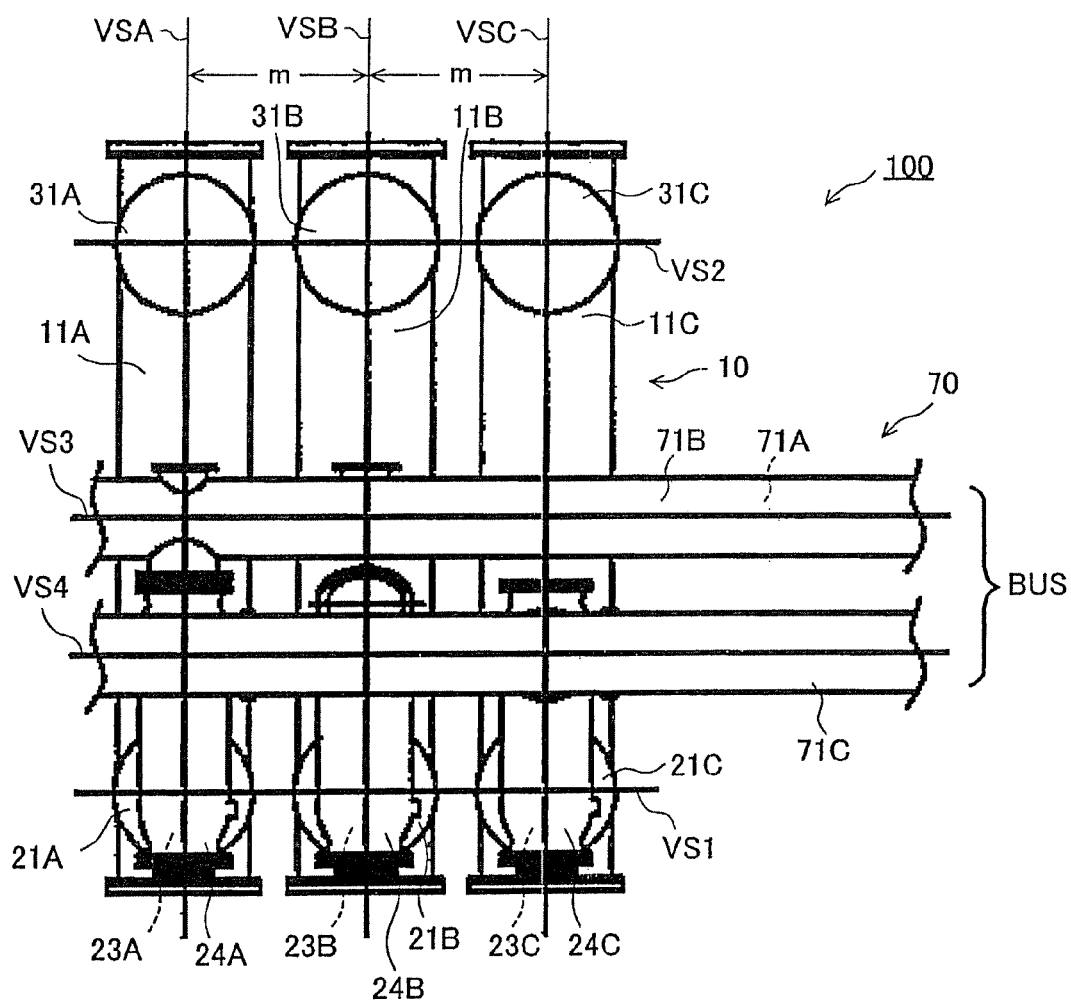
FIG. 2 is a plan view of Embodiment 1.
Figure 3A:
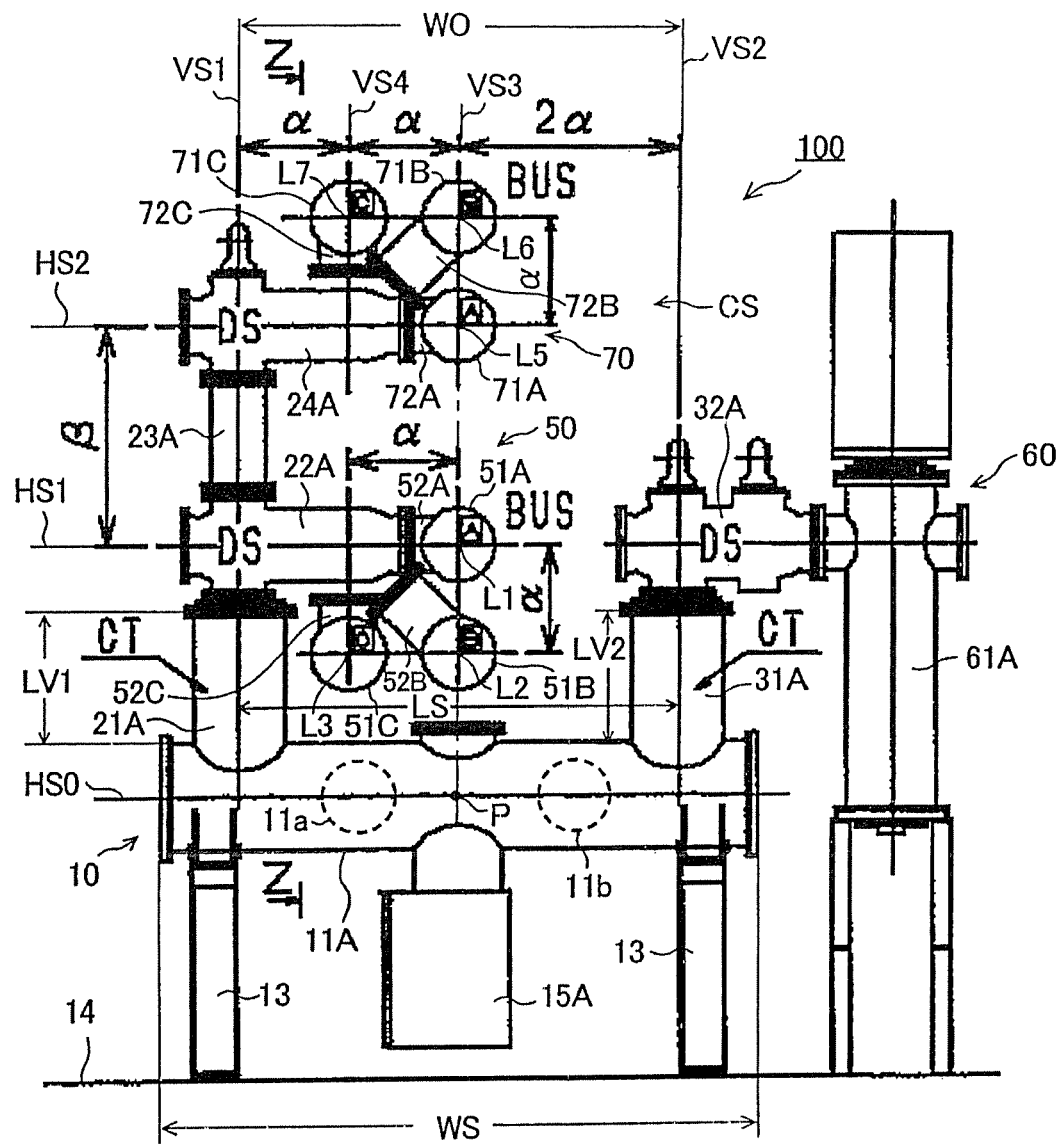
FIG. 3A is a front view corresponding to a vertical arrangement plane for a phase A according to Embodiment 1.
Figure 3B:
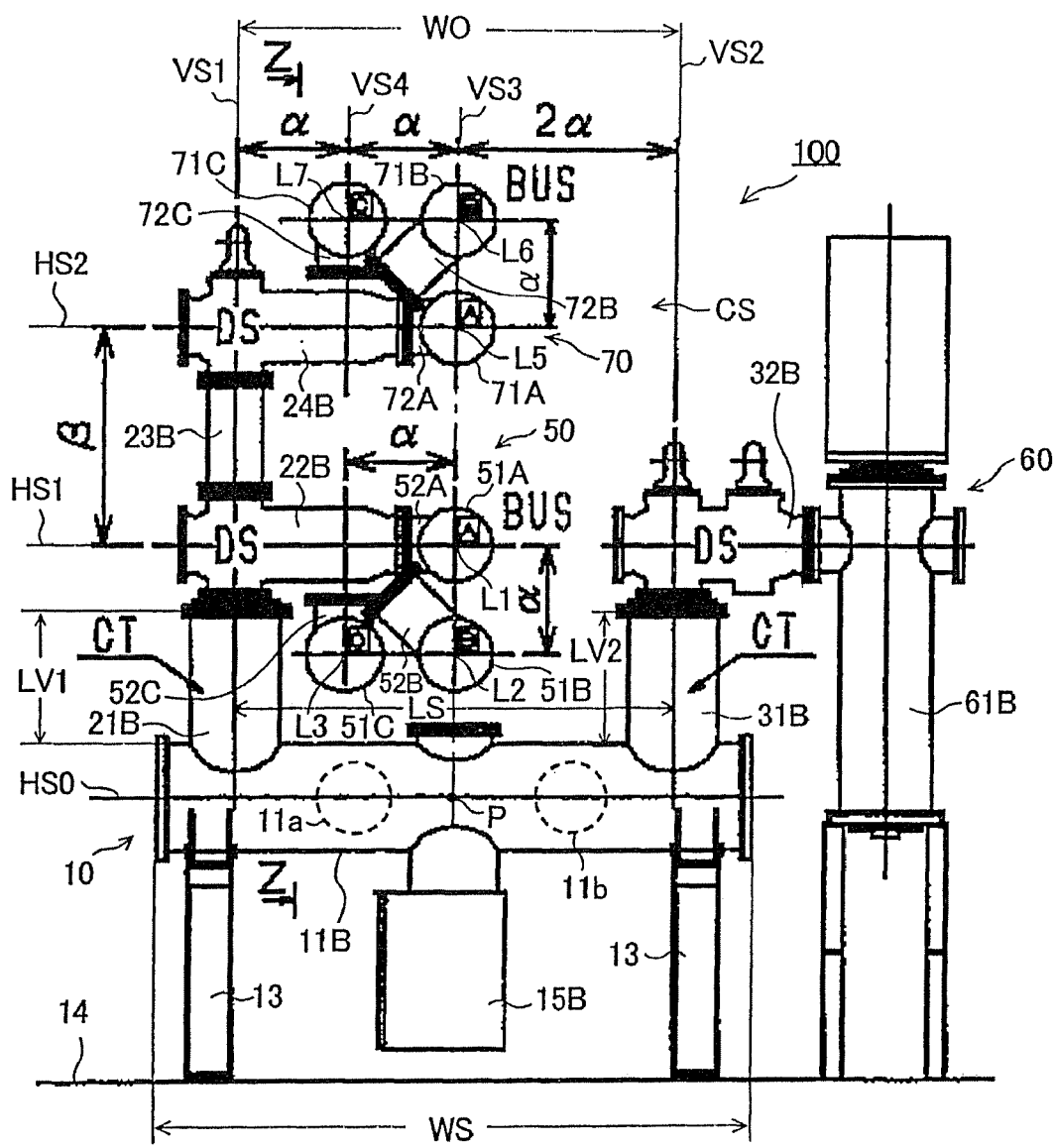
FIG. 3B is a front view corresponding to a vertical arrangement plane for the phase B according to Embodiment 1.
Figure 3C:
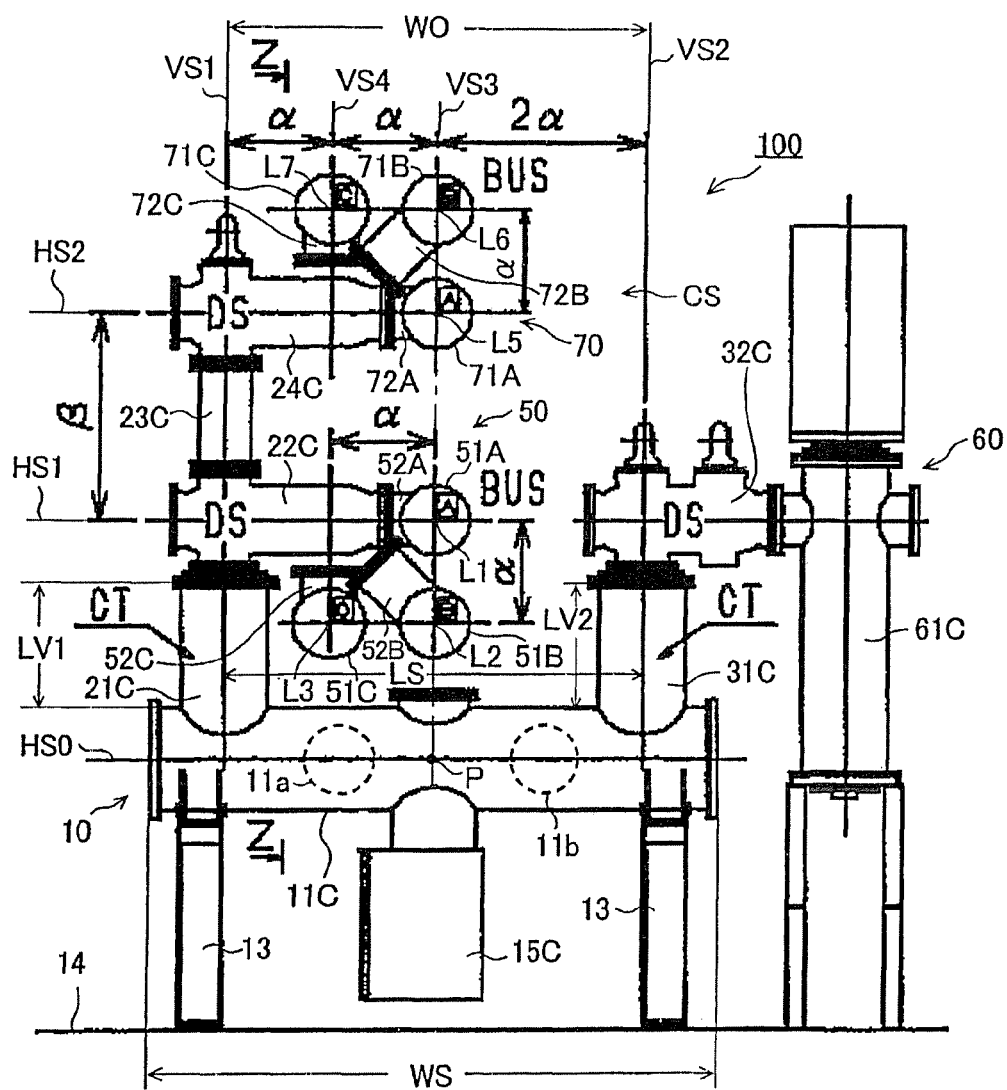
FIG. 3C is a front view corresponding to a vertical arrangement plane for the phase C according to Embodiment 1.
Figure 4:
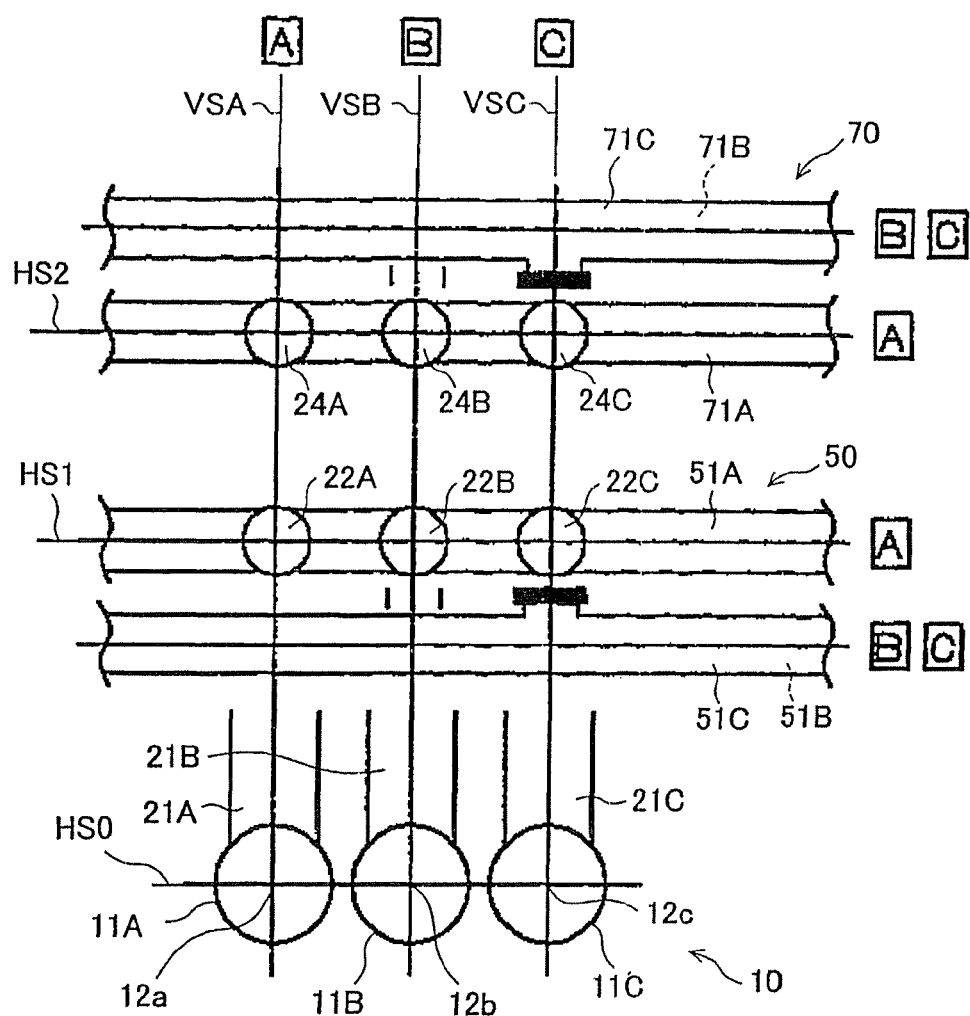
FIG. 4 is a cross-sectional view taken along the line Z-Z in FIG. 3A, FIG. 3B and FIG. 3C.

FIG. 1 is a left side view of a gas-insulated switching apparatus according to Embodiment 1 of the present invention; FIG. 2 is a plan view of the same; FIG. 3A is a front view corresponding to a vertical arrangement plane VSA for a phase A; FIG. 3B is a front view corresponding to a vertical arrangement plane VSB for a phase B; FIG. 3C is a front view corresponding to a vertical arrangement plane VSC for a phase C, FIG. 4 is a cross-sectional view taken along the line Z-Z in FIG. 3A, FIG. 3B and FIG. 3C.

A gas-insulated switching apparatus 100 according to Embodiment 1 shown in FIG. 1, FIG. 2, FIG. 3A, FIG. 3B, FIG. 3C and FIG. 4 is a gas-insulated switching apparatus which is referred to as a transmission line unit or a transformer unit. The gas-insulated switching apparatus 100 includes a breaker module 10, a first circuit wiring module 50, a second circuit wiring module 60 and a third circuit wiring module 70. The first and third circuit wiring modules 50 and 70 constitute a multi-bus structure, and the breaker module 10 opens and closes the electric connection between the first and third circuit wiring modules 50 and 70 and the second circuit wiring module 60. In FIG. 2, the second circuit wiring module 60 is omitted.

The breaker module 10 includes a gas circuit breaker 11A for the phase A, a gas circuit breaker 11B for the phase B, a gas circuit breaker 11C for the phase C, and a common base mount 13. The base mount 13 is fixed to a mounting surface 14 as shown in FIG. 1, FIG. 3A, FIG. 3B and FIG. 3C. The gas circuit breakers 11A, 11B and 11C for the respective phases are fixed on the base mount 13. The gas circuit breakers 11A, 11B and 11C for the respective phases are formed into a cylindrical shape, and have axial lines $12a$, $12b$ and $12c$ respectively as shown in FIG. 1 and FIG. 4. The gas circuit breakers 11A, 11B and 11C for the respective phases are arranged on a horizontal arrangement plane HS0, and are mounted to the base mount 13 respectively.

In order to describe the configuration of the gas-insulated switching apparatus 100 according to Embodiment 1, three-axis orthogonal coordinate including an x-axis, a y-axis, and a z-axis is assumed, and the horizontal arrangement plane HS0 is assumed to exist in an xy plane of the three-axis orthogonal coordinate. The gas circuit breakers 11A, 11B and 11C for the respective phases are arranged in such a manner that the respective axial lines 12a, 12b and 12c are positioned on the xy plane as shown in FIG. 1 and FIG. 4, and the respective axial lines 12a, 12b and 12c extend substantially in parallel to each other along a first direction. The first direction here corresponds to the direction of the x-axis in the three-axis orthogonal coordinate.

As regards the breaker module 10, as shown in FIG. 1, FIG. 2 and FIG. 4, a vertical arrangement plane VSA for the phase A, a vertical arrangement plane VSB for the phase B and a vertical arrangement plane VSC for the phase C are set. The vertical arrangement plane VSA for the phase A is a vertical plane vertical to the horizontal arrangement plane HS0 and including the axial line 12a of the gas circuit breaker 11A for the phase A. The vertical arrangement plane VSB for the phase B is a vertical plane vertical to the horizontal arrangement plane HS0 and including the axial line 12b of the gas circuit breaker 11B for the phase B. The vertical arrangement plane VSC for the phase C is a vertical plane vertical to the horizontal arrangement plane HS0 and including the axial line 12c of the gas circuit breaker 11C for the phase C. The vertical arrangement planes VSA, VSB and VSC for the phase A, the phase B and the phase C are in parallel to an xz plane of the three-axis orthogonal coordinate, and are planes extending in parallel to each other. The phase distance m between the vertical arrangement planes VSA and VSB and the phase distance m between the vertical arrangement planes VSB and VSC are the same as shown in FIG. 1 and FIG. 2. FIG. 3A is a front view corresponding to the vertical arrangement plane VSA for the phase A, FIG. 3B is a front view corresponding to the vertical arrangement plane VSB for the phase B, and FIG. 3C is a front view corresponding to the vertical arrangement plane VSC for the phase C.

First vertical tubes 21A, 21B and 21C respectively for the phase A, the phase B and the phase C are connected vertically to the left end portions of the gas circuit breakers 11A, 11B and 11C for the respective phases. Likewise, second vertical tubes 31A, 31B and 31C for the phase A, the phase B and the phase C are connected vertically to the right end portions of the gas circuit breakers 11A, 11B and 11C for the respective phases. A first vertical plane VS1 is set for the first vertical tubes 21A, 21B and 21C for the respective phases, and a second vertical plane VS2 is set for the second vertical tubes 31A, 31B and 31C for the respective phases. The first vertical plane VS1 is a vertical plane extending vertically to the horizontal arrangement plane HS0 and intersecting the left end portions of the gas circuit breakers 11A, 11B and 11C for the respective phases. The second vertical plane VS2 is a vertical plane extending vertically to the horizontal arrangement plane HS0 and intersecting the right end portions of the gas circuit breakers 11A, 11B and 11C for the respective phases. The first and second vertical planes VS1 and VS2 extend in parallel with a yz plane of the three-axis orthogonal coordinate, and are parallel to each other, so as to extend orthogonally to the vertical arrangement planes VSA, VSB and VSC for the phase A, the phase B and the phase C. Formed between the first and second vertical plane planes VS1 and VS2 is a circuit wiring space CS above the breaker module 10. The circuit wiring space CS is such that the width WO in the horizontal direction is the same as the distance between the first and second vertical planes VS1 and VS2, extend across the vertical arrangement planes VSA, VSB and VSC for the phase A, the phase B and the phase C, and extend between the first and second vertical planes VS1 and VS2.

The first vertical tubes 21A, 21B and 21C are connected vertically to the left end portions of the gas circuit breakers 11A, 11B and 11C for the respective phases with the respective axial lines thereof positioned on the first vertical plane VS1. More specifically, as shown in FIG. 2, the first vertical tube 21A for the phase A is connected to the left end portion of the gas circuit breaker 11A for the phase A with the axial line thereof positioned on the intersecting line between the first vertical plane VS1 and the vertical arrangement plane VSA for the phase A. As shown in FIG. 2, the first vertical tube 21B for the phase B is connected to the left end portion of the gas circuit breaker 11B for the phase B with the axial line thereof positioned on the intersecting line between the first vertical plane VS1 and the vertical arrangement plane VSB for the phase B. Likewise, as shown in FIG. 2, the first vertical tube 21C for the phase C is connected to the left end portion of the gas circuit breaker 11C for the phase C with the axial line thereof positioned on the intersecting line between the first vertical plane VS1 and the vertical arrangement plane VSC for the phase C.

The second vertical tubes 31A, 31B and 31C for the respective phases are connected vertically to the right end portions of the gas circuit breakers 11A, 11B and 11C for the respective phases with the respective axial lines thereof positioned on the second vertical plane VS2. More specifically, as shown in FIG. 2, the second vertical tube 31A for the phase A is connected to the right end portion of the gas circuit breaker 11A for the phase A with the axial line thereof positioned on the intersecting line between the second vertical plane VS2 and the vertical arrangement plane VSA for the phase A. As shown in FIG. 2, the second vertical tube 31B for the phase B is connected to the right end portion of the gas circuit breaker 11B for the phase B with the axial line thereof positioned on the intersecting line between the second vertical plane VS2 and the vertical arrangement plane VSB for the phase B. Likewise, as shown in FIG. 2, the second vertical tube 31C for the phase C is connected to the right end portion of the gas circuit breaker 11C for the phase C with the axial line thereof positioned on the intersecting line between the second vertical plane VS2 and the vertical arrangement plane VSC for the phase C.

The first vertical tubes 21A, 21B and 21C for the respective phases have the same vertical length LV1, and the second vertical tubes 31A, 31B and 31C for the respective phases have the same vertical length LV2. The vertical length LV1 and the vertical length LV2 are set to the same length and hence the relation LV1=LV2 is satisfied.

The gas circuit breakers 11A, 11B and 11C for the respective phases have reference axial lengths LS respectively between the first and second vertical planes VS1 and VS2. The reference axial lengths LS of the gas circuit breakers 11A, 11B and 11C for the respective phases are set to the same length. The reference axial length LS is equal to the width WO of the circuit wiring space CS in the horizontal direction. The gas circuit breakers 11A, 11B and 11C for the respective phases have the center points P of the respective reference axial lengths LS, and are arranged so that center points P of the respective axial lengths LS of the gas circuit breakers 11A, 11B and 11C for the respective phases arranged in line in the second direction which is parallel to the y-axis. The second direction here corresponds to the direction parallel to the y-axis. Consequently, the arrangement space width WS defined by both ends of the gas circuit breakers 11A, 11B and 11C for the respective phases are the lengths obtained by adding the lengths of the both end portions of the gas circuit breakers 11A, 11B and 11C for the respective phases to the reference axial lengths LS of the gas circuit breakers 11A, 11B and 11C for the respective phases, and the gas circuit breakers 11A, 11B and 11C for the respective phases are arranged compactly in the arrangement space width WS.

The gas circuit breakers 11A, 11B and 11C for the respective phases are each configured with a gas circuit breaker referred to as "double-points-break" type and, as shown respectively in FIG. 3A, FIG. 3B and FIG. 3C, include two breaking open-close switches 11a and 11b in the interior thereof. The breaking open-close switches 11a and 11b are arranged respectively along the axial lines 12a, 12b and 12c in the interior of the gas circuit breakers 11A, 11B and 11C for the respective phases and are connected to each other in series. As shown in FIG. 1, FIG. 3A, FIG. 3B and FIG. 3C, switch drive mechanisms 15A, 15B and 15C are mounted to the lower portions of the gas circuit breakers 11A, 11B and 11C for the respective phases. The switch drive mechanisms 15A, 15B and 15C drive the respective breaking open-close switches 11a and 11b of the gas circuit breakers 11A, 11B and 11C for the respective phases so as to open and close simultaneously. Since the gas circuit breakers 11A, 11B and 11C for the respective phases each include the two breaking open-close switches 11a and 11b arranged along the axial lines 12a, 12b and 12c and connected in series, the respective reference axial lengths LS have relatively large dimensions, and the circuit wiring space CS has also a relatively large dimension.

First horizontal tubes 22A, 22B and 22C respectively for the phase A, the phase B and the phase C are connected to the upper ends of the first vertical tubes 21A, 21B and 21C for the respective phases as shown in FIG. 1, FIG. 3A, FIG. 3B, FIG. 3C and FIG. 4. The first horizontal tubes 22A, 22B and 22C for the respective phases are extended horizontally toward the circuit wiring space CS along the first direction, that is, in the x-axis direction on a first horizontal plane HS1 parallel to the horizontal arrangement plane HS0 respectively. More specifically, as shown in FIG. 4, the first horizontal tube 22A for the phase A is arranged on the intersecting line between the first horizontal plane HS1 and the vertical arrangement plane VSA for the phase A, and the first horizontal tube 22B for the phase B is arranged on the intersecting line between the first horizontal plane HS1 and the vertical arrangement plane VSB for the phase B, and the first horizontal tube 22C for the phase C is arranged on the intersecting line between the first horizontal plane HS1 and the vertical arrangement plane VSC for the phase C.

As shown in FIG. 1, FIG. 3A, FIG. 3B and FIG. 3C, third vertical tubes 23A, 23B and 23C for the phase A, the phase B and the phase C are connected to the first horizontal tubes 22A, 22B and 22C for the phase A, the phase B and the phase C respectively. The third vertical tubes 23A, 23B and 23C for the respective phases are arranged coaxially with the first vertical tubes 21A, 21B and 21C for the corresponding respective phases. The third vertical tubes 23A, 23B and 23C for the respective phases are arranged on the first vertical plane VS1 vertically with respect to the horizontal arrangement plane HS0 together with the first vertical tubes 21A, 21B and 21C for the respective phases. The third vertical tubes 23A for the phase A is arranged on the intersecting line between the first vertical plane VS1 and the vertical arrangement plane VSA for the phase A, the third vertical tube 23B for the phase B is arranged on the intersecting line between the first vertical plane VS1 and the vertical arrangement plane VSB for the phase B, and the third vertical tube 23C for the phase C is arranged on the intersecting line between the first vertical plane VS1 and the vertical arrangement plane VSC for the phase C.

Third horizontal tubes 24A, 24B and 24C for the phase A, the phase B and the phase C are connected respectively to the upper ends of the third vertical tubes 23A, 23B and 23C for the respective phases. The third horizontal tubes 24A, 24B and 24C for the respective phases are extended in the first direction, that is, in the direction of the x-axis horizontally toward the circuit wiring space CS on a second horizontal plane HS2 extending in parallel with the horizontal arrangement plane HS0. The third horizontal tube 24A for the phase A is arranged on the intersecting line between the second horizontal plane HS2 and the vertical arrangement plane VSA for the phase A, the third horizontal tube 24B for the phase B is arranged on the intersecting line between the second horizontal plane HS2 and the vertical arrangement plane VSB for the phase B, and the third horizontal tube 24C for the phase C is arranged on the intersecting line between the second horizontal plane HS2 and the vertical arrangement plane VSC for the phase C.

As shown in FIG. 3A, FIG. 3B and FIG. 3C, second horizontal tubes 32A, 32B and 32C for the phase A, the phase B and the phase C are connected respectively to the upper ends of the second vertical tubes 31A, 31B and 31C for the respective phases. The second horizontal tubes 32A, 32B and 32C for the respective phases are extended horizontally toward the first direction, that is, in the direction of the x-axis outwardly of the circuit wiring space CS on the first horizontal plane HS1 respectively. More specifically, the second horizontal tube 32A for the phase A is arranged on the intersecting line between the first horizontal plane HS1 and the vertical arrangement plane VSA for the phase A, the second horizontal tube 32B for the phase B is arranged on the intersecting line between the first horizontal plane HS1 and the vertical arrangement plane VSB for the phase B, and the second horizontal tube 32C for the phase C is arranged on the intersecting line between the first horizontal plane HS1 and the vertical arrangement plane VSC for the phase C.

The first circuit wiring module 50 is arranged in the circuit wiring space CS above the horizontal arrangement plane HS0 and includes first circuit wirings 51A, 51B and 51C respectively for the phase A, the phase B and the phase C. The first circuit wirings 51A, 51B and 51C for the respective phases are each configured with a gas-insulated bus. The first circuit wirings 51A, 51B and 51C for the respective phases are arranged on circuit arrangement lines L1, L2 and L3 respectively in the circuit wiring space CS. The circuit arrangement lines L1, L2 and L3 are straight lines orthogonal to the vertical arrangement planes VSA, VSB and VSC for the phase A, the phase B, and the phase C, and arranged in parallel with the second direction, that is, in parallel with the y-axis of the three-axis orthogonal coordinate.

More specifically, as shown in FIG. 3A, FIG. 3B and FIG. 3C, a third vertical plane VS3 extending in parallel with the first and second vertical planes VS1 and VS2 is set in the circuit wiring space CS between the first vertical plane VS1 and the second vertical plane VS2. The third vertical plane VS3 is positioned specifically just at a midpoint between the first vertical plane VS1 and the second vertical plane VS2, and is a vertical plane passing through the center points P of the respective reference axial lengths LS of the gas circuit breakers 11A, 11B and 11C for the respective phases. The horizontal distance between the third vertical plane VS3 and the first vertical plane VS1 is $2\alpha$, and the horizontal distance between the third vertical plane VS3 and the second vertical plane VS2 is also $2\alpha$. A fourth vertical plane VS4 is set between the first vertical plane VS1 and the third vertical plane VS3 so as to extend in parallel thereto. The fourth vertical plane VS4 is positioned just at a midpoint between the first vertical plane VS1 and the third vertical plane VS3. The horizontal distance between the fourth vertical plane VS4 and the third vertical plane VS3 is $\alpha$, and the horizontal distance between the fourth vertical plane VS4 and the first vertical plane VS1 is also $\alpha$.

The circuit arrangement lines L1 and L2 are set so as to position on the third vertical plane VS3. The circuit arrangement line L1 is positioned exactly above the circuit arrangement line L2. The vertical distance between the circuit arrangement lines L1 and L2 is α. The circuit arrangement line L1 is set on the intersecting line between the first horizontal plane HS1 and the third vertical plane VS3. The circuit arrangement line L3 is set on the fourth vertical plane VS4, and is apart from the distance α from the circuit arrangement line L2 in the horizontal direction.

The circuit arrangement lines L1, L2 and L3 are set to the respective apexes of a right angled isosceles triangle. Between the circuit arrangement lines L1 and L3 corresponds to an oblique line, that is, a long side of the right angled isosceles triangle. The circuit arrangement lines L1 and L2 are positioned at both ends of the first short side of the right angled isosceles triangle. The circuit arrangement lines L2 and L3 are positioned at both ends of the second short side of the right angled isosceles triangle.

Consequently, the first circuit wirings 51A, 51B and 51C for the respective phases of the first circuit wiring module 50 extend in parallel to each other along the second direction (the direction of the y-axis) orthogonal to the first direction (the direction of the x-axis), the first circuit wirings 51A, 51B and 51C for the respective phases are positioned at the respective apexes of the right angled isosceles triangle, and the first circuit wirings 51A and 51B respectively for the phase A and the phase B are positioned at both ends of the short side of the right angled isosceles triangle, and is arranged on the third vertical plane VS3 between the first vertical plane VS1 and the second vertical plane VS2 so as to be parallel to each other, and the first circuit wiring 51C for the phase C is arranged on the fourth vertical plane VS4 between the first vertical plane VS1 and the third vertical plane VS3 so as to extend in parallel thereto.

As shown in FIG. 3A, the first circuit wiring 51A for the phase A is connected to the left end portion of the gas circuit breaker 11A for the phase A through the first horizontal tube 22A for the phase A and the first vertical tube 21A for the phase A.

Likewise, as shown in FIG. 3B, the first circuit wiring 51B for the phase B is connected to the left end portion of the gas circuit breaker 11B for the phase B through the first horizontal tube 22B for the phase B and the first vertical tube 21B for the phase B. As shown in FIG. 3C, the first circuit wiring 51C for the phase C is connected to the left end portion of the gas circuit breaker 11C for the phase C through the first horizontal tube 22C for the phase C and the first vertical tube 21C for the phase C. The horizontal tubes 22A, 22B and 22C for the respective phases include disconnect switches DS corresponding respectively to the first circuit wirings 51A, 51B and 51C for the respective phases of the first circuit wiring module 50 integrated therein. The first vertical tubes 21A, 21B and 21C for the respective phases include instrument current transformers CT corresponding respectively to the first circuit wirings 51A, 51B and 51C for the respective phases of the first circuit wiring module 50 integrated therein respectively.

The second circuit wiring module 60 is arranged outside the arrangement space width WS as shown in FIG. 3A, FIG. 3B and FIG. 3C. The second circuit wiring module 60 includes second circuit wirings 61A, 61B and 61C respectively for the phase A, the phase B and the phase C. The second circuit wirings 61A, 61B and 61C are connected to transmission lines for the respective phases when the gas-insulated switching apparatus 100 is configured as a transmission line unit, and are connected to respective phase coils of a transformer when the gas-insulated switching apparatus 100 is configured as a transformer unit.

As shown in FIG. 3A, FIG. 3B and FIG. 3C, the second circuit wirings 61A, 61B and 61C for the respective phases are connected respectively to the respective right end portions of the gas circuit breakers 11A, 11B and 11C for the respective phases through the second horizontal tubes 32A, 32B and 32C for the respective phases and the second vertical tubes 31A, 31B and 31C for the respective phases. The second horizontal tubes 32A, 32B and 32C for the respective phases include the disconnect switches DS corresponding respectively to the second circuit wirings 61A, 61B and 61C for the respective phases of the second circuit wiring modules 60 integrated therein, and the second vertical tubes 31A, 31B and 31C for the respective phases include the instrument current transformers CT corresponding to the second circuit wirings 61A, 61B and 61C for the respective phases of the second circuit wiring module 60 integrated therein.

The third circuit wiring module 70 is arranged in the circuit wiring space CS further above the first circuit wiring module 50. The third circuit wiring module 70 includes third circuit wirings 71A, 71B and 71C for the phase A, the phase B and the phase C. The third circuit wirings 71A, 71B and 71C for the respective phases are configured with gas-insulated buses as in the case of the first circuit wirings 51A, 51B and 51C for the respective phases, and constitute a multi-bus structure together with the first circuit wirings 51A, 51B and 51C for the respective phases. The third circuit wirings 71A, 71B and 71C respectively for the phase A, the phase B and the phase C are arranged respectively on circuit arrangement lines L5, L6 and L7. The respective circuit arrangement lines L5, L6 and L7 are straight lines orthogonal to the respective vertical arrangement planes VSA, VSB and VSC in the second direction, that is, in the y-axis direction in the circuit wiring space CS and extends in parallel to the circuit arrangement lines L1, L2 and L3.

The circuit arrangement lines L5 and L6 are arranged on the third vertical plane VS3, and the circuit arrangement line L7 is arranged on the fourth vertical plane VS4. The circuit arrangement lines L5, L6 and L7 are arranged at the respective apexes of the right angled isosceles triangle respectively. Between the circuit arrangement line L5 and the circuit arrangement line L7 corresponds to an oblique line, that is, alongside of the right angled isosceles triangle. The circuit arrangement lines L5 and L6 are positioned at both ends of the first short side of the right angled isosceles triangle. The circuit arrangement line L5 is arranged exactly below the circuit arrangement line L6, and the vertical distance therebetween is α. The circuit arrangement line L5 is positioned on the intersecting line between the second horizontal plane HS2 and the third vertical plane VS3. The circuit arrangement lines L6 and L7 are positioned at both ends of the second short side of the right angled isosceles triangle. The horizontal distance between the circuit arrangement lines L6 and L7 is also α. The circuit arrangement line L5 is positioned above the circuit arrangement line L1, and the vertical distance therebetween is β. The distance β is set to satisfy the condition of $2\alpha \leq \beta \leq 3\alpha$.

Consequently, the third circuit wirings 71A, 71B and 71C for the respective phases of the third circuit wiring module 70 extend in parallel to each other along the second direction (the direction of the y-axis), and the third circuit wirings 71A, 71B and 71C for the respective phases are positioned on the respective apexes of the right angled isosceles triangle, the third circuit wirings 71A and 71B respectively for the phase A and the phase B are positioned at both ends of the short side of the right angled isosceles triangle and is arranged on the third vertical plane VS3, and the third circuit wiring 71C for the phase C is arranged on the fourth vertical plane VS4.

As shown in FIG. 3A, the third circuit wiring 71A for the phase A is connected to the left end portion of the gas circuit breaker 11A for the phase A through the third horizontal tube 24A for the phase A, the third vertical tube 23A for the phase A, the first horizontal tube 22A for the phase A, and the first vertical tube 21A for the phase A. In the same manner, as shown in FIG. 3B, the third circuit wiring 71B for the phase B is connected to the left end portion of the gas circuit breaker 11B for the phase B through the third horizontal tube 24B for the phase B, the third vertical tube 23B for the phase B, the first horizontal tube 22B for the phase B, and the first vertical tube 21B for the phase B. As shown in FIG. 3C, the third circuit wiring 71C for the phase C is connected to the left end portion of the gas circuit breaker 11C for the phase C through the third horizontal tube 24C for the phase C, the third vertical tube 23C for the phase C, the first horizontal tube 22C for the phase C, and the first vertical tube 21C for the phase C. The third horizontal tubes 24A, 24B and 24C for the respective phases include the disconnect switches DS corresponding respectively to the first circuit wirings 71A, 71B and 71C for the respective phases of the third circuit wiring module 70 integrated therein. The instrument current transformers CT integrated in the first vertical tubes 21A, 21B and 21C for the respective phases correspond also to the third circuit wirings 71A, 71B and 71C for the respective phases of the third circuit wiring module 70 respectively.

With the gas-insulated switching apparatus 100 according to Embodiment 1, the gas circuit breaker 11A for the phase A opens and closes the electric connection between the first circuit wiring 51A for the phase A of the first circuit wiring module 50, and the second circuit wiring 61A for the phase A of the second circuit wiring module 60, and the electric connection between the third circuit wiring 71A for the phase A of the third circuit wiring module 70 and the second circuit wiring 61A for the phase A of the second circuit wiring module 60. The gas circuit breaker 11B for the phase B opens and closes the electric connection between the first circuit wiring 51B for the phase B of the first circuit wiring module 50 and the second circuit wiring 61B for the phase B of the second circuit wiring module 60, and the electric connection between the third circuit wiring 71B for the phase B of the third circuit wiring module 70 and the second circuit wiring 61B for the phase B of the second circuit wiring module 60. Likewise, the gas circuit breaker 11C for the phase C opens and closes the electric connection between the first circuit wiring 51C for the phase C of the first circuit wiring module 50 and the second circuit wiring 61C for the phase C of the second circuit wiring module 60 and the electric connection between the third circuit wiring 71C for the phase C of the three circuit wiring module 70 and the second circuit wiring 61C for the phase C of the second circuit wiring module 60.

With the gas-insulated switching apparatus 100 according to Embodiment 1, the first vertical tubes 21A, 21B and 21C for the respective phases are arranged on the first vertical plane VS1 which is orthogonal to the horizontal arrangement plane HS0 on which the gas circuit breakers 11A, 11B and 11C for the respective phases are arranged, the second vertical tubes 31A, 31B and 31C for the respective phases are arranged on the second vertical plane VS2 extending in parallel to the first vertical plane VS1, the gas circuit breakers 11A, 11B and 11C for the respective phases of the breaker module 10 have the same reference axial length LS between the first and second vertical planes VS1 and VS2, and the center points P of the respective reference axial lengths LS are extended in line in the second direction which is orthogonal to the first direction in which the axial lines of the gas circuit breakers 11A, 11B and 11C for the respective phases are arranged. Therefore, the gas-insulated switching apparatus 100 may be configured within the compact arrangement space width WS with the reference axial lengths LS of the gas circuit breakers 11A, 11B and 11C for the respective phases at the center. Simultaneously, the first circuit wirings 51A, 51B and 51C for the respective phases of the first circuit wiring module 50 are configured with the gas-insulated buses respectively and extend in parallel to each other along the second direction, the first circuit wirings 51A, 51B and 51C for the respective phases are positioned at the respective apexes of a right angled isosceles triangle, the first circuit wirings 51A and 51B respectively for the phase A and the phase B are positioned at both ends of the short side of the right angled isosceles triangle and arranged on the third vertical plane VS3 between the first vertical plane VS1 and the second vertical plane VS2 so as to extend in parallel thereto, and the first circuit wiring 51C for the phase C is arranged between the first vertical plane VS1 and the third vertical plane VS3 on the fourth vertical plane VS4 so as to extend in parallel thereto. Therefore, the vertical dimension of the first circuit wiring module 50 may be reduced, and hence the vertical dimension of the gas-insulated switching apparatus 100 may also be reduced.

With the gas-insulated switching apparatus 100 according to Embodiment 1, by setting the third vertical plane VS3 in particular so as to pass through the center points P of the reference axial lengths of the gas circuit breakers for the respective phases, the first circuit wirings 51A and 52B respectively for the phase A and the phase B may be arranged at a midpoint between the first and second vertical planes VS1 and VS2, so that the first circuit wiring module 50 may be arranged within the circuit wiring space CS between the vertical planes VS1 and VS2 reliably.

With the gas-insulated switching apparatus 100 according to Embodiment 1, the gas circuit breakers 11A, 11B and 11C for the respective phases each include a pair of breaking open-close switches 11a and 11b, and the respective breaking open-close switches 11a and 11b are arranged along the axial lines 12a, 12b and 12c of the gas circuit breakers 11A, 11B and 11C for the respective phases. Therefore, the predetermined reference axial lengths LS for the gas circuit breakers 11A, 11B and 11C for the respective phases may be secured and the first circuit wiring module 50 may reliably be arranged within the circuit wiring space CS between the vertical planes VS1 and VS2.

With the gas-insulated switching apparatus 100 according to Embodiment 1, the third circuit wiring module 70 arranged above the first circuit wiring module 50 is further provided, the third circuit wiring module 70 includes the third circuit wirings 71A, 71B and 71C respectively for the phase A, the phase B and the phase C, the third circuit wirings 71A, 71B and 71C for the respective phases are configured with gas-insulated buses, and connected to the gas circuit breakers 11A, 11B and 11C for the respective phases through the first vertical tubes 21A, 21B and 21C for the respective phases, the third circuit wirings 71A, 71B and 71C for the respective phases extend along the second direction substantially in parallel to each other, the third circuit wirings 71A, 71B and 71C for the respective phases are positioned at the respective apexes of the right angled isosceles triangle, the third circuit wirings 71A and 71B respectively for the phase A and the phase B are positioned at both ends of the short side of the right angled isosceles triangle and arranged on the third vertical plane VS3, and the third circuit wiring 71C for the phase C is arranged on the fourth vertical plane VS4. Therefore, the vertical dimension of the third circuit wiring module 70 which constitutes the multiple-bus structure together with the first circuit wiring module 50 may also be reduced, so that the vertical dimension of the gas-insulated switching apparatus 100 may also be reduced.

With the gas-insulated switching apparatus 100 according to Embodiment 1, first instrument current transformers CT respectively for the phase A, the phase B and the phase C are arranged respectively in the first vertical tubes 21A, 21B and 21C for the respective phases and second instrument current transformers CT respectively for the phase A, the phase B and the phase C are arranged respectively in the second vertical tubes 31A, 31B and 31C for the respective phases. Therefore, the instrument current transformers CT for the respective phases may be arranged compactly by using the first vertical tubes 21A, 21B and 21C and the second vertical tubes 31A, 31B and 31C.

With the gas-insulated switching apparatus 100 according to Embodiment 1, the horizontal tubes 22A, 22B and 22C respectively for the phase A, the phase B and the phase C connected horizontally to the upper end portions of the first vertical tubes 21A, 21B and 21C for the respective phases are provided, the first circuit wirings 51A, 51B and 51C for the respective phases are connected to the gas circuit breakers 11A, 11B and 11C for the respective phases through the horizontal tubes 22A, 22B and 22C for the respective phases and the first vertical tubes 21A, 21B and 21C for the respective phases respectively. Therefore, the first circuit wirings 51A, 51B and 51C for the respective phases arranged between the vertical planes VS1 and VS2 may be connected to the gas circuit breakers 11A, 11B and 11C for the respective phases compactly without being protruded from the arrangement space width WS.

With the gas-insulated switching apparatus 100 according to Embodiment 1, the disconnect switches respectively for the phase A, the phase B and the phase C are arranged respectively in the horizontal tubes 22A, 22B and 22C for the respective phases. Therefore, the disconnect switches for the respective phases may be arranged compactly using the horizontal tubes 22A, 22B and 22C for the respective phases.

In addition, with the gas-insulated switching apparatus 100 according to Embodiment 1, the first vertical tubes 21A, 21B and 21C for the respective phases have substantially the same vertical length LV1, the second vertical tubes 31A, 31B and 31C for the respective phases have substantially the same vertical length LV2 and, in addition, the vertical lengths LV1 of the first vertical tubes 21A, 21B and 21C for the respective phases and the vertical lengths LV2 of the second vertical tubes 31A, 31B and 31C for the respective phases are substantially equal. Therefore, the respective vertical tubes 21A, 21B and 21C and the vertical tubes 31A, 31B and 31C may be configured with the same components at a low cost.

Embodiment 2

A gas-insulated switching apparatus 200 according to Embodiment 2 is a gas-insulated switching apparatus referred to as a bus sectionalizing unit. The gas-insulated switching apparatus 200 according to Embodiment 2 includes two gas-insulated switching units 300 and 400 arranged adjacently to each other. The first gas-insulated switching unit 300 includes a first breaker module 310, a first circuit wiring module 350 and a second circuit wiring module 360, and opens and closes the electric connection between the first circuit wiring module 350 and the second circuit wiring module 360 by the first breaker module 310. The second gas-insulated switching unit 400 includes a second breaker module 410, a third circuit wiring module 450 and a fourth circuit wiring module 460, and opens and closes the electric connection between the third circuit wiring module 450 and the fourth circuit wiring module 460 by the second breaker module 410. The third circuit wiring module 450 is arranged above the first circuit wiring module 350. The second circuit wiring module 360 is arranged in a small arrangement space in conjunction with the first circuit wiring module 350, and the fourth circuit wiring module 460 is arranged in the small arrangement space in conjunction with the third circuit wiring module 450.

Figure 5:
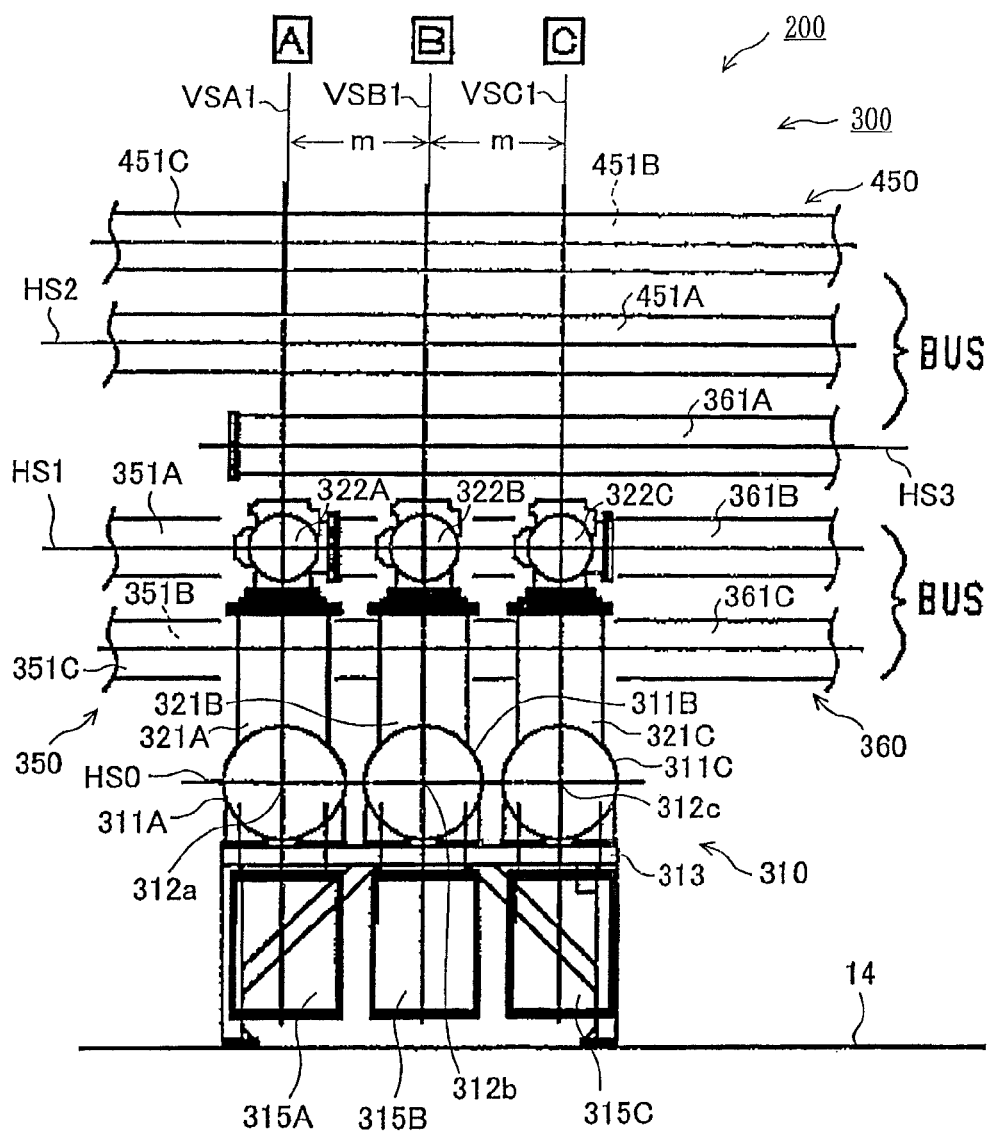
FIG. 5 is a left side view of a first gas-insulated switching unit of the gas-insulated switching apparatus according to Embodiment 2 of the present invention.
Figure 6:
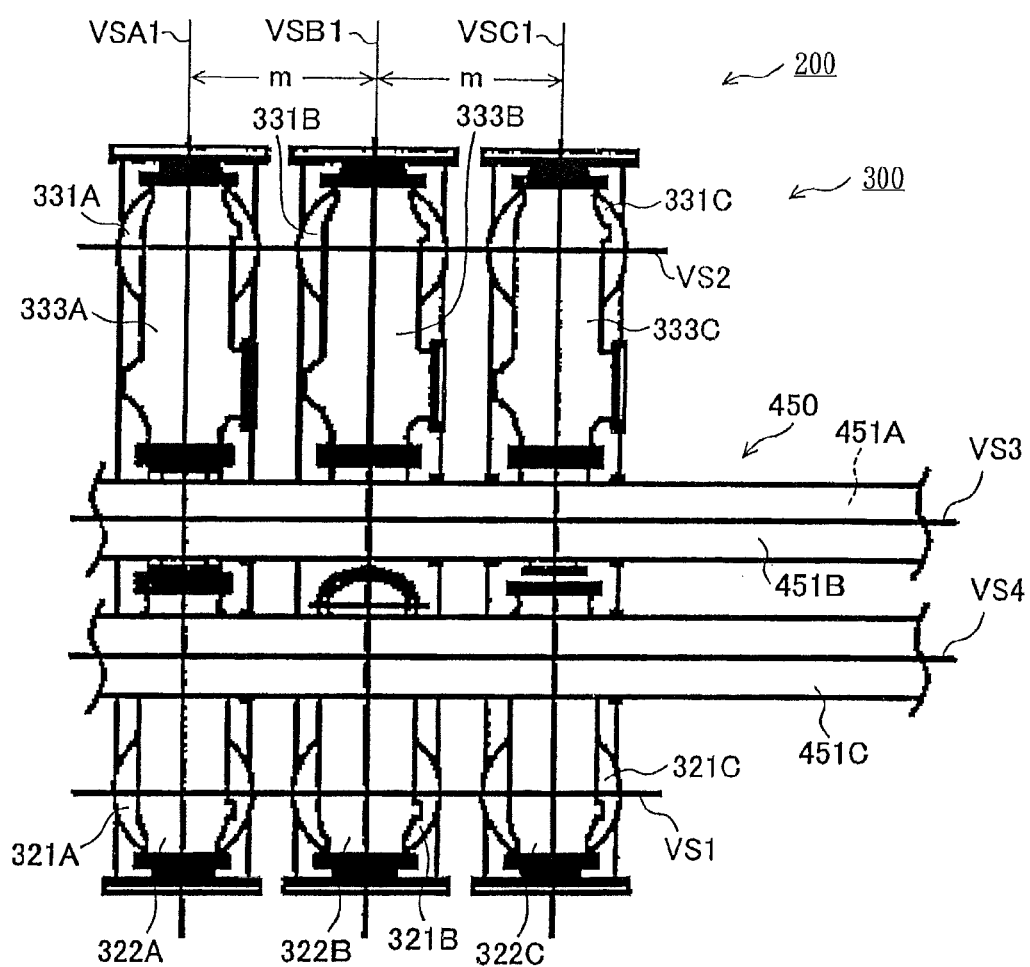
FIG. 6 is a plan view of the first gas-insulated switching unit according to Embodiment 2.
Figure 7A:
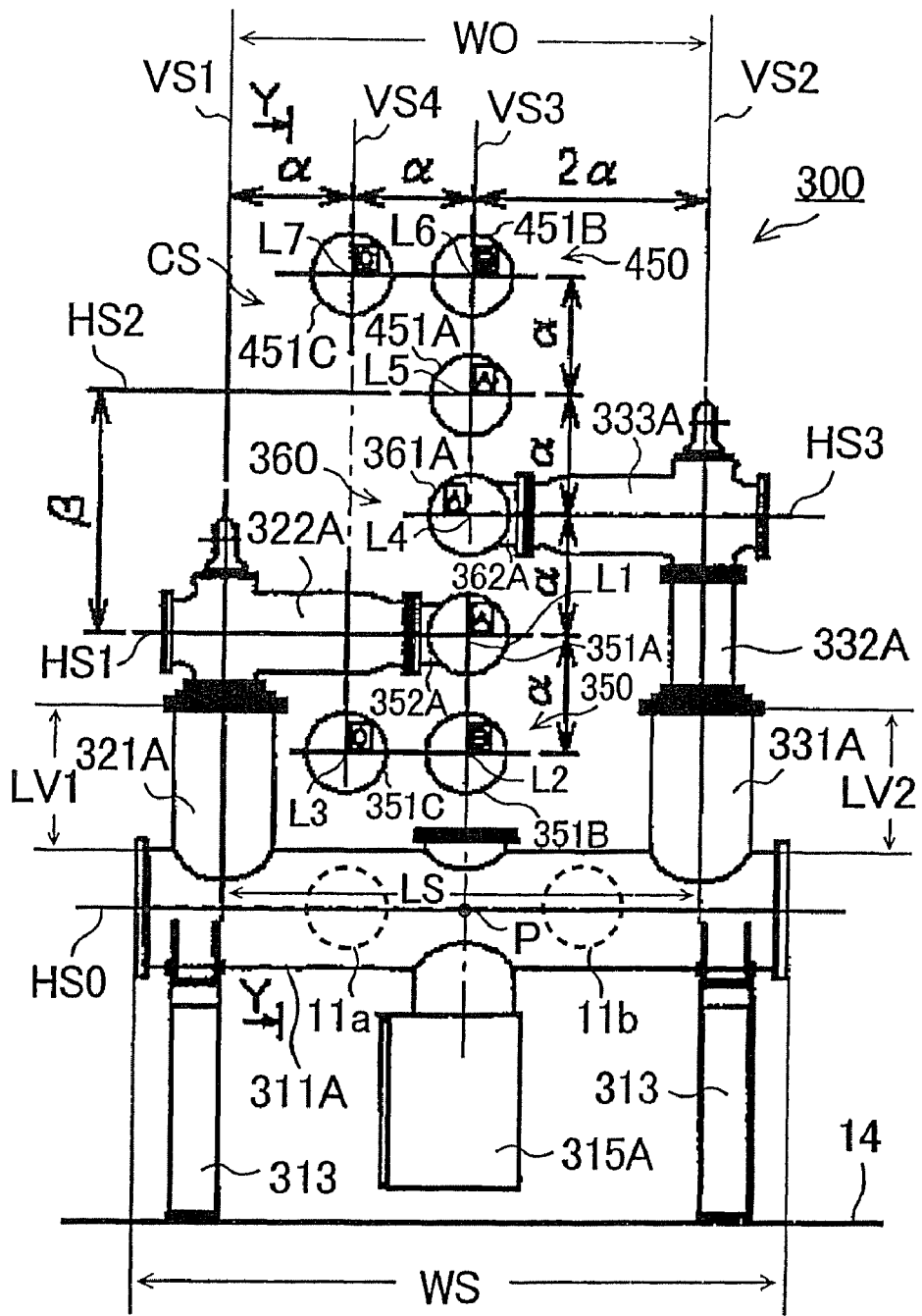
FIG. 7A is a front view corresponding to a vertical arrangement plane for the phase A of the first gas-insulated switching unit according to Embodiment 2.
Figure 7B:
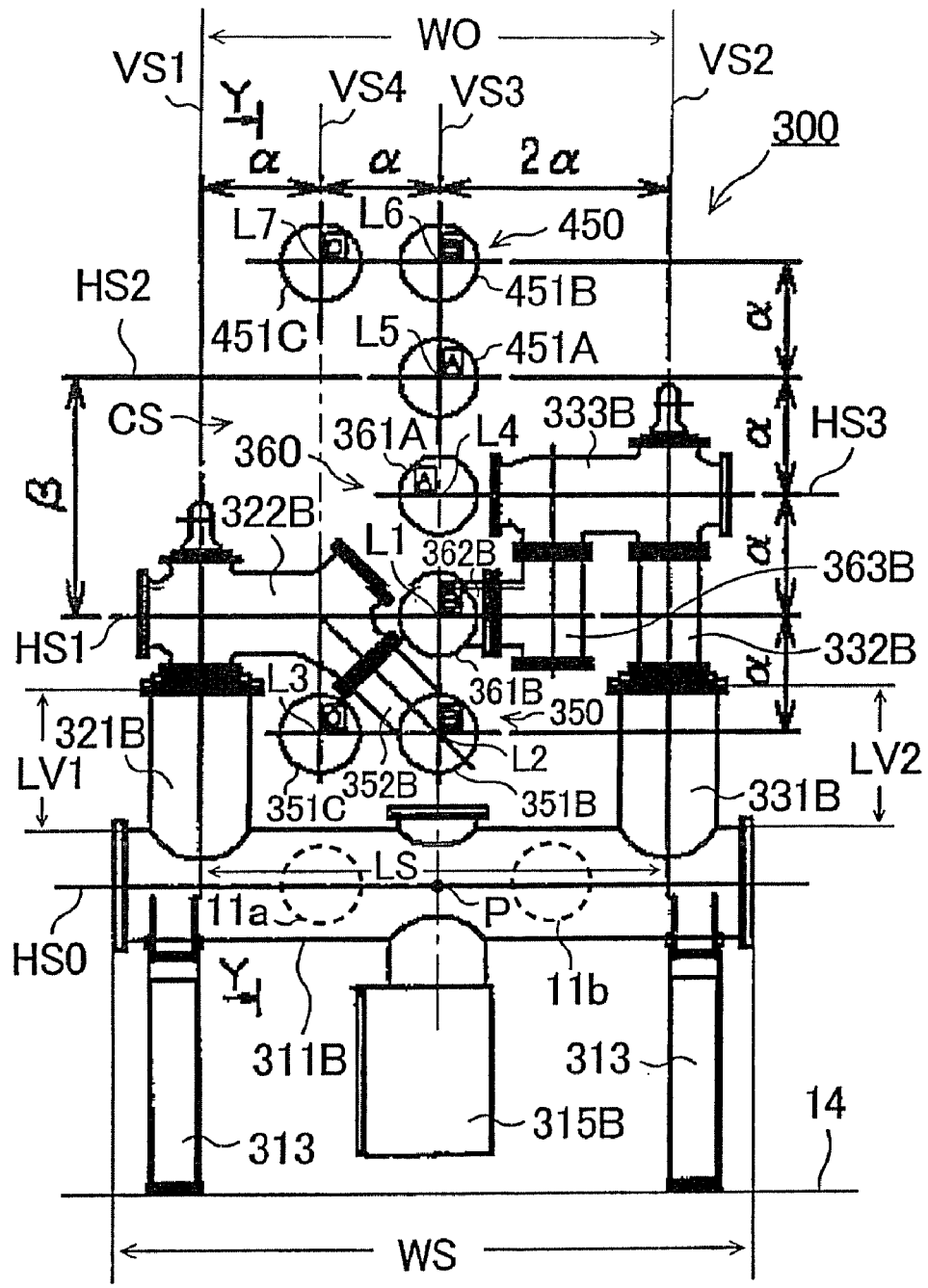
FIG. 7B is a front view corresponding to a vertical arrangement plane for the phase B of the first gas-insulated switching unit according to Embodiment 2.
Figure 7C:
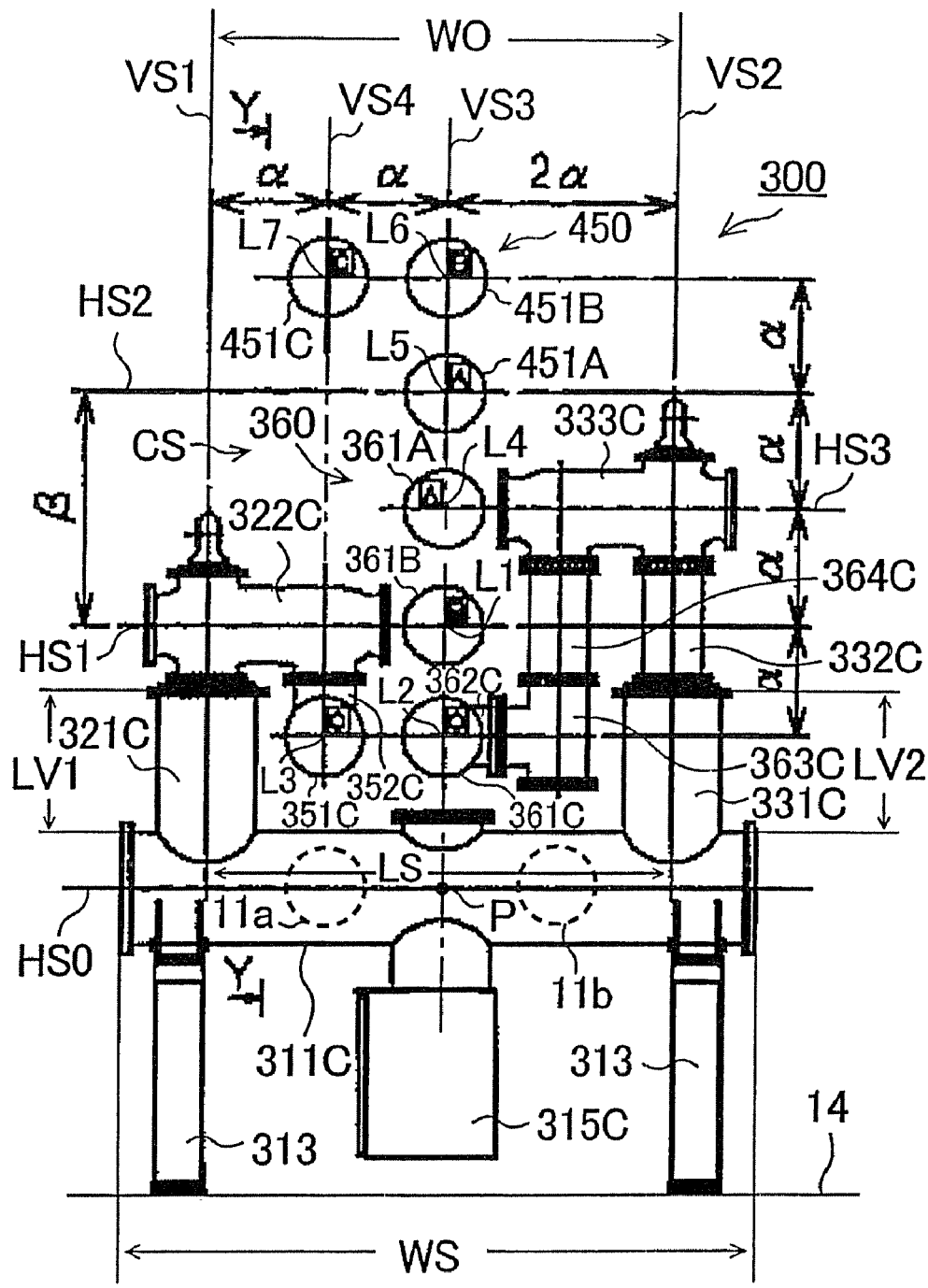
FIG. 7C is a front view corresponding to a vertical arrangement plane for the phase C of the first gas-insulated switching unit according to Embodiment 2.
Figure 8:
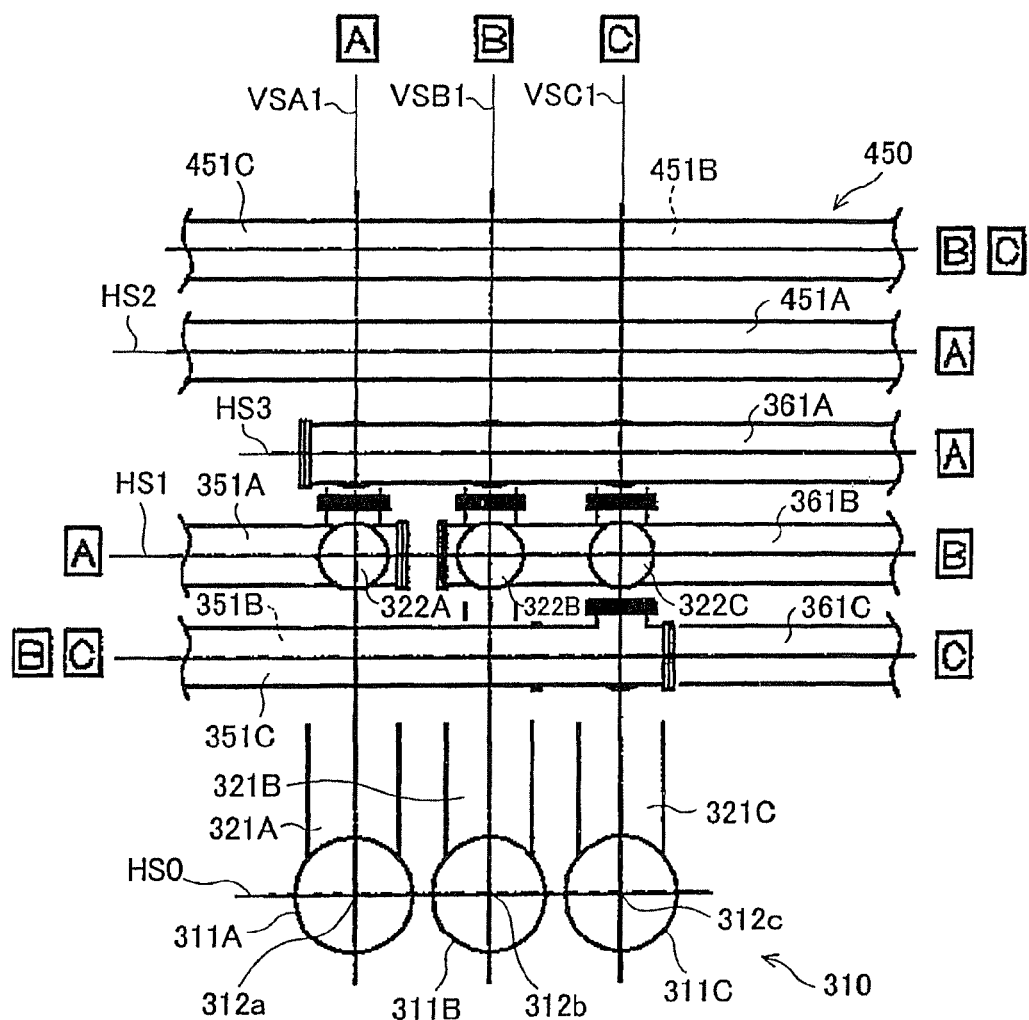
FIG. 8 is a cross-sectional view taken along the line Y-Y in FIGS. 7A, 7B and 7C.

FIG. 5, FIG. 6, FIG. 7A, FIG. 7B, FIG. 7C and FIG. 8 illustrate the first gas-insulated switching unit 300. FIG. 5 is a left side view thereof, FIG. 6 is a plan view thereof, FIG. 7A is a front view corresponding to a vertical arrangement plane VSA1 for the phase A, FIG. 7B is a front view corresponding to a vertical arrangement plane VSB1 for the phase B, FIG. 7C is a front view corresponding to a vertical arrangement plane VSC1 for the phase C, and FIG. 8 is a cross-sectional view taken along the line Y-Y in FIGS. 7A, 7B and 7C.

Referring now to FIG. 5, FIG. 6, FIG. 7A, FIG. 7B, FIG. 7C and FIG. 8, the first gas-insulated switching unit 300 will be described. The first gas-insulated switching unit 300 is configured basically in the same idea as the gas-insulated switching apparatus 100 according to Embodiment 1. The first and second circuit wiring modules 350 and 360 are modified from the first and second circuit wiring modules 50 and 60 in Embodiment 1 for configuring the bus sectionalizing unit.

The first breaker module 310 is configured in the same style as the breaker module 10 of Embodiment 1. The first breaker module 310 includes a gas circuit breaker 311A for the phase A, a gas circuit breaker 311B for the phase B, a gas circuit breaker 311C for the phase C and a common base mount 313. The base mount 313 is fixed to the mounting surface 14 as shown in FIG. 5, FIG. 7A, FIG. 7B and FIG. 7C. The gas circuit breakers 311A, 311B and 311C for the respective phases are fixed to the base mount 313. The gas circuit breakers 311A, 311B and 311C for the respective phases are configured into a cylindrical shape and, as shown in FIG. 5 and FIG. 8 and have axial lines $312a$, $312b$ and $312c$ respectively. The gas circuit breakers 311A, 311B and 311C for the respective phases are arranged on a horizontal arrangement plane HS0, and are mounted to the base mount 313 respectively.

In order to describe the configuration of the gas-insulated switching apparatus 200 in Embodiment 2, three-axis orthogonal coordinate including an x-axis, a y-axis, and a z-axis is assumed, and the horizontal arrangement plane HS0 is assumed to exist in an xy plane of the three-axis orthogonal coordinate. The gas circuit breakers 311A, 311B and 311C for the respective phases of the first breaker module 310 of the first gas-insulated switching unit 300 are arranged in such a manner that the respective axial lines $312a$, $312b$ and $312c$ are positioned on the xy plane as shown in FIG. 5 and FIG. 8, and the respective axial lines $312a$, $312b$ and $312c$ extend substantially in parallel to each other along the first direction. The first direction here corresponds to the direction of the x-axis in the three-axis orthogonal coordinate.

As regards the first gas-insulated switching unit 300, as shown in FIG. 5, FIG. 6 and FIG. 8, a vertical arrangement plane VSA1 for the phase A, a vertical arrangement plane VSB1 for the phase B and a vertical arrangement plane VSC1 for the phase C are set. The vertical arrangement plane VSA1 for the phase A is a vertical plane vertical to the horizontal arrangement plane HS0 and including the axial line $312a$ of the gas circuit breaker 311A for the phase A. The vertical arrangement plane VSB1 for the phase B is a vertical plane vertical to the horizontal arrangement plane HS0 and including the axial line $312b$ of the gas circuit breaker 311B for the phase B. The vertical arrangement plane VSC1 for the phase C is a vertical plane vertical to the horizontal arrangement plane HS0 and including the axial line 312c of the gas circuit breaker 311C for the phase C. The vertical arrangement planes VSA1, VSB1 and VSC1 for the phase A, the phase B and the phase C are in parallel to the an xz plane of the three-axis orthogonal coordinate, and are planes extending in parallel to each other. The phase distance m between the vertical arrangement planes VSA1 and VSB1 and the phase distance m between the vertical arrangement planes VSB1 and VSC1 are the same as shown in FIGS. 5 and 6.

First vertical tubes 321A, 321B and 321C respectively for the phase A, the phase B and the phase C are connected vertically to the left end portions of the gas circuit breakers 311A, 311B and 311C for the respective phases of the first breaker module 310. Likewise, second vertical tubes 331A, 331B and 331C for the phase A, the phase B and the phase C are connected vertically to the right end portions of the gas circuit breakers 311A, 311B and 311C for the respective phases. First and second vertical planes VS1 and VS2 are set for the first breaker module 310. The first vertical plane VS1 is a vertical plane extending vertically to the horizontal arrangement plane HS0 and intersecting the left end portions of the gas circuit breakers 311A, 311B and 311C for the respective phases. The second vertical plane VS2 is a vertical plane extending vertically to the horizontal arrangement plane HS0 and intersecting the right end portions of the gas circuit breakers 311A, 311B and 311C for the respective phases. The first and second vertical planes VS1 and VS2 extend in parallel with a yz plane, and are parallel to each other, so as to extend orthogonally to the vertical arrangement planes VSA1, VSB1 and VSC1 for the phase A, the phase B and the phase C respectively. Formed between the first and second vertical planes VS1 and VS2 is the circuit wiring space CS above the first breaker module 310. The circuit wiring space CS is such that the width WO in the horizontal direction is the same as the distance between the first and second vertical planes VS1 and VS2, extend across the vertical arrangement planes VSA1, VSB1 and VSC1 for the phase A, the phase B and the phase C, and extend between the first and second vertical planes VS1 and VS2.

The first vertical tubes 321A, 321B and 321C are connected vertically to the left end portions of the gas circuit breakers 311A, 311B and 311C for the respective phases with the respective axial lines thereof positioned on the first vertical plane VS1. More specifically, as shown in FIG. 6, the first vertical tube 321A for the phase A is connected to the left end portion of the gas circuit breaker 311A for the phase A with the axial line thereof positioned on the intersecting line between the first vertical plane VS1 and the vertical arrangement plane VSA1 for the phase A. As shown in FIG. 6, the first vertical tube 321B for the phase B is connected to the left end portion of the gas circuit breaker 311B for the phase B with the axial line thereof positioned on the intersecting line between the first vertical plane VS1 and the vertical arrangement plane VSB1 for the phase B. Likewise, as shown in FIG. 6, the first vertical tube 321C for the phase C is connected to the left end portion of the gas circuit breaker 311C for the phase C with the axial line thereof positioned on the intersecting line between the first vertical plane VS1 and the vertical arrangement plane VSC1 for the phase C.

The second vertical tubes 331A, 331B and 331C are connected vertically to the right end portions of the gas circuit breakers 311A, 311B and 311C for the respective phases with the respective axial lines thereof positioned on the second vertical plane VS2. More specifically, as shown in FIG. 6, the second vertical tube 331A for the phase A is connected to the right end portion of the gas circuit breaker 311A for the phase A with the axial line thereof positioned on the intersecting line between the second vertical plane VS2 and the vertical arrangement plane VSA1 for the phase A. As shown in FIG. 6, the second vertical tube 331B for the phase B is connected to the right end portion of the gas circuit breaker 311A for the phase B with the axial line thereof positioned on the intersecting line between the second vertical plane VS2 and the vertical arrangement plane VSB1 for the phase B. Likewise, as shown in FIG. 6, the second vertical tube 331C for the phase C is connected to the right end portion of the gas circuit breaker 311C for the phase C with the axial line thereof positioned on the intersecting line between the second vertical plane VS2 and the vertical arrangement plane VSC1 for the phase C.

The first vertical tubes 321A, 321B and 321C for the respective phases have the same vertical length LV1, and the second vertical tubes 331A, 331B and 331C for the respective phases have the same vertical length LV2. The vertical length LV1 and the vertical length LV2 are set to the same length and hence the relation LV1=LV2 is satisfied.

The gas circuit breakers 311A, 311B and 311C for the respective phases have reference axial lengths LS respectively between the first and second vertical planes VS1 and VS2. The reference axial lengths LS of the gas circuit breakers 311A, 311B and 311C for the respective phases are set to the same length. The gas circuit breakers 311A, 311B and 311C for the respective phases have center points P of the respective reference axial lengths LS, and are arranged so that the center points P of the respective axial lengths LS of the gas circuit breakers 311A, 311B and 311C for the respective phases arranged in line in the second direction which is parallel to the y-axis. The second direction here corresponds to the direction parallel to the y-axis of the three-axis orthogonal coordinate. Consequently, the arrangement space width WS defined by both ends of the gas circuit breakers 311A, 311B and 311C for the respective phases are the lengths obtained by adding the lengths of the both end portions of the gas circuit breakers 311A, 311B and 311C for the respective phases to the reference axial lengths LS of the gas circuit breakers 311A, 311B and 311C for the respective phases, and the gas circuit breakers 311A, 311B and 311C for the respective phases are arranged compactly in the arrangement space width WS.

The gas circuit breakers 311A, 311B and 311C for the respective phases are each configured with a gas circuit breaker referred to as "double-points-break" type and, as shown respectively in FIG. 7A, FIG. 7B and FIG. 7C, include two breaking open-close switches 11a and 11b in the interior thereof. The breaking open-close switches 11a and 11b are arranged respectively along the axial lines 312a, 312b and 312c in the interior of the gas circuit breakers 311A, 311B and 311C for the respective phases and are connected to each other in series. As shown in FIG. 5, FIG. 7A, FIG. 7B and FIG. 7C, switch drive mechanisms 315A, 315B and 315C are mounted to the lower portions of the gas circuit breakers 311A, 311B and 311C for the respective phases. The switch drive mechanisms 315A, 315B and 315C drive the respective breaking open-close switches 11a and 11b of the gas circuit breakers 311A, 311B and 311C for the respective phases so as to open and close simultaneously. Since the gas circuit breakers 311A, 311B and 311C for the respective phases each include the two breaking open-close switches 11a and 11b arranged along the axial lines 312a, 312b and 312c and connected in series, the respective reference axial lengths LS have relatively large dimensions, and the circuit wiring space CS has also a relatively large dimension.

First horizontal tubes 322A, 322B and 322C respectively for the phase A, the phase B and the phase C are connected to the upper ends of the first vertical tubes 321A, 321B and 321C for the respective phases as shown in FIG. 5, FIG. 7A, FIG. 7B, FIG. 7C and FIG. 8 respectively. The first horizontal tubes 322A, 322B and 322C for the respective phases are extended horizontally toward the circuit wiring space CS along the first direction (the x-axis direction) on the first horizontal plane HS1 parallel to the horizontal arrangement plane HS0 respectively. More specifically, as shown in FIG. 8, the first horizontal tube 322A for the phase A is arranged on the intersecting line between the first horizontal plane HS1 and the vertical arrangement plane VSA1 for the phase A, and the first horizontal tube 322B for the phase B is arranged on the intersecting line between the first horizontal plane HS1 and the vertical arrangement plane VSB1 for the phase B, and the first horizontal tube 322C for the phase C is arranged on the intersecting line between the first horizontal plane HS1 and the vertical arrangement plane VSC1 for the phase C.

As shown in FIG. 7A, FIG. 7B and FIG. 7C, third vertical tubes 332A, 332B and 332C for the phase A, the phase B and the phase C are vertically connected to the upper ends of the second vertical tubes 331A, 331B and 331C for the respective phases respectively. The third vertical tubes 332A, 332B and 332C are vertically connected to the upper ends of the second vertical tubes 331A, 331B and 331C for the respective phases with the respective axial lines thereof positioned on the second vertical plane VS2. More specifically, as shown in FIG. 7A, the third vertical tube 332A for the phase A is connected to the second vertical tube 331A for the phase A with the axial line thereof positioned on the intersecting line between the second vertical plane VS2 and the vertical arrangement plane VSA1 for the phase A. As shown in FIG. 7B, the third vertical tube 332B for the phase B is connected to the second vertical tube 331B for the phase B with the axial line thereof positioned on the intersecting line between the second vertical plane VS2 and the vertical arrangement plane VSB1 for the phase B. Likewise, as shown in FIG. 7C, the third vertical tube 332C for the phase C is connected to the second vertical tube 331C for the phase C with the axial line thereof positioned on the intersecting line between the second vertical plane VS2 and the vertical arrangement plane VSC1 for the phase C.

As shown in FIG. 7A, FIG. 7B and FIG. 7C, second horizontal tubes 333A, 333B and 333C respectively for the phase A, the phase B and the phase C are connected to the upper ends of the third vertical tubes 332A, 332B and 332C for the respective phases. The second horizontal tubes 333A, 333B and 333C for the respective phases are extended horizontally toward the circuit wiring space CS along the first direction (the x-axis direction) on a third horizontal plane HS3 positioned in parallel with the first horizontal plane HS1 above the first horizontal plane HS1. More specifically, the second horizontal tube 333A for the phase A is arranged on the intersecting line between the third horizontal plane HS3 and the vertical arrangement plane VSA1 for the phase A, and the second horizontal tube 333B for the phase B is arranged on the intersecting line between the third horizontal plane HS3 and the vertical arrangement plane VSB1 for the phase B, and the second horizontal tube 333C for the phase C is arranged on the intersecting line between the third horizontal plane HS3 and the vertical arrangement plane VSC1 for the phase C. The vertical distance between the first horizontal plane HS1 and the third horizontal plane HS3 is $\alpha$.

The first circuit wiring module 350 includes first circuit wirings 351A, 351B and 351C respectively for the phase A, the phase B and the phase C, and the first circuit wirings 351A, 351B and 351C for the respective phases are configured respectively of the gas-insulated buses. The second circuit wiring module 360 includes second circuit wirings 361A, 361B and 361C respectively for the phase A, the phase B and the phase C, and the second circuit wirings for the respective phases are configured respectively with the gas-insulated buses.

In the first gas-insulated switching unit 300, the first circuit wirings 351A, 351B and 351C for the respective phases of the first circuit wiring module 350 and the second circuit wirings 361A, 361B and 361C for the respective phases of the second circuit wiring module 360 are arranged compactly in the circuit wiring space CS above the horizontal arrangement plane HS0 while commonly using part of the circuit arrangement lines L1, L2, L3 and L4. The circuit arrangement lines L1, L2, L3 and L4 are straight orthogonal to the respective vertical arrangement planes VSA1, VSB1 and VSC1 for the phase A, the phase B and the phase C along the second direction (the y-axis direction) in the circuit wiring space CS, and are set to extend in parallel to each other.

As regards the circuit arrangement lines L1, L2, L3 and L4, as shown in FIG. 6. FIG. 7A, FIG. 7B and FIG. 7C, the third vertical plane VS3 in parallel thereto is set between the first vertical plane VS1 and the second vertical plane VS2. The third vertical plane VS3 is positioned specifically just at a midpoint between the first vertical plane VS1 and the second vertical plane VS2, and is a vertical plane passing through the center points P of the respective reference axial lengths LS of the gas circuit breakers 311A, 311B and 311C for the respective phases. The horizontal distance between the third vertical plane VS3 and the first vertical plane VS1 is $2\alpha$, and the horizontal distance between the third vertical plane VS3 and the second vertical plane VS2 is also $2\alpha$. The fourth vertical plane VS4 is set between the first vertical plane VS1 and the third vertical plane VS3 so as to extend in parallel thereto. The fourth vertical plane VS4 is positioned just at a midpoint between the first vertical plane VS1 and the third vertical plane VS3. The horizontal distance between the fourth vertical plane VS4 and the first vertical plane VS1 is $\alpha$, and the horizontal distance between the fourth vertical plane VS4 and the third vertical plane VS3 is also $\alpha$.

The circuit arrangement lines L1, L2 and L4 are positioned on the third vertical plane VS3 in parallel to each other. The circuit arrangement line L1 is positioned on the intersecting line between the first horizontal plane HS1 and the third vertical plane VS3. The circuit arrangement line L4 is positioned on the intersecting line between the third horizontal plane HS3 and the third vertical plane VS3. On the third vertical plane VS3, the circuit arrangement line L1 is positioned at a midpoint between the circuit arrangement lines L2 and L4, the circuit arrangement line L2 is positioned right below the circuit arrangement line L1, and the circuit arrangement line L4 is positioned right above the circuit arrangement line L2. The vertical distance between the circuit arrangement lines L1 and L2 is $\alpha$, and the vertical distance between the circuit arrangement lines L1 and L4 is also $\alpha$. The circuit arrangement line L3 is arranged so as to be positioned on the fourth vertical plane VS4.

The circuit arrangement lines L1, L2 and L3 are arranged at the respective apexes of a right angled isosceles triangle respectively. Between the circuit arrangement line L1 and the circuit arrangement line L3 corresponds to an oblique line of a right angled isosceles triangle, that is, a long side. The circuit arrangement lines L1 and L2 are positioned at both ends of the first short side of the right angled isosceles triangle. The circuit arrangement lines L2 and L3 are arranged at both ends of the second short side of the right angled isosceles triangle. The horizontal distance between the circuit arrangement lines L2 and L3 is also α.

As shown in FIG. 7A and FIG. 8, the first circuit wiring 351A for the phase A of the first circuit wiring module 350 is positioned on the circuit arrangement line L1, and extends above the gas circuit breaker 311A for the phase A, but does not extend above the gas circuit breakers 311B and 311C for the phase B and the phase C. As shown in FIG. 7A, FIG. 7B and FIG. 8, the first circuit wiring 351B for the phase B of the first circuit wiring module 350 is positioned on the circuit arrangement line L2, and extends above the gas circuit breakers 311A and 311B for the phase A and the phase B, but does not extend above the gas circuit breaker 311C for the phase C. The first circuit wiring 351C for the phase C of the first circuit wiring module 350 is positioned on the circuit arrangement line L3 as shown in FIG. 7A, FIG. 7B, FIG. 7C and FIG. 8, and extends above the gas circuit breakers 311A, 311B and 311C for the phase A, the phase B and the phase C.

As shown in FIG. 7A, FIG. 7B, FIG. 7C and FIG. 8, the second circuit wiring 361A for the phase A of the second circuit wiring module 360 is positioned on the circuit arrangement line L4, and extends above the gas circuit breakers 311A, 311B and 311C for the phase A, the phase B and the phase C. As shown in FIG. 7B, FIG. 7C and FIG. 8, although the second circuit wiring 361B for the phase B of the second circuit wiring module 360 is positioned on the circuit arrangement line L1 coaxially with the first circuit wiring 351A for the phase A and extend above the gas circuit breakers 311B and 311C for the phase B and the phase C, but does not extend above the gas circuit breaker 311A where the first circuit wiring 351A for the phase A extends. Also, as shown in FIG. 7C and FIG. 8, the second circuit wiring 361C for the phase C of the second circuit wiring module 360 is positioned on the circuit arrangement line L2 coaxially with the first circuit wiring 351B for the phase B and extends above the gas circuit breaker 311C for the phase C, but does not extend above the gas circuit breakers 311A and 311B for the phase A and the phase B over which the first circuit wiring 351B for the phase B extends.

As shown in FIG. 7A, the first circuit wiring 351A for the phase A of the first circuit wiring module 350 is connected to the left end portion of the gas circuit breaker 311A for the phase A through a connecting tube 352A for connecting the first circuit wiring 351A for the phase A and the first horizontal tube 322A, the first horizontal tube 322A for the phase A, and the first vertical tube 321A. The second circuit wiring 361A for the phase A of the second circuit wiring module 360 is connected to the right end portion of the gas circuit breaker 311A for the phase A through a connecting tube 362A for connecting the second circuit wiring 361A for the phase A and the second horizontal tube 333A, the second horizontal tube 333A for the phase A, the third vertical tube 332A, and the second vertical tube 331A. The electric connection between the first circuit wiring 351A for the phase A and the second circuit wiring 361A is opened and closed by the gas circuit breaker 311A for the phase A. The connecting tubes 352A and 362A are configured with gas-insulated connecting tubes.

As shown in FIG. 7B, the first circuit wiring 351B for the phase B of the first circuit wiring module 350 is connected to the left end portion of the gas circuit breaker 311B for the phase B through a connecting tube 352B for connecting the first circuit wiring 351B for the phase B and the first horizontal tube 322B, the first horizontal tube 322B for the phase B, and the first vertical tube 321B. The second circuit wiring 361B for the phase B of the second circuit wiring module 360 is connected to the right end portion of the gas circuit breaker 311B for the phase B through connecting tubes 362B and 363B for connecting the second circuit wiring 361B for the phase B and the second horizontal tube 333B, the second horizontal tube 333B for the phase B, the third vertical tube 332B and the second vertical tube 331B. The electric connection between the first circuit wiring 351B for the phase B and the second circuit wiring 361B is opened and closed by the gas circuit breaker 311B for the phase B. The connecting tubes 352B, 362B and 363B are also configured with the gas-insulated connecting tubes.

As shown in FIG. 7C, the first circuit wiring 351C of the phase C of the first circuit wiring module 350 is connected to the left end portion of the gas circuit breaker 311C for the phase C through a connecting tube 352C for connecting the first circuit wiring 351C for the phase C and the first horizontal tube 322C, the first horizontal tube 322C for the phase C and the first vertical tube 321C. The second circuit wiring 361C for the phase C of the second circuit wiring module 360 is connected to the right end portion of the gas circuit breaker 311C for the phase C through connecting tubes 362C, 363C and 364C for connecting the second circuit wiring 361C for the phase C and the second horizontal tube 333C, the second horizontal tube 333C for the phase C, the third vertical tube 332C and the second vertical tube 331C. The electric connection between the first circuit wiring 351C for the phase C and the second circuit wiring 361C is opened and closed by the gas circuit breaker 311C for the phase C. The connecting tubes 352C, 362C, 363C and 364C are configured with the gas-insulated connecting tubes.

The first horizontal tubes 322A, 322B and 322C for the respective phases include the disconnect switches DS corresponding respectively to the first circuit wirings 351A, 351B and 351C for the respective phases of the first circuit wiring module 350 integrated therein. The first vertical tubes 321A, 321B and 321C for the respective phases include the instrument current transformers CT corresponding to the first circuit wirings 351A, 351B and 351C for the respective phases of the first circuit wiring module 350 integrated therein respectively.

The second horizontal tubes 333A, 333B and 333C for the respective phases include the disconnect switches DS corresponding respectively to the second circuit wirings 361A, 361B and 361C for the respective phases of the second circuit wiring module 360 integrated therein. The second vertical tubes 331A, 331B and 331C for the respective phases include the instrument current transformers CT corresponding to the second circuit wirings 361A, 361B and 361C for the respective phases of the second circuit wiring module 360 integrated therein.

With the first gas-insulated switching unit 300 according to Embodiment 2, the gas circuit breaker 311A for the phase A opens and closes the electric connection between the first circuit wiring 351A for the phase A of the first circuit wiring module 350, and the second circuit wiring 361A for the phase A of the second circuit wiring module 360. The gas circuit breaker 311B for the phase B opens and closes the electric connection between the first circuit wiring 351B for the phase B of the first circuit wiring module 350 and the second circuit wiring 361B for the phase B of the second circuit wiring module 360. Likewise, the gas circuit breaker 311C for the phase C opens and closes the electric connection between the first circuit wiring 351C for the phase C of the first circuit wiring module 350 and the second circuit wiring 361C for the phase C of the second circuit wiring module 360.

Referring now to FIG. 9, FIG. 10, FIG. 11A, FIG. 11B, FIG. 11C and FIG. 12, the second gas-insulated switching unit 400 according to Embodiment 2 will be described. FIG.

Figure 9:
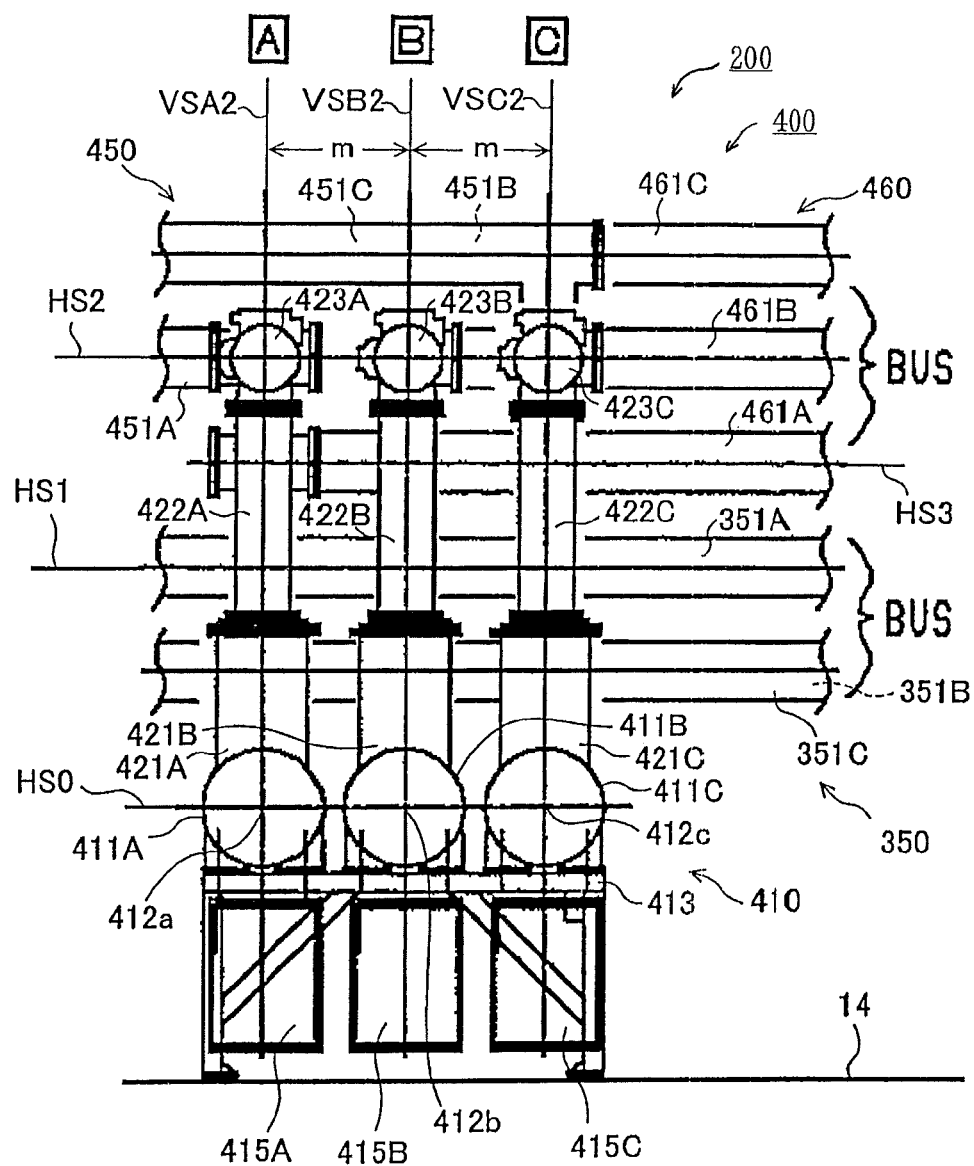
FIG. 9 shows a left side view of a second gas-insulated switching unit of the gas-insulated switching apparatus according to Embodiment 2 of the present invention.
Figure 10:
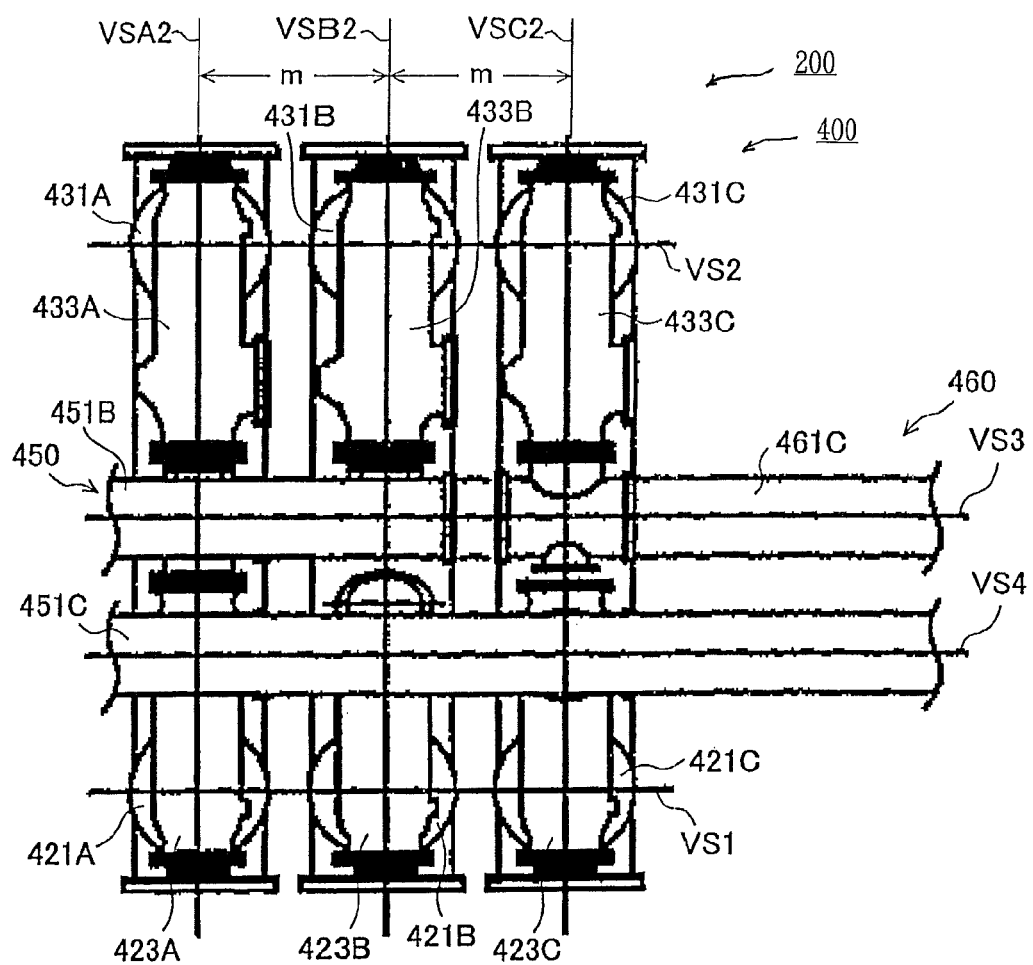
FIG. 10 is a plan view of the second gas-insulated switching unit according to Embodiment 2.
Figure 11A:
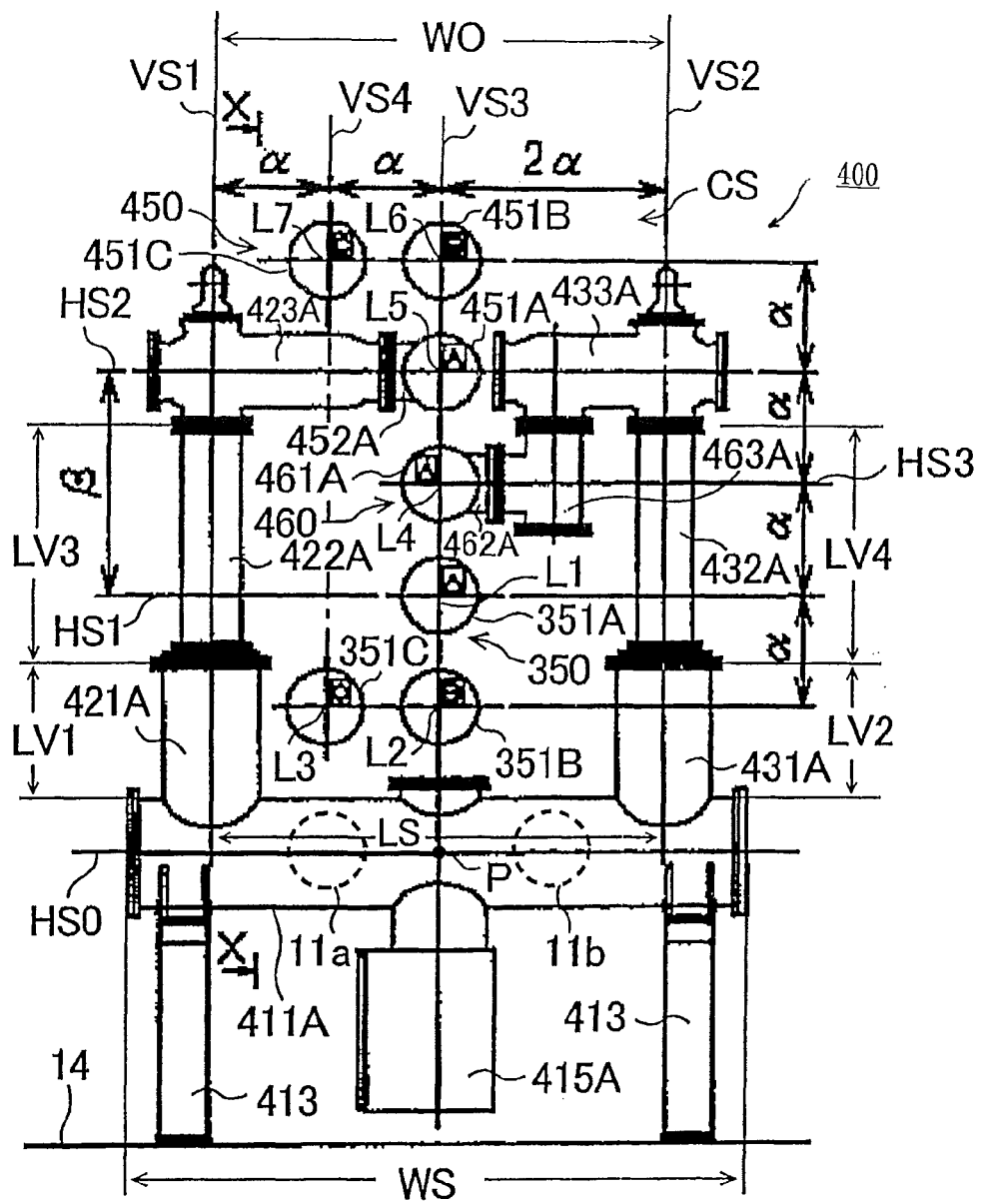
FIG. 11A is a front view corresponding to a vertical arrangement plane for the phase A of the second gas-insulated switching unit according to Embodiment 2.
Figure 11B:
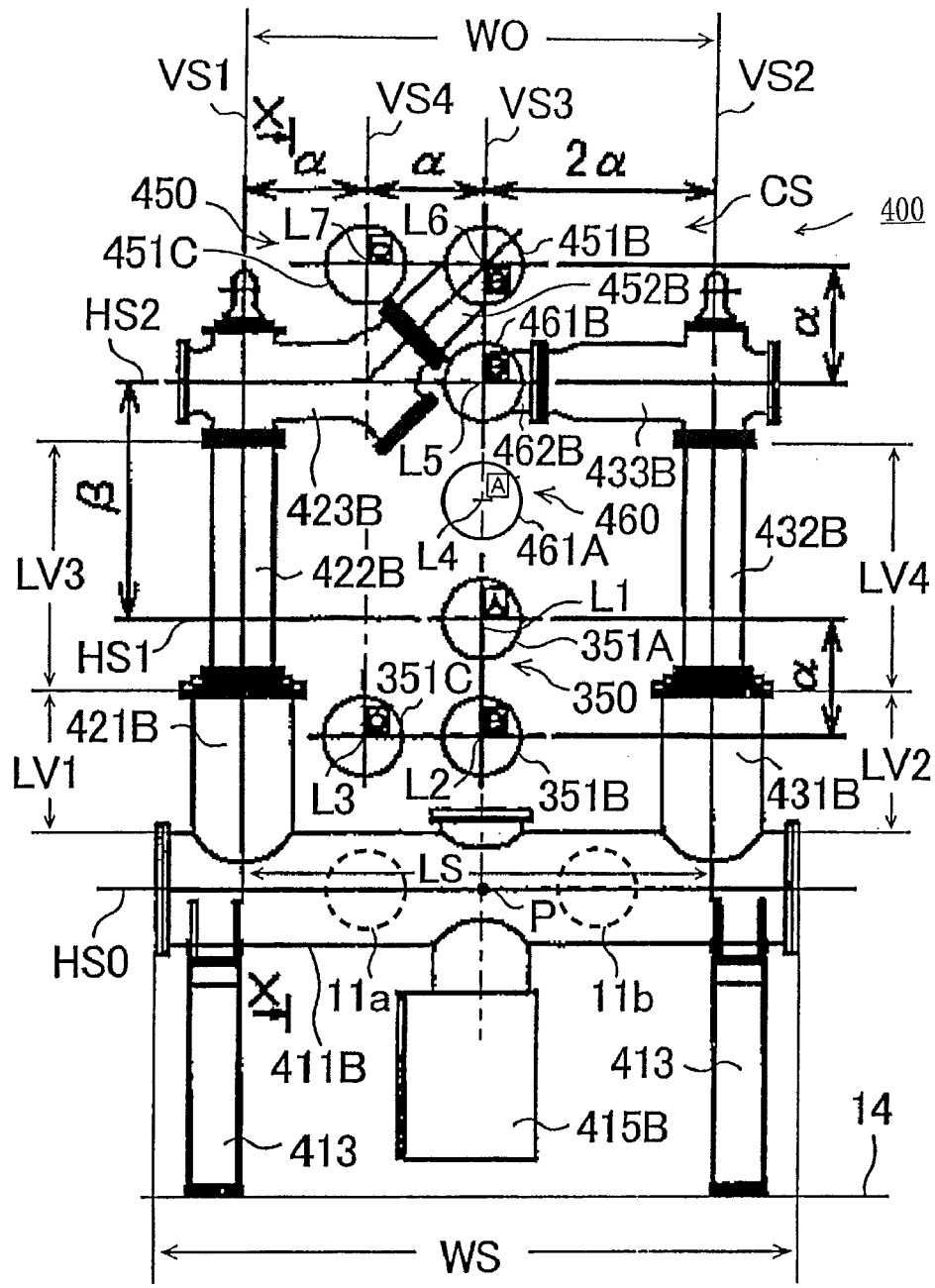
FIG. 11B is a front view corresponding to a vertical arrangement plane for the phase B of the second gas-insulated switching unit according to Embodiment 2.
Figure 11C:
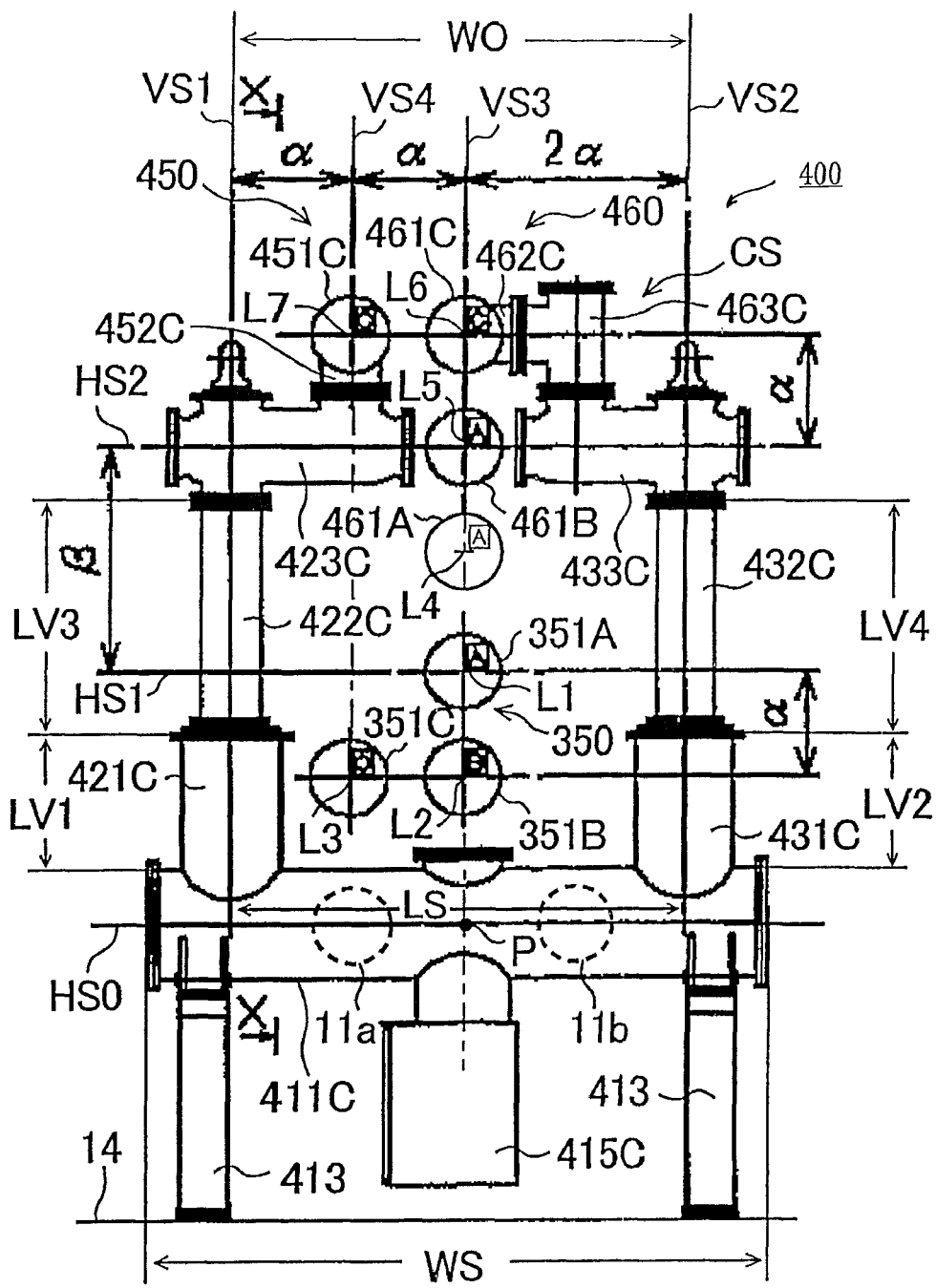
FIG. 11C is a front view corresponding to a vertical arrangement plane for the phase C of the first gas-insulated switching unit according to Embodiment 2.
Figure 12:
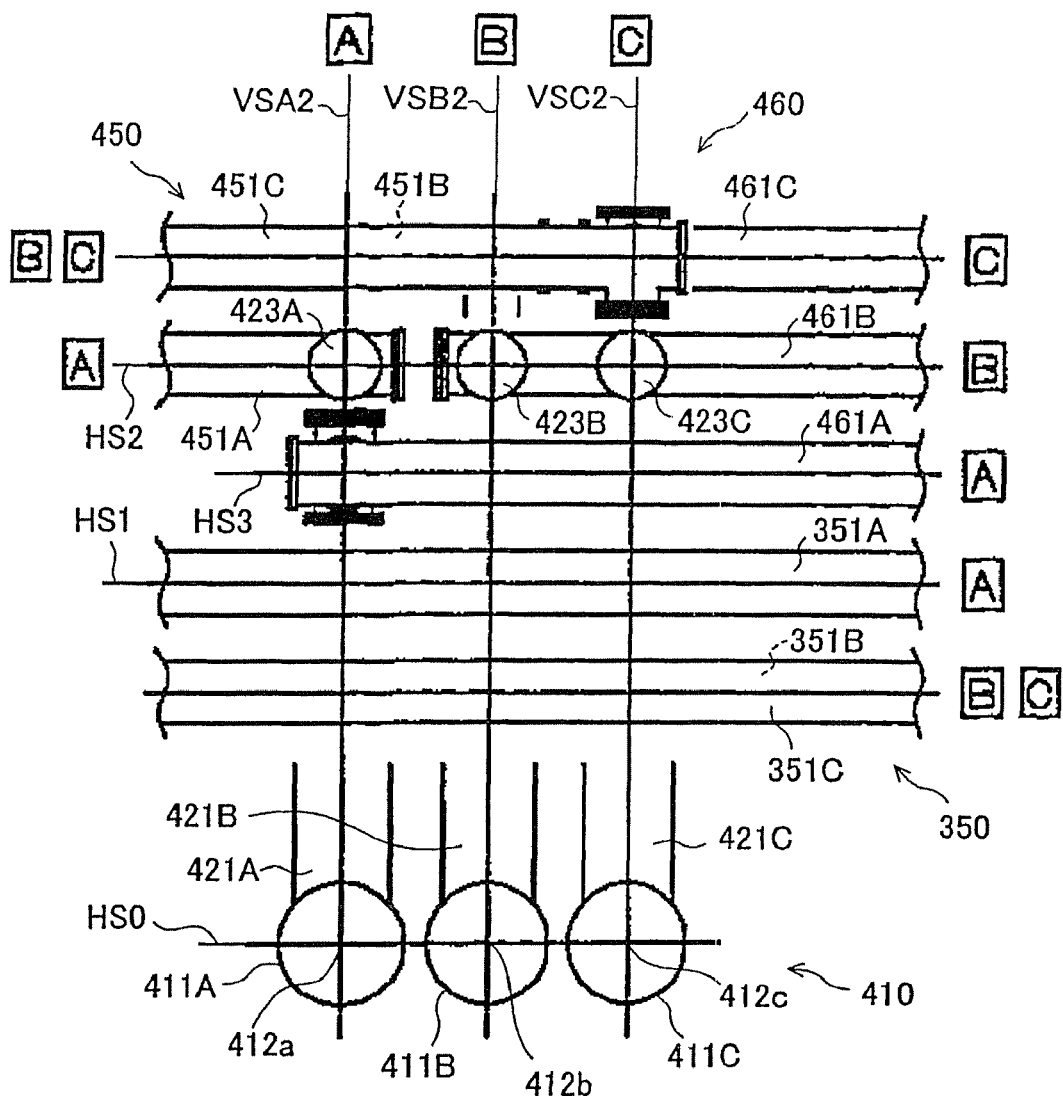
FIG. 12 is a cross-sectional view taken along the line X-X in FIGS. 11A, 11B and 11C.

9, FIG. 10, FIG. 11A, FIG. 11B, FIG. 11C and FIG. 12 show the second gas-insulated switching unit 400. FIG. 9 shows a left side view thereof, FIG. 10 is a plan view thereof, FIG. 11A is a front view corresponding to a vertical arrangement plane VSA2 for the phase A, FIG. 11B is a front view corresponding to a vertical arrangement plane VS for the phase B, FIG. 11C is a front view corresponding to a vertical arrangement plane VSC2 for the phase C, and FIG. 12 is a cross-sectional view taken along the line X-X in FIG. 11A, FIG. 11B and FIG. 11C.

The second gas-insulated switching unit 400 includes the second breaker module 410, the third circuit wiring module 450, and the fourth circuit wiring module 460. The second gas-insulated switching unit 400 is configured basically in the same idea as the gas-insulated switching apparatus 100 according to Embodiment 1 as in the case of the first gas-insulated switching unit 300. The third and fourth circuit wiring modules 450 and 460 are modified from the first and second circuit wiring modules 50 and 60 in Embodiment 1 for configuring the bus sectionalizing unit.

The second breaker module 410 of the second gas-insulated switching unit 400 is configured in the same style as the breaker module 10 in Embodiment 1. The breaker module 410 includes a gas circuit breaker 411A for the phase A, a gas circuit breaker 411B for the phase B, a gas circuit breaker 411C for the phase C and a common base mount 413. The base mount 413 is fixed to the mounting surface 14 as shown in FIG. 9, FIG. 11A, FIG. 11B and FIG. 11C. The mounting surface 14 is the same as the mounting surface 14 of the first gas-insulated switching unit 300. The base mount 413 may be commonly used by extending the base mount 313 in the first gas-insulated switching unit 300. The gas circuit breakers 411A, 411B and 411C for the respective phases are fixed to the base mount 413. The gas circuit breakers 411A, 411B and 411C for the respective phases are configured into a cylindrical shape and, as shown in FIG. 9 and FIG. 12, have axial lines 412a, 412b and 412c respectively. The gas circuit breakers 411A, 411B and 411C for the respective phases are arranged on the horizontal arrangement plane HS0, and are mounted to the base mount 413. The horizontal arrangement plane HS0 is the same plane as the horizontal arrangement plane HS0 in the first gas-insulated switching unit 300.

It is assumed that the horizontal arrangement plane HS0 exists on the xy plane of the three-axis orthogonal coordinate which is assumed in order to describe the configuration of the gas-insulated switching apparatus 200 in Embodiment 2. The gas circuit breakers 411A, 411B and 411C for the respective phases of the second breaker module 410 of the second gas-insulated switching unit 400 are arranged in such a manner that the respective axial lines 412a, 412b and 412c are positioned on the xy plane together with the horizontal arrangement plane HS0 as shown in FIG. 9 and FIG. 12, and the respective axial lines 412a, 412b and 412c extend substantially in parallel to each other along the first direction. The first direction here corresponds to the direction of the x-axis in the three-axis orthogonal coordinate.

As regards the second gas-insulated switching unit 400, as shown in FIG. 9, FIG. 10 and FIG. 12, a vertical arrangement plane VSA2 for the phase A, a vertical arrangement plane VS for the phase B and a vertical arrangement plane VSC2 for the phase C are set. The vertical arrangement plane VSA2 for the phase A is a vertical plane vertical to the horizontal arrangement plane HS0 and including the axial line 412a of the gas circuit breaker 411A for the phase A. The vertical arrangement plane VS for the phase B is a vertical plane vertical to the horizontal arrangement plane HS0 and including the axial line 412b of the gas circuit breaker 411B for the phase B. The vertical arrangement plane VSC2 for the phase C is a vertical plane vertical to the horizontal arrangement plane HS0 and including the axial line 412c of the gas circuit breaker 411C for the phase C. The vertical arrangement planes VSA2, VS and VSC2 for the phase A, the phase B and the phase C are in parallel to the xz plane of the three-axis orthogonal coordinate, and are vertical planes extending in parallel to the vertical arrangement planes VSA1, VSB1 and VSC1 for the respective phases of the first gas-insulated switching unit 300, respectively. The phase distance m between the vertical arrangement planes VSA2 and VS and the phase distance m between the vertical arrangement planes VS and VSC2 are the same as shown in FIG. 9 and FIG. 10. These phase distances m are the same as the phase distances m in the first gas-insulated switching unit 300.

Fourth vertical tubes 421A, 421B and 421C respectively for the phase A, the phase B and the phase C are connected vertically to the left end portions of the gas circuit breakers 411A, 411B and 411C for the respective phases of the second breaker module 410. Likewise, fifth vertical tubes 431A, 431B and 431C for the phase A, the phase B and the phase C are connected vertically to the right end portions of the gas circuit breakers 411A, 411B and 411C for the respective phases. First and second vertical planes VS1 and VS2 are set for the second gas breaker module 410. The first vertical plane VS1 is a vertical plane extending vertically to the horizontal arrangement plane HS0 and intersecting the left end portions of the gas circuit breakers 411A, 411B, and 411C for the respective phases. The second vertical plane VS2 is a vertical plane extending vertically to the horizontal arrangement plane HS0 and intersecting the right end portions of the gas circuit breakers 411A, 411B and 411C for the respective phases. The first and second vertical planes VS1 and VS2 extend in parallel with the yz plane, and are parallel to each other, so as to extend orthogonally to the vertical arrangement planes VSA2, VS and VSC2 for the phase A, the phase B and the phase C respectively. These first and second vertical planes VS1 and VS2 are vertical planes set as the same planes as the first and second vertical planes VS1 and VS2 in the first gas-insulated switching unit 300, respectively, and formed between the first and second vertical planes VS1 and VS2 is the circuit wiring space CS above the second breaker module 410. The circuit wiring space CS is an extension of the circuit wiring space CS in the first gas-insulated switching unit 300, and the width WO in the horizontal direction thereof is the same as the distance between the first and second vertical planes VS1 and VS2, extends across the vertical arrangement planes VSA2, VS and VSC2 for the phase A, the phase B and the phase C, and extends between the first and second vertical planes VS1 and VS2.

The fourth vertical tubes 421A, 421B and 421C are connected vertically to the left end portions of the gas circuit breakers 411A, 411B and 411C for the respective phases with the respective axial lines thereof positioned on the first vertical plane VS1. More specifically, as shown in FIG. 10, the fourth vertical tube 421A for the phase A is connected to the left end portion of the gas circuit breaker 411A for the phase A with the axial line thereof positioned on the intersecting line between the first vertical plane VS1 and the vertical arrangement plane VSA2 for the phase A. As shown in FIG. 10, the fourth vertical tube 421B for the phase B is connected to the left end portion of the gas circuit breaker 411B for the phase B with the axial line thereof positioned on the intersecting line between the first vertical plane VS1 and the vertical arrangement plane VS for the phase B. Likewise, as shown in FIG. 10, the fourth vertical tube 421C for the phase C is connected to the left end portion of the gas circuit breaker 411C for the phase C with the axial line thereof positioned on the intersecting line between the first vertical plane VS1 and the vertical arrangement plane VSC2 for the phase C.

The fifth vertical tubes 431A, 431B and 431C are connected vertically to the right end portions of the gas circuit breakers 411A, 411B and 411C for the respective phases with the respective axial lines thereof positioned on the second vertical plane VS2. More specifically, as shown in FIG. 10, the fifth vertical tube 431A for the phase A is connected to the right end portion of the gas circuit breaker 411A for the phase A with the axial line thereof positioned on the intersecting line between the second vertical plane VS2 and the vertical arrangement plane VSA2 for the phase A. As shown in FIG. 10, the fifth vertical tube 431B for the phase B is connected to the right end portion of the gas circuit breaker 411B for the phase B with the axial line thereof positioned on the intersecting line between the second vertical plane VS2 and the vertical arrangement plane VS for the phase B. Likewise, as shown in FIG. 10, the fifth vertical tube 431C for the phase C is connected to the right end portion of the gas circuit breaker 411C for the phase C with the axial line thereof positioned on the intersecting line between the second vertical plane VS2 and the vertical arrangement plane VSC2 for the phase C.

The fourth vertical tubes 421A, 421B and 421C for the respective phases have the same vertical length LV1, and the vertical length LV1 is the same as the vertical length LV1 of the first gas-insulated switching unit 300. Also, the fifth vertical tubes 431A, 431B and 431C for the respective phases have the same vertical length LV2, and the vertical length LV2 is also the same as the vertical length LV2 of the first gas-insulated switching unit 300. The vertical length LV1 and the vertical length LV2 are set to the same length and hence the relation LV1=LV2 is satisfied.

The gas circuit breakers 411A, 411B and 411C for the respective phases have reference axial lengths LS respectively between the first and second vertical planes VS1 and VS2. The reference axial lengths LS of the gas circuit breakers 411A, 411B and 411C for the respective phases are set to the same length. The reference axial length LS is the same length as the reference axial length LS in first gas-insulated switching unit 300. The gas circuit breakers 411A, 411B and 411C for the respective phases have center points P of the respective reference axial lengths LS, and are arranged so that center points P of the respective axial lengths LS of the gas circuit breakers 411A, 411B and 411C for the respective phases arranged in line in the second direction (the y-axis direction). The center points P of the reference axial lengths LS of the gas circuit breakers 411A, 411B and 411C for the respective phases are arranged also on the straight line which is the same as the center points P of the reference axial lengths LS of the gas circuit breakers 311A, 311B and 311C for the respective phases in the first gas-insulated switching unit 300. Consequently, the arrangement space width WS defined by both ends of the gas circuit breakers 411A, 411B and 411C for the respective phases are the same as the arrangement space width WS in the first gas-insulated switching unit 300, which is the lengths obtained by adding the lengths of the both end portions of the gas circuit breakers 411A, 411B and 411C for the respective phases to the reference axial lengths LS of the gas circuit breakers 411A, 411B and 411C for the respective phases, and the gas circuit breakers 411A, 411B and 411C for the respective phases are arranged compactly in the arrangement space width WS.

The gas circuit breakers 411A, 411B and 411C for the respective phases are each configured with a gas circuit breaker referred to as "double-points-break" type and, as shown respectively in FIG. 11A, FIG. 11B and FIG. 11C, include two breaking open-close switches 11a and 11b in the interior thereof. The breaking open-close switches 11a and 11b are arranged respectively along the axial lines 412a, 412b and 412c in the interior of the gas circuit breakers 411A, 411B and 411C for the respective phases and are connected to each other in series. As shown specifically in FIG. 9, FIG. 11A, FIG. 11B and FIG. 11C, switch drive mechanisms 415A, 415B and 415C are mounted to the lower portions of the gas circuit breakers 411A, 411B and 411C for the respective phases. The switch drive mechanisms 415A, 415B and 415C drive the respective breaking open-close switches 11a and 11b of the gas circuit breakers 411A, 411B and 411C for the respective phases so as to open and close simultaneously. Since the gas circuit breakers 411A, 411B and 411C for the respective phases each include the two breaking open-close switches 11a and 11b arranged along the axial lines 412a, 412b and 412c and connected in series, the respective reference axial lengths LS have relatively large dimensions, and the circuit wiring space CS has also a relatively large dimension.

As shown in FIG. 9, FIG. 11A, FIG. 11B, FIG. 11C and FIG. 12, sixth vertical tubes 422A, 422B and 422C respectively for the phase A, the phase B and the phase C are vertically connected to the upper ends of the fourth vertical tubes 421A, 421B and 421C for the respective phases. The sixth vertical tubes 422A, 422B and 422C are vertically connected to the upper ends of the fourth vertical tubes 421A, 421B and 421C for the respective phases with the respective axial lines thereof positioned on the first vertical plane VS1. More specifically, the sixth vertical tube 422A for the phase A is connected to the fourth vertical tube 421A for the phase A with the axial line thereof positioned on the intersecting line between the first vertical plane VS1 and the vertical arrangement plane VSA2 for the phase A. The sixth vertical tube 422B for the phase B is connected to the fourth vertical tube 421A for the phase B with the axial line thereof positioned on the intersecting line between the first vertical plane VS1 and the vertical arrangement plane VS for the phase B. Likewise, the sixth vertical tube 423C for the phase C is connected to the fourth vertical tube 421C for the phase C with the axial line thereof positioned on the intersecting line between the first vertical plane VS1 and the vertical arrangement plane VSC2 for the phase C.

As shown in FIG. 9, FIG. 11A, FIG. 11B, FIG. 11C and FIG. 12, third horizontal tubes 423A, 423B and 423C respectively for the phase A, the phase B and the phase C are connected to the upper ends of the sixth vertical tubes 422A, 422B and 422C for the respective phases. The third horizontal tubes 423A, 423B and 423C for the respective phases are extended horizontally toward the circuit wiring space CS along the first direction (the x-axis direction) on the second horizontal plane HS2 parallel to the horizontal arrangement plane HS0 respectively. The second horizontal plane HS2 is set above the third horizontal plane HS3 of the first gas-insulated switching unit 300. The vertical distance between the second horizontal plane HS2 and the third horizontal plane HS3 is $\alpha$, and the vertical distance between the second horizontal plane HS2 and the first horizontal plane HS1 of the first gas-insulated switching unit 300 is $\beta$. The distance $\beta$ is set to satisfy the relation $2\alpha \leq \beta \leq 3\alpha$. The third horizontal tube 423A for the phase A is, as shown in FIG. 12, arranged on the intersecting line between the second horizontal plane HS2 and the vertical arrangement plane VSA2 for the phase A, and the third horizontal tube 423B for the phase B is arranged on the intersecting line between the second horizontal plane HS2 and the vertical arrangement plane VS for the phase B, and the third horizontal tube 423C for the phase C is arranged on the intersecting line between the second horizontal plane HS2 and the vertical arrangement plane VSC2 for the phase C.

As shown in FIG. 11A, FIG. 11B and FIG. 11C, seventh vertical tubes 432A, 432B and 432C respectively for the phase A, the phase B and the phase C are vertically connected to the upper ends of the fifth vertical tubes 431A, 431B and 431C for the respective phases. The seventh vertical tubes 432A, 432B and 432C are vertically connected to the upper ends of the fifth vertical tubes 431A, 431B and 431C for the respective phases with the respective axial lines thereof positioned on the second vertical plane VS2. More specifically, the seventh vertical tube 432A for the phase A is connected to the fifth vertical tube 431A for the phase A with the axial line thereof positioned on the intersecting line between the second vertical plane VS2 and the vertical arrangement plane VSA2 for the phase A. The seventh vertical tube 432B for the phase B is connected to the fifth vertical tube 431B for the phase B with the axial line thereof positioned on the intersecting line between the second vertical plane VS2 and the vertical arrangement plane VS for the phase B. Likewise, the seventh vertical tube 432C for the phase C is connected to the fifth vertical tube 431C for the phase C with the axial line thereof positioned on the intersecting line between the second vertical plane VS2 and the vertical arrangement plane VSC2 for the phase C.

As shown in FIG. 11A, FIG. 11B and FIG. 11C, fourth horizontal tubes 433A, 433B and 433C respectively for the phase A, the phase B and the phase C are connected to the upper ends of the seventh vertical tubes 432A, 432B and 432C for the respective phases. The fourth horizontal tubes 433A, 433B and 433C for the respective phases are extended horizontally toward the circuit wiring space CS along the first direction (the x-axis direction) on the second horizontal plane HS2 respectively. More specifically, the fourth horizontal tube 433A for the phase A is arranged on the intersecting line between the second horizontal plane HS2 and the vertical arrangement plane VSA2 for the phase A, and the fourth horizontal tube 433B for the phase B is arranged on the intersecting line between the second horizontal plane HS2 and the vertical arrangement plane VS for the phase B, and the fourth horizontal tube 433C for the phase C is arranged on the intersecting line between the second horizontal plane HS2 and the vertical arrangement plane VSC2 for the phase C.

The sixth vertical tubes 422A, 422B and 422C for the respective phases have the same vertical length LV3, and the vertical length LV3 is longer than the vertical length LV1 of the fourth vertical tubes 421A, 421B and 421C for the respective phases. The seventh vertical tubes 432A, 432B and 432C for the respective phases have the same vertical length LV4, and the vertical length LV4 is longer than the vertical length LV2 of the fifth vertical tubes 431A, 431B and 431C for the respective phases. The vertical length LV3 and the vertical length LV4 are set to the same length and hence the relation LV3=LV4 is satisfied.

The third circuit wiring module 450 includes third circuit wirings 451A, 451B and 451C respectively for the phase A, the phase B and the phase C, and the third circuit wirings 451A, 451B and 451C for the respective phases are configured respectively of the gas-insulated bus. The fourth circuit wiring module 460 includes fourth circuit wirings 461A, 461B and 461C respectively for the phase A, the phase B and the phase C, and the fourth circuit wirings for the respective phases are configured respectively with the gas-insulated buses.

In the second gas-insulated switching unit 400, the third circuit wirings 451A, 451B and 451C for the respective phases of the third circuit wiring module 450 and the fourth circuit wirings 461A, 461B and 461C for the respective phases of the fourth circuit wiring module 460 are arranged compactly in the circuit wiring space CS above the horizontal arrangement plane HS0 while commonly using part of the circuit arrangement lines L4, L5, L6 and L7 for the three phases. The circuit arrangement line L4 is a circuit arrangement line set as shown in FIG. 7A, FIG. 7B, FIG. 7C and FIG. 8 as regards the first gas-insulated switching unit 300. The circuit arrangement lines L5, L6 and L7 are straight orthogonal to the respective vertical arrangement planes VSA1, VSB1 and VSC1 for the phase A, the phase B and the phase C along the second direction (the y-axis direction) in the circuit wiring space CS, and are set to extend in parallel to each other.

The circuit arrangement lines L5 and L6 are positioned on the third vertical plane VS3 in parallel to each other. The circuit arrangement line L5 is positioned on the intersecting line between the second horizontal plane HS2 and the third vertical plane VS3. The circuit arrangement line L5 is positioned right above the circuit arrangement line L4, and the circuit arrangement line L6 is positioned right above the circuit arrangement line L5. The vertical distance between the circuit arrangement lines L5 and L4 is α, and the vertical distance between the circuit arrangement lines L5 and L6 is also α. The circuit arrangement line L7 is arranged so as to be positioned on the fourth vertical plane VS4. The horizontal distance between the circuit arrangement lines L6 and L7 is also α.

The circuit arrangement lines L5, L6 and L7 are arranged at the respective apexes of the right angled isosceles triangle respectively. Between the circuit arrangement line L5 and the circuit arrangement line L7 corresponds to an oblique line of a right angled isosceles triangle, that is, a long side. The circuit arrangement lines L5 and L6 are positioned at both ends of the first short side of the right angled isosceles triangle. The circuit arrangement lines L6 and L7 are arranged at both ends of the second short side of the right angled isosceles triangle.

As shown in FIG. 11A and FIG. 12, the third circuit wiring 451A for the phase A of the third circuit wiring module 450 is positioned on the circuit arrangement line L5, and extends above the gas circuit breaker 411A for the phase A, but does not extend above the gas circuit breakers 411B and 411C for the phase B and the phase C. As shown in FIG. 11A, FIG. 11B and FIG. 12, the third circuit wiring 451B for the phase B of the third circuit wiring module 450 is positioned on the circuit arrangement line L6, and extends above the gas circuit breakers 411A and 411B for the phase A and the phase B, but does not extend above the gas circuit breaker 411C for the phase C. The third circuit wiring 451C for the phase C of the third circuit wiring module 450 is positioned on the circuit arrangement line L7 as shown in FIG. 11A, FIG. 11B, FIG. 11C and FIG. 12, and extends above the gas circuit breakers 411A, 411B and 411C for the phase A, the phase B and the phase C.

As shown in FIG. 11A, FIG. 11B, FIG. 11C and FIG. 12, the fourth circuit wiring 461A for the phase A of the fourth circuit wiring module 460 is positioned on the circuit arrangement line L4, and extends above the gas circuit breakers 411A, 411B and 411C for the phase A, the phase B and the phase C. As shown in FIG. 11B, FIG. 11C and FIG. 12, although the fourth circuit wiring 461B for the phase B of the fourth circuit wiring module 460 is positioned on the circuit arrangement line L5 coaxially with the third circuit wiring 451A for the phase A and extends above the gas circuit breakers 411B and 411C for the phase B and the phase C, but does not extend above the gas circuit breaker 411A where the third circuit wiring 451A for the phase A extends. Also, as shown in FIG. 11C and FIG. 12, the second circuit wiring 461C for the phase C of the fourth circuit wiring module 460 is positioned on the circuit arrangement line L6 coaxially with the third circuit wiring 451B for the phase B and extends above the gas circuit breaker 411C for the phase C, but does not extend above the gas circuit breakers 411A and 411B for the phase A and the phase B over which the third circuit wiring 451B for the phase B extends.

As shown in FIG. 11A, the third circuit wiring 451A for the phase A of the third circuit wiring module 450 is connected to the left end portion of the gas circuit breaker 411A for the phase A through a connecting tube 452A for connecting the third circuit wiring 451A for the phase A and the third horizontal tube 423A, the third horizontal tube 423A for the phase A, the sixth vertical tube 422A, and the fourth vertical tube 421A. The fourth circuit wiring 461A for the phase A of the fourth circuit wiring module 460 is connected to the right end portion of the gas circuit breaker 411A for the phase A through connecting tubes 462A and 463A for connecting the fourth circuit wiring 461A for the phase A and the fourth horizontal tube 433A, the fourth horizontal tube 433A for the phase A, the seventh vertical tube 432A, and the fifth vertical tube 431A. The electric connection between the third circuit wiring 451A for the phase A and the fourth circuit wiring 461A is opened and closed by the gas circuit breaker 411A for the phase A.

As shown in FIG. 11B, the third circuit wiring 451B for the phase B of the third circuit wiring module 450 is connected to the left end portion of the gas circuit breaker 411B for the phase B through a connecting tube 452B for connecting the third circuit wiring 451B for the phase B and the third horizontal tube 423B, the third horizontal tube 423B for the phase B, the sixth vertical tube 422A and the fourth vertical tube 421B. The fourth circuit wiring 461B for the phase B of the fourth circuit wiring module 460 is connected to the right end portion of the gas circuit breaker 411B for the phase B through a connecting tube 462B for connecting the fourth circuit wiring 461B for the phase B and the fourth horizontal tube 433B, the fourth horizontal tube 433B for the phase B, the seventh vertical tube 432B and the fifth vertical tube 431B. The electric connection between the third circuit wiring 451B for the phase B and the fourth circuit wiring 461B is opened and closed by the gas circuit breaker 411B for the phase B.

As shown in FIG. 11C, the third circuit wiring 451C for the phase C of the third circuit wiring module 450 is connected to the left end portion of the gas circuit breaker 411C for the phase C through a connecting tube 452C for connecting the third circuit wiring 451C for the phase C and the third horizontal tube 423C, the third horizontal tube 423C for the phase C, the sixth vertical tube 422C and the fourth vertical tube 421C. The fourth circuit wiring 461C for the phase C of the fourth circuit wiring module 460 is connected to the right end portion of the gas circuit breaker 411B for the phase C through connecting tubes 462C and 463C for connecting the fourth circuit wiring 461C for the phase C and the fourth horizontal tube 433C, the fourth horizontal tube 433C for the phase C, the seventh vertical tube 432C and the fifth vertical tube 431C. The electric connection between the third circuit wiring 451C for the phase C and the fourth circuit wiring 461C is opened and closed by the gas circuit breaker 411C for the phase C.

The third horizontal tubes 423A, 423B and 423C for the respective phases include the disconnect switches DS corresponding respectively to the third circuit wirings 451A, 451B and 451C for the respective phases of the third circuit wiring module 450 integrated therein. The fourth vertical tubes 421A, 421B and 421C for the respective phases include the instrument current transformers CT corresponding respectively to the third wirings 451A, 451B and 451C for the respective phases of the third circuit wiring module 450 integrated therein.

The fourth horizontal tubes 433A, 433B and 433C for the respective phases include the disconnect switches DS corresponding respectively to the fourth circuit wirings 461A, 461B and 461C for the respective phases of the fourth circuit wiring modules 460 integrated therein, and the fifth vertical tubes 431A, 431B and 431C for the respective phases include the instrument current transformers CT corresponding to the fourth circuit wirings 461A, 461B and 461C for the respective phases of the fourth circuit wiring module 460 integrated therein.

With the gas-insulated switching unit 400 according to Embodiment 2, the gas circuit breaker 411A for the phase A opens and closes the electric connection between the third circuit wiring 451A for the phase A of the third circuit wiring module 450 and the fourth circuit wiring 461A for the phase A of the fourth circuit wiring module 460. The gas circuit breaker 411B for the phase B opens and closes the electric connection between the third circuit wiring 451B for the phase B of the third circuit wiring module 450 and the fourth circuit wiring 461B for the phase B of the fourth circuit wiring module 460. Likewise, the gas circuit breaker 411C for the phase C opens and closes the electric connection between the third circuit wiring 451C for the phase C of the third circuit wiring module 450 and the fourth circuit wiring 461C for the phase C of the fourth circuit wiring module 460.

With the gas-insulated switching apparatus 200 according to Embodiment 2, the same advantages as the gas-insulated switching apparatus 100 according to Embodiment 1 may be obtained. In addition, in the first gas-insulated switching unit 300 in the gas-insulated switching apparatus 200 according to Embodiment 2, the first circuit wiring 351A for the phase A of the first circuit wiring module 350 extends above the gas circuit breaker 311A for the phase A on the third vertical plane VS3, the first circuit wiring 351B for the phase B extends above the respective gas circuit breakers 311A and 311B for the phase A and the phase B on the third vertical plane VS3, the first circuit wiring 351C for the phase C extends above the respective gas circuit breakers 311A, 311B and 311C for the phase A, the phase B and the phase C on the fourth vertical plane VS4, and the second circuit wirings 361A, 361B and 361C respectively for the phase A, the phase B and the phase C of the second circuit wiring module 360 are configured with the gas-insulated buses respectively, the second circuit wiring 361A for the phase A is arranged in parallel with the first circuit wiring 351A for the phase A on the third vertical plane VS3 and extends above the respective gas circuit breakers 311A, 311B and 311C respectively for the phase A, the phase B and the phase C, the second circuit wiring 361B for the phase B is arranged coaxially with the first circuit wiring 351A for the phase A on the third vertical plane VS3 and extends above the gas circuit breakers 311B and 311C for the phase B and the phase C, and the second circuit wiring 361C for the phase C is arranged coaxially with the first circuit wiring 351B for the phase B on the third vertical plane VS3 and extends above the gas circuit breaker 311C for the phase C. Therefore, the first and second circuit wiring modules 350 and 360 may be arranged in a compact space.

The first gas-insulated switching unit 300 of the gas-insulated switching apparatus 200 in Embodiment 2 further includes the third vertical tubes 332A, 332B and 332C respectively for the phase A, the phase B and the phase C connected vertically to the second vertical tubes 331A, 331B and 331C respectively for the phase A, the phase B and the phase C, and the horizontal tubes 333A, 333B and 333C respectively for the phase A, the phase B and the phase C connected to the third vertical tubes 332A, 332B and 332C for the respective phases so as to extend in the first direction, and the second circuit wiring 361A for the phase A is connected to the gas circuit breaker 311A for the phase A through the horizontal tube 333A for the phase A, the third vertical tube 332A for the phase A, and the second vertical tube 331A for the phase A, the second circuit wiring 361B for the phase B is connected to the gas circuit breaker 311B for the phase B through the horizontal tube 333B for the phase B, the third vertical tube 332B for the phase B, and the second vertical tube 331B for the phase B, the third circuit wiring 361C for the phase C is connected to the gas circuit breaker 311C for the phase C through the horizontal tube 333C for the phase C, the third vertical tube 332C for the phase C and the second vertical tube 331C for the phase C, respectively, so that the second circuit wiring module 360 may be connected easily to the gas circuit breakers 311A, 311B and 311C for the respective phases.

According to the gas-insulated switching apparatus 200 of Embodiment 2, the second gas-insulated switching unit 400 includes the second breaker module 410 including the second gas circuit breakers 411A, 411B and 411C respectively for the phase A, the phase B and the phase C and being arranged with the axial lines 412a, 412b and 412c for the second gas circuit breakers 411A, 411B and 411C for the respective phases extended in parallel to each other in the first direction on the horizontal arrangement plane HS0, the fourth vertical tubes 421A, 421B and 421C respectively for the phase A, the phase B and the phase C connected vertically and respectively to one end portions of the second gas circuit breakers 411A, 411B and 411C for the respective phases, the third circuit wiring module 450 including the third circuit wirings 451A, 451B and 451C respectively for the phase A, the phase B and the phase C arranged above the second breaker unit 410 and connected respectively to the second gas circuit breakers 411A, 411B and 411C for the respective phases through the fourth vertical tubes 421A, 421B and 421C for the respective phases, and the fourth circuit wiring module 460 including the fifth vertical tubes 431A, 431B and 431C respectively for the phase A, the phase B and the phase C connected vertically and respectively to the other end portions of the second gas circuit breakers 411A, 411B and 411C for the respective phases and the fourth circuit wirings 461A, 461B and 461C for the phase A, the phase B, and the phase C connected respectively to the second gas circuit breakers 411A, 411B and 411C for the respective phases through the fifth vertical tubes 431A, 431B and 431C for the respective phases, and the second gas circuit breaker 411A for the phase A opens and closes the electrical connection between the third circuit wiring 451A for the phase A and the fourth circuit wiring 461A for the phase A, the second gas circuit breaker 411B for the phase B opens and closes the electric connection between the third circuit wiring 451B for the phase B and the fourth circuit wiring 461B for the phase B, and the second gas circuit breaker 411C for the phase C opens and closes the electric connection between the third circuit wiring 451C for the phase C and the fourth circuit wiring 461C for the phase C respectively, so that the fourth vertical tubes 421A, 421B and 421C for the respective phases are arranged on the first vertical plane VS1, the fifth vertical tubes 431A, 431B and 431C for the respective phases are arranged on the second vertical plane VS2, the gas circuit breakers 411A, 411B and 411C for the respective phases of the second breaker module 410 have the reference axial lengths LS having the same length between the first and second vertical planes VS1 and VS2, the third circuit wirings 451A, 451B and 451C for the respective phases of the third circuit wiring module 450 are configured with the gas-insulated buses respectively and extend in parallel to each other along the second direction, the third circuit wirings 451A, 451B and 451C for the respective phases are positioned at the respective apexes of the right angled isosceles triangle, the third circuit wirings 451A and 451B respectively for the phase A and the phase B are positioned at both ends of the short side of the right angled isosceles triangle and arranged on the third vertical plane VS3, and the third circuit wiring 451C for the phase C is arranged on the fourth vertical plane VS4. Therefore, the second breaker module 410, the third circuit wiring module 450, and the fourth circuit wiring module 460 may be arranged compactly in a small arrangement space.

According to the gas-insulated switching apparatus 200 in Embodiment 2, the second gas-insulated switching unit 400 is configured in such a manner that the third circuit wiring 451A for the phase A extends above the second gas circuit breaker 411A for the phase A on the third vertical plane VS3, the third circuit wiring 451B for the phase B extends above the second gas circuit breakers 411A and 411B respectively for the phase A and the phase B on the third vertical plane VS3, the third circuit wiring 451C for the phase C extends above the respective gas circuit breakers 411A, 411B and 411C respectively for the phase A, the phase B and the phase C on the fourth vertical plane VS4, the fourth circuit wirings 461A, 461B and 461C respectively for the phase A, the phase B and the phase C are configured with the gas-insulated buses respectively, the fourth circuit wiring 461A for the phase A is arranged in parallel with the third circuit wiring 451A for the phase A on the third vertical plane VS3 and extends above the second gas circuit breakers 411A, 411B and 411C for the phase A, the phase B and the phase C, the fourth circuit wiring 461C for the phase B is arranged on the third vertical plane VS3 coaxially with the third circuit wiring 451A for the phase A and extends above the second gas circuit breakers 411B and 411C respectively for the phase B and the phase C, and the fourth circuit wiring 461C for the phase C is arranged on the third vertical plane VS3 coaxially with the third circuit wiring 451B for the phase B, and extends above the second circuit breaker 411C for the phase C. Therefore, the third and fourth circuit wiring modules 450 and 460 may be compactly arranged.

With the gas-insulated switching apparatus 200 according to Embodiment 2, the first circuit wiring 351B for the phase B, the first circuit wiring 351A for the phase A, the second circuit wiring 361A for the phase A, the third circuit wiring 451A for the phase A, and the third circuit wiring 461B for the phase B are arranged on the gas circuit breaker 311A for the phase A and the second gas circuit breaker 411 for the phase A in sequence upward from the bottom on the third vertical plane VS3, the distance between the first circuit wirings 351A and 351B respectively for the phase A and the phase B on the third vertical plane VS3 is $\alpha$, the distance between the third circuit wirings 451A and 451B respectively for the phase A and the phase B on the third vertical plane VS3 is $\alpha$, and the distance $\beta$ between the first circuit wiring 351A for the phase A and the third circuit wiring 451A for the phase A on the third vertical plane VS3 is set to satisfy the relation $2\alpha \leq \beta \leq 3\alpha$. Therefore, the first to the fourth circuit wiring modules 350, 360, 450 and 460 may be arranged compactly while reducing the vertical heights thereof.

With the gas-insulated switching apparatus 200 in Embodiment 2, the distance between the first vertical plane VS1 and the fourth vertical plane VS4 is $\alpha$, the distance between the third vertical plane VS3 and the fourth vertical plane VS4 is $\alpha$, and the distance between the second vertical plane VS2 and the third vertical plane VS3 is 2α. Therefore, the respective circuit wiring modules 350, 360, 450 and 460 may be connected efficiently to the breaker modules 310 and 410 at both ends of the third vertical plane VS3.

Embodiment 3

A gas-insulated switching apparatus 500 according to Embodiment 3 is a gas-insulated switching apparatus referred to as bus connecting unit. The gas-insulated switching apparatus 500 according to Embodiment 3 includes a breaker module 510, a first circuit wiring module 550, and a second circuit wiring module 560. This gas-insulated switching apparatus opens and closes the electric connection between the first circuit wiring module 550 and the second circuit wiring module 560 by the breaker module 510. The first circuit wiring module 550 is arranged above the breaker module 510, and the second circuit wiring module 560 is arranged above the first circuit wiring module 550. The second circuit wiring module 560 is arranged in a small arrangement space in conjunction with the first circuit wiring module 550.

Figure 13:
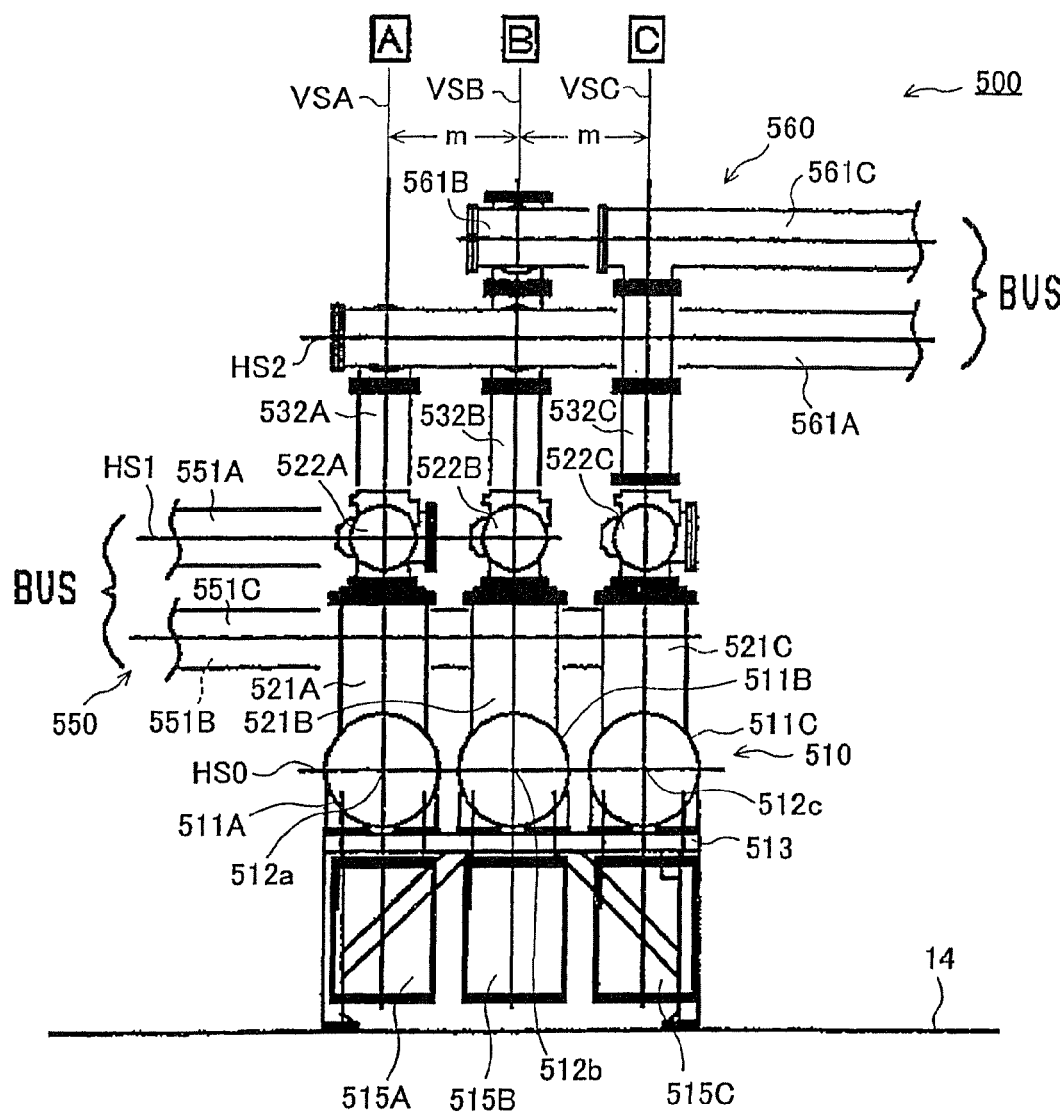
FIG. 13 is a left side view of a gas-insulated switching apparatus according to Embodiment 3 of the preset invention.
Figure 14:
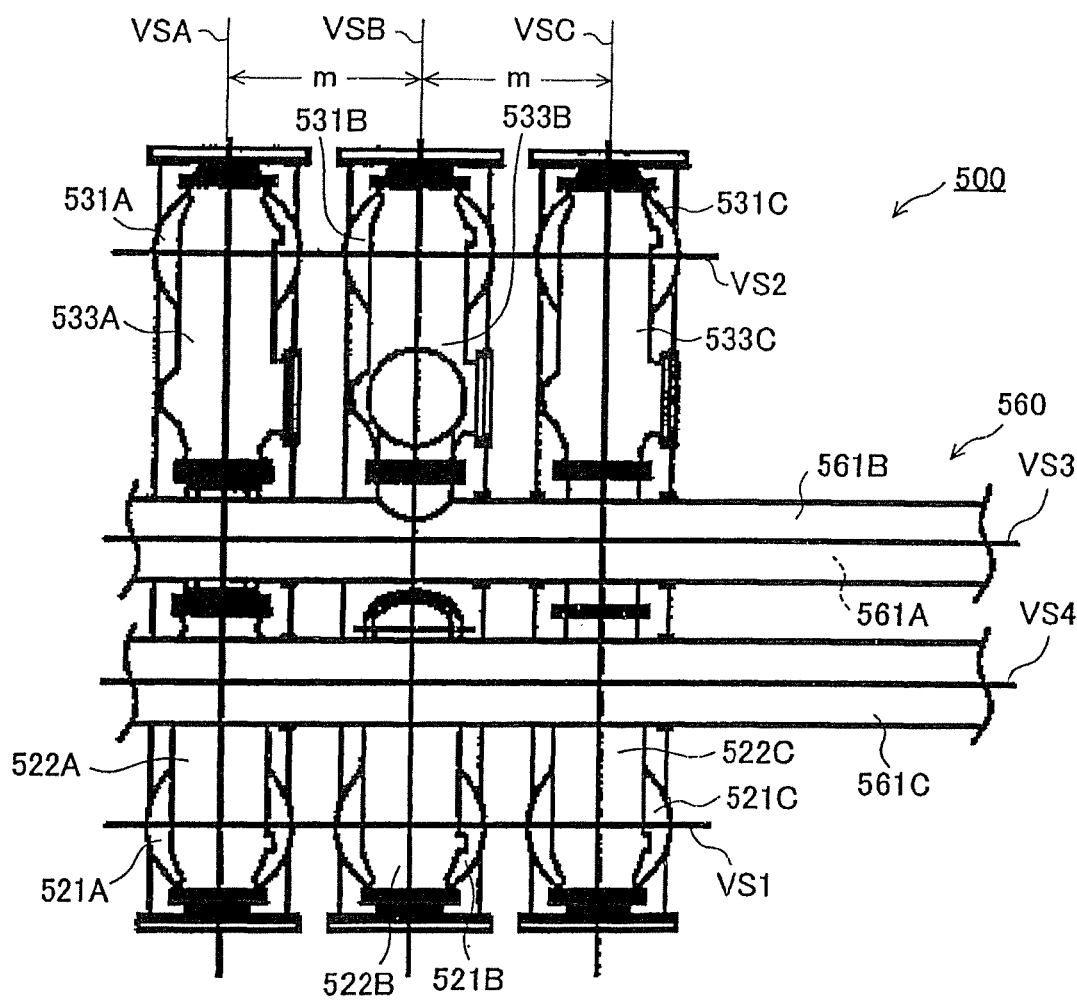
FIG. 14 is a plan view of Embodiment 3.
Figure 15A:
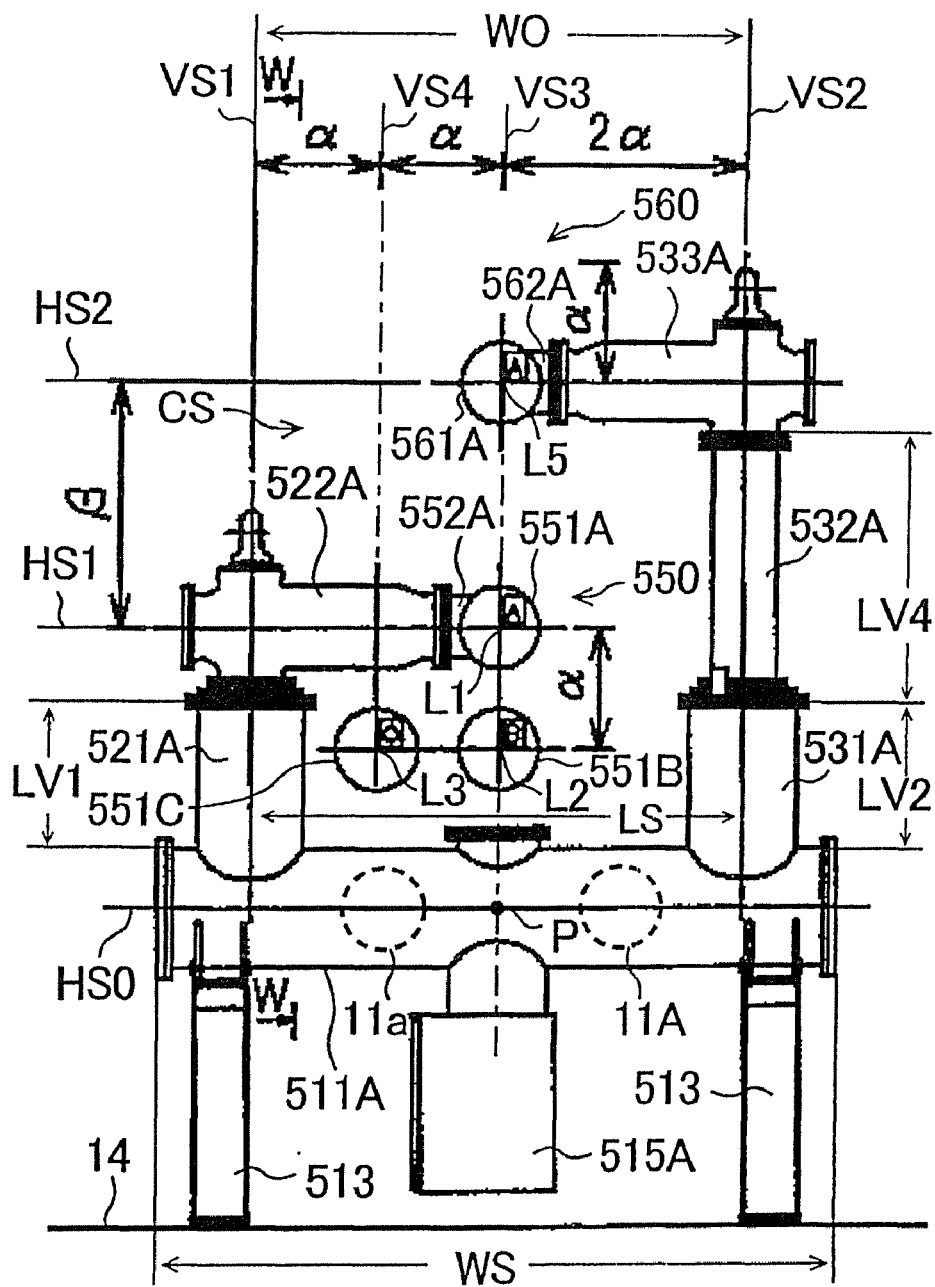
FIG. 15A is a front view corresponding to a vertical arrangement plane for the phase A according to Embodiment 3.
Figure 15B:
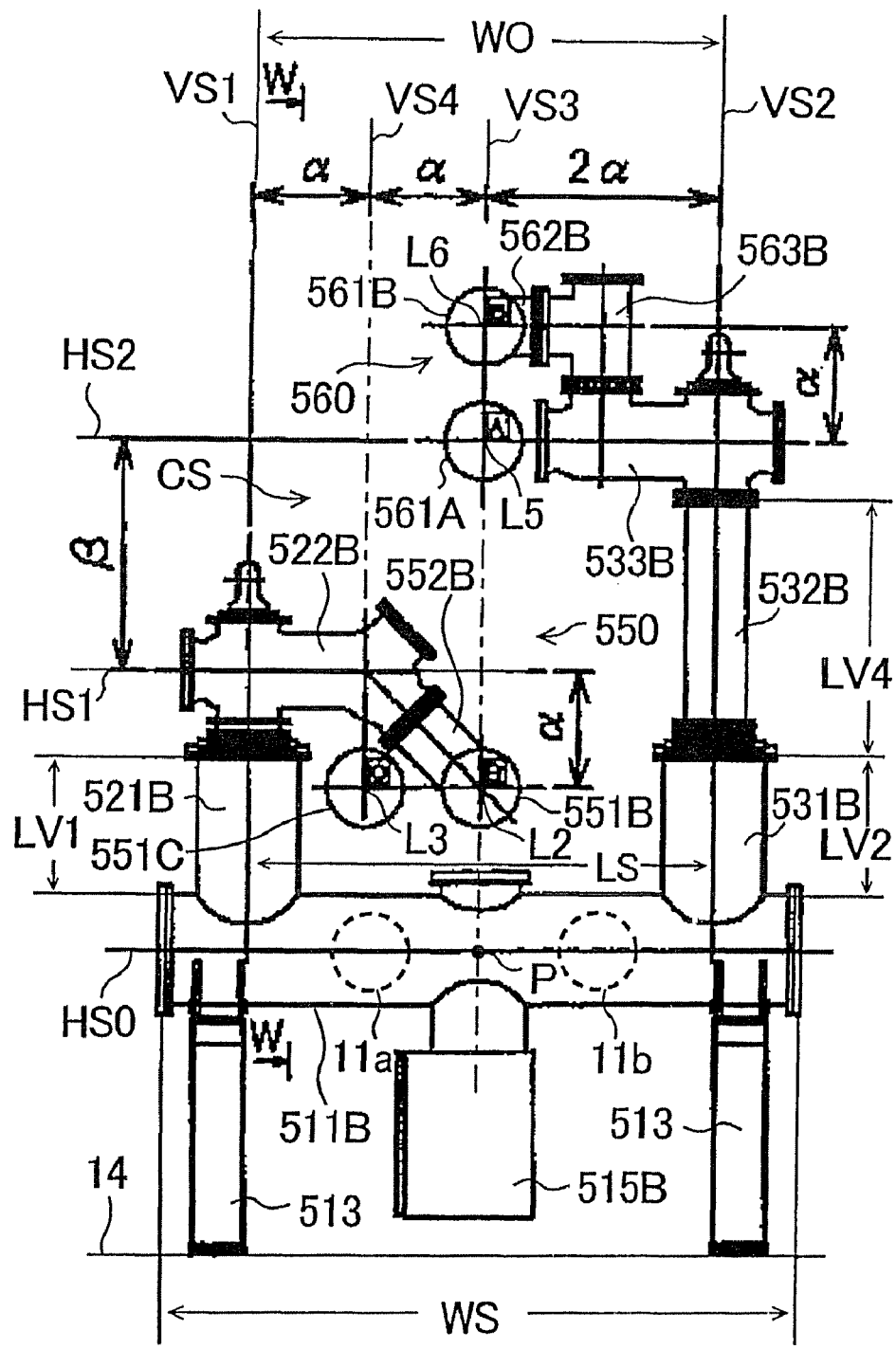
FIG. 15B is a front view corresponding to a vertical arrangement plane for the phase B according to Embodiment 3.
Figure 15C:
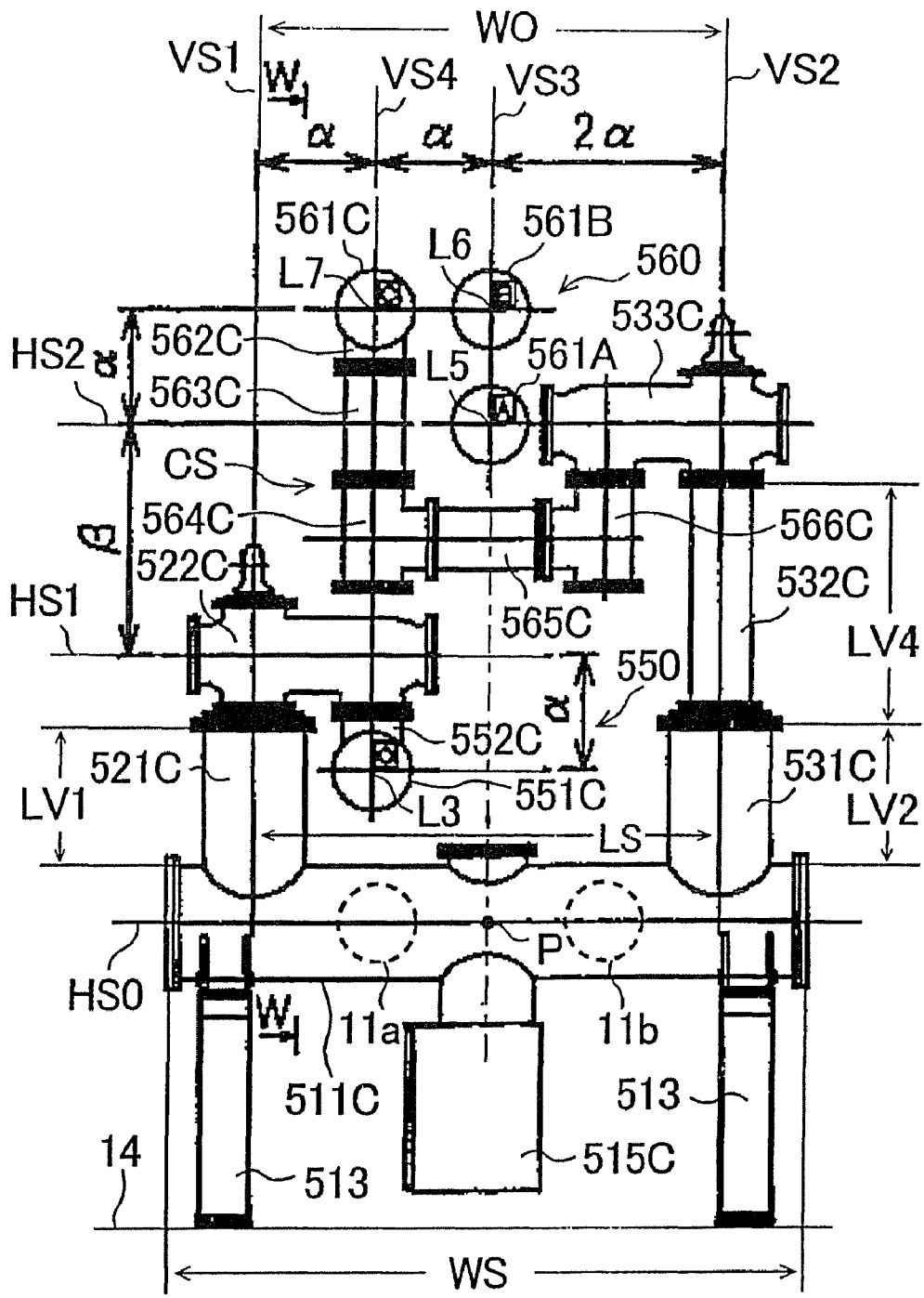
FIG. 15C is a front view corresponding to a vertical arrangement plane for the phase C according to Embodiment 3.
Figure 16:
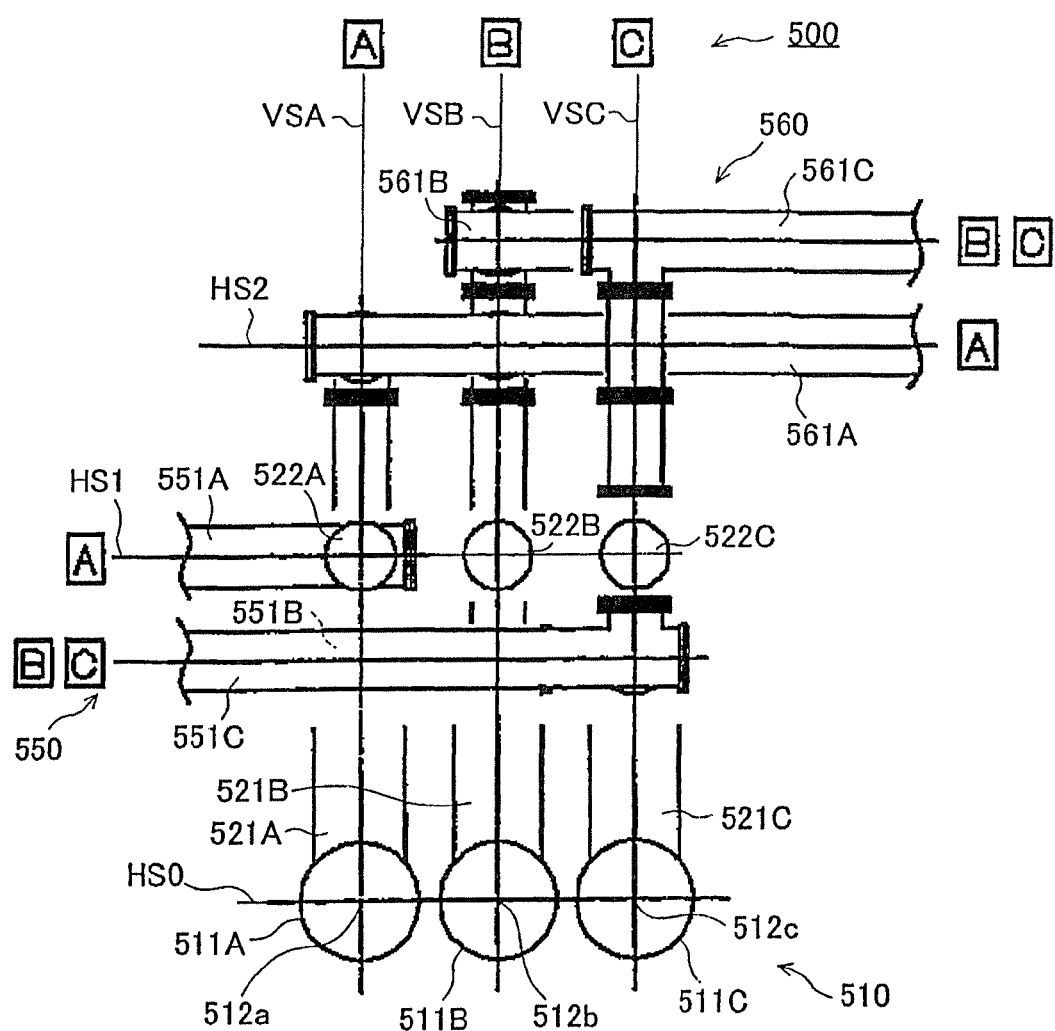
FIG. 16 is a cross-sectional view taken along the line W-W in FIG. 15A, FIG. 15B and FIG. 15C.

FIG. 13, FIG. 14, FIG. 15A, FIG. 15B, FIG. 15C and FIG. 16 illustrate the gas-insulated switching apparatus 500 according to Embodiment 3. FIG. 13 is a left side view thereof, FIG. 14 is a plan view thereof, FIG. 15A is a front view corresponding to the vertical arrangement plane VSA for the phase A, FIG. 15B is a front view corresponding to the vertical arrangement plane VSB for the phase B, FIG. 15C is a front view corresponding to the vertical arrangement plane VSC for the phase C, and FIG. 16 is a cross-sectional view taken along the line W-W in FIGS. 15A, 15B and 15C.

The gas-insulated switching apparatus 500 is configured basically in the same idea as the gas-insulated switching apparatus 100 according to Embodiment 1. The first and second circuit wiring modules 550 and 560 are modified from the first and second circuit wiring modules 50 and 60 in Embodiment 1 for configuring the bus connecting unit.

The breaker module 510 is configured in the same style as the breaker module 10 of Embodiment 1. The breaker module 510 includes a gas circuit breaker 511A for the phase A, a gas circuit breaker 511B for the phase B, a gas circuit breaker 511C for the phase C and a common base mount 513. The base mount 513 is fixed to the mounting surface 14 as shown in FIG. 13, FIG. 15A, FIG. 15B and FIG. 15C. The gas circuit breakers 511A, 511B and 511C for the respective phases are fixed to the base mount 513. The gas circuit breakers 511A, 511B and 511C for the respective phases are configured into a cylindrical shape and, as shown in FIG. 13 and FIG. 16, have axial lines 512a, 512b and 512c respectively. The gas circuit breakers 511A, 511B and 511C for the respective phases are arranged on the horizontal arrangement plane HS0, and are mounted to the base mount 513 respectively.

In order to describe the configuration of the gas-insulated switching apparatus 500 in Embodiment 3, three-axis orthogonal coordinate including an x-axis, a y-axis, and a z-axis is assumed, and the horizontal arrangement plane HS0 is assumed to exist in an xy plane of the three-axis orthogonal coordinate. The gas circuit breakers 511A, 511B and 511C for the respective phases of the breaker module 510 are arranged in such a manner that the respective axial lines 512a, 512b and 512c are positioned on the horizontal arrangement plane HS0 (the xy plane) as shown in FIG. 13 and FIG. 16, and the respective axial lines 512a, 512b and 512c extend substantially in parallel to each other along the first direction (the x-axis direction).

As regards the gas-insulated switching apparatus 500, as shown in FIG. 13, FIG. 14 and FIG. 16, the vertical arrangement plane VSA for the phase A, the vertical arrangement plane VSB for the phase B and the vertical arrangement plane VSC for the phase C are set. The vertical arrangement plane VSA for the phase A is a vertical plane vertical to the horizontal arrangement plane HS0 and including the axial line 512a of the gas circuit breaker 511A for the phase A. The vertical arrangement plane VSB for the phase B is a vertical plane vertical to the horizontal arrangement plane HS0 and including the axial line 512b of the gas circuit breaker 511B for the phase B. The vertical arrangement plane VSC for the phase C is a vertical plane vertical to the horizontal arrangement plane HS0 and including the axial line 512c of the gas circuit breaker 511C for the phase C. The vertical arrangement planes VSA, VSB and VSC for the phase A, the phase B and the phase C are in parallel to an xz plane of the three-axis orthogonal coordinate, and are planes extending in parallel to each other. The phase distance m between the vertical arrangement planes VSA and VSB and the phase distance m between the vertical arrangement planes VSB and VSC are the same as shown in FIG. 13 and FIG. 14.

First vertical tubes 521A, 521B and 521C respectively for the phase A, the phase B and the phase C are connected vertically to the left end portions of the gas circuit breakers 511A, 511B and 511C for the respective phases. Likewise, second vertical tubes 531A, 531B and 531C for the phase A, the phase B and the phase C are connected vertically to the right end portions of the gas circuit breakers 511A, 511B and 511C for the respective phases. First and second vertical planes VS1 and VS2 are set for the gas-insulated switching apparatus 500. The first vertical plane VS1 is a vertical plane extending vertically to the horizontal arrangement plane HS0 and intersecting the left end portions of the gas circuit breakers 511A, 511B and 511C for the respective phases. The second vertical plane VS2 is a vertical plane extending vertically to the horizontal arrangement plane HS0 and intersecting the right end portions of the gas circuit breakers 511A, 511B and 511C for the respective phases. The first and second vertical planes VS1 and VS2 extend in parallel with a yz plane, and are parallel to each other, so as to extend orthogonally to the vertical arrangement planes VSA, VSB and VSC for the phase A, the phase B and the phase C. Formed between the first and second vertical planes VS1 and VS2 is the circuit wiring space CS above the breaker module 510 as shown in FIG. 15A, FIG. 15B and FIG. 15C. The circuit wiring space CS is such that the width W0 in the horizontal direction is the same as the distance between the first and second vertical planes VS1 and VS2, extend across the vertical arrangement planes VSA, VSB and VSC for the phase A, the phase B and the phase C, and extend between the first and second vertical planes VS1 and VS2.

The first vertical tubes 521A, 521B and 521C are connected vertically to the left end portions of the gas circuit breakers 511A, 511B and 511C for the respective phases with the respective axial lines thereof positioned on the first vertical plane VS1. More specifically, as shown in FIG. 14, the first vertical tube 521A for the phase A is connected to the left end portion of the gas circuit breaker 511A for the phase A with the axial line thereof positioned on the intersecting line between the first vertical plane VS1 and the vertical arrangement plane VSA for the phase A. As shown in FIG. 14, the first vertical tube 521B for the phase B is connected to the left end portion of the gas circuit breaker 511B for the phase B with the axial line thereof positioned on the intersecting line between the first vertical plane VS1 and the vertical arrangement plane VSB for the phase B. Likewise, as shown in FIG. 14, the first vertical tube 521C for the phase C is connected to the left end portion of the gas circuit breaker 511C for the phase C with the axial line thereof positioned on the intersecting line between the first vertical plane VS1 and the vertical arrangement plane VSC for the phase C.

The second vertical tubes 531A, 531B and 531C are connected vertically to the right end portions of the gas circuit breakers 511A, 511B and 511C for the respective phases with the respective axial lines thereof positioned on the second vertical plane VS2. More specifically, as shown in FIG. 14, the second vertical tube 531A for the phase A is connected to the right end portion of the gas circuit breaker 511A for the phase A with the axial line thereof positioned on the intersecting line between the second vertical plane VS2 and the vertical arrangement plane VSA for the phase A. As shown in FIG. 14, the second vertical tube 531B for the phase B is connected to the right end portion of the gas circuit breaker 511B for the phase B with the axial line thereof positioned on the intersecting line between the second vertical plane VS2 and the vertical arrangement plane VSB for the phase B. Likewise, as shown in FIG. 14, the second vertical tube 531C for the phase C is connected to the right end portion of the gas circuit breaker 511C for the phase C with the axial line thereof positioned on the intersecting line between the second vertical plane VS2 and the vertical arrangement plane VSC for the phase C.

The first vertical tubes 521A, 521B and 521C for the respective phases have the same vertical length LV1, and the second vertical tubes 531A, 531B and 531C for the respective phases have the same vertical length LV2. The vertical length LV1 and the vertical length LV2 are set to the same length and hence the relation LV1=LV2 is satisfied.

The gas circuit breakers 511A, 511B and 511C for the respective phases have reference axial lengths LS respectively between the first and second vertical planes VS1 and VS2. The reference axial lengths LS of the gas circuit breakers 511A, 511B and 511C for the respective phases are set to the same length. The gas circuit breakers 511A, 511B and 511C for the respective phases have center points P of the respective reference axial lengths LS, and are arranged so that the center points P of the respective axial lengths LS of the gas circuit breakers 511A, 511B and 511C for the respective phases arranged in line on the second straight line which is in parallel to the second direction (the y-axis direction). Consequently, the arrangement space width WS defined by both ends of the gas circuit breakers 511A, 511B and 511C for the respective phases are the lengths obtained by adding the lengths of the both end portions of the gas circuit breakers 511A, 511B and 511C for the respective phases to the reference axial lengths LS of the gas circuit breakers 511A, 511B and 511C for the respective phases, and the gas circuit breakers 511A, 511B and 511C for the respective phases are arranged compactly in the arrangement space width WS.

The gas circuit breakers 511A, 511B and 511C for the respective phases are each configured with a gas circuit breaker referred to as "double-points-break" type and, as shown in FIG. 15A, FIG. 15B and FIG. 15C, include two breaking open-close switches 11a and 11b in the interior thereof. The breaking open-close switches 11a and 11b are arranged respectively along the axial lines 512a, 512b and 512c in the interior of the gas circuit breakers 511A, 511B and 511C for the respective phases and are connected to each other in series. As shown in FIG. 13, FIG. 15A, FIG. 15B and FIG. 15C, switch drive mechanisms 515A, 515B and 515C are mounted to the lower portions of the gas circuit breakers 511A, 511B and 511C for the respective phases respectively. The switch drive mechanisms 515A, 515B and 515C drive the respective breaking open-close switches 11a and 11b of the gas circuit breakers 511A, 511B and 511C for the respective phases so as to open and close simultaneously. Since the gas circuit breakers 511A, 511B and 511C for the respective phases each include the two breaking open-close switches 11a and 11b arranged along the axial lines 512a, 512b and 512c and connected in series, the respective reference axial lengths LS have relatively large dimensions, and the circuit wiring space CS has a sufficient width for arranging the circuit wiring modules 550 and 560.

First horizontal tubes 522A, 522B and 522C respectively for the phase A, the phase B, and the phase C are connected to the upper ends of the first vertical tubes 521A, 521b and 521C for the respective phases. The first horizontal tubes 522A, 522B and 522C for the respective phases are extended horizontally toward the circuit wiring space CS along the first direction (the x-axis direction) on the first horizontal plane HS1 parallel to the horizontal arrangement plane HS0 as shown in FIG. 15A, FIG. 15B and FIG. 15C. More specifically, as shown in FIG. 16, the first horizontal tube 522A for the phase A is arranged on the intersecting line between the first horizontal plane HS1 and the vertical arrangement plane VSA for the phase A, and the first horizontal tube 522B for the phase B is arranged on the intersecting line between the first horizontal plane HS1 and the vertical arrangement plane VSB for the phase B, and the first horizontal tube 522C for the phase C is arranged on the intersecting line between the first horizontal plane HS1 and the vertical, arrangement plane VSC for the phase C.

As shown in FIG. 15A, FIG. 15B and FIG. 15C, third vertical tubes 532A, 532B and 532C for the phase A, the phase B and the phase C are vertically connected to the upper ends of the second vertical tubes 531A, 531B and 531C for the respective phases. The third vertical tubes 532A, 532B and 532C are vertically connected to the upper ends of the second vertical tubes 531A, 531B and 531C for the respective phases with the respective axial lines thereof positioned on the second vertical plane VS2. More specifically, the third vertical tube 532A for the phase A is connected to the second vertical tube 531A for the phase A with the axial line thereof positioned on the intersecting line between the second vertical plane VS2 and the vertical arrangement plane VSA for the phase A. The third vertical tube 532B for the phase B is connected to the second vertical tube 531B for the phase B with the axial line thereof positioned on the intersecting line between the second vertical plane VS2 and the vertical arrangement plane VSB for the phase B. Likewise, the third vertical tube 532C for the phase C is connected to the second vertical tube 531C for the phase C with the axial line thereof positioned on the intersecting line between the second vertical plane VS2 and the vertical arrangement plane VSC for the phase C.

The third vertical tubes 532A, 532B and 532C have the same vertical length LV4. The vertical length LV4 is longer than the vertical lengths LV1 and LV2.

As shown in FIG. 15A, FIG. 15B and FIG. 15C, second horizontal tubes 533A, 533B and 533C respectively for the phase A, the phase B and the phase C are connected to the upper ends of the third vertical tubes 532A, 532B and 532C for the respective phases. The second horizontal tubes 533A, 533B and 533C for the respective phases are extended horizontally toward the circuit wiring space CS along the first direction (the x-axis direction) on the second horizontal plane HS2 positioned in parallel with the first horizontal plane HS1 above the first horizontal plane HS1. More specifically, the second horizontal tube 533A for the phase A is arranged on the intersecting line between the second horizontal plane HS2 and the vertical arrangement plane VSA for the phase A, and the second horizontal tube 533B for the phase B is arranged on the intersecting line between the second horizontal plane HS2 and the vertical arrangement plane VSB for the phase B, and the second horizontal tube 533C for the phase C is arranged on the intersecting line between the second horizontal plane HS2 and the vertical arrangement plane VSC for the phase C. The vertical distance between the first and second horizontal planes HS1 and HS2 is β.

The first and second circuit wiring modules 550 and 560 are arranged in the circuit wiring space CS. The first circuit wiring module 550 is arranged in the circuit wiring space Cs above the breaker module 510. The second circuit wiring module 560 is arranged in the circuit wiring space CS above the first circuit wiring module 550. The first circuit wiring module 550 includes first circuit wirings 551A, 551B and 551C respectively for the phase A, the phase B and the phase C, and the first circuit wirings 551A, 551B and 551C for the respective phases are configured respectively with the gas-insulated buses. The second circuit wiring module 560 includes second circuit wirings 561A, 561B and 561C respectively for the phase A, the phase B and the phase C, and these second circuit wirings for the respective phases are also configured of the gas-insulated buses, respectively.

The first circuit wirings 551a, 551B and 551C for the respective phases of the first circuit wiring module 550 are arranged respectively on the circuit arrangement lines L1, L2 and L3 in the circuit wiring space CS. The second circuit wirings 561A, 561B and 561C for the respective phases of the second circuit wiring module 560 are arranged respectively on the circuit arrangement lines L5, L6 and L7 in the circuit wiring space CS. The circuit arrangement lines L1 to L3, L5 to L7 are straight lines orthogonal to the respective vertical arrangement planes VSA, VSB and VSC for the phase A, the phase B and the phase C in the circuit wiring space CS along the second direction (the y-axis direction) and set to extend in parallel to each other.

As regards the circuit arrangement lines L1 to L3, L5 to L7, as shown in FIG. 14, FIG. 15A, FIG. 15B and FIG. 15C, the third vertical plane VS3 in parallel thereto is set between the first vertical plane VS1 and the second vertical plane VS2. The third vertical plane VS3 is positioned specifically just at a midpoint between the first vertical plane VS1 and the second vertical plane VS2, and is a vertical plane passing through the center points P of the respective reference axial lengths LS of the gas circuit breakers 511A, 511B and 511C for the respective phases. The horizontal distance between the third vertical plane VS3 and the first vertical plane VS1 is 2α, and the horizontal distance between the third vertical plane VS3 and the second vertical plane VS2 is also 2α. The fourth vertical plane VS4 is set between the first vertical plane VS1 and the third vertical plane VS3 so as to extend in parallel thereto. The fourth vertical plane VS4 is positioned just at a midpoint between the first vertical plane VS1 and the third vertical plane VS3. The horizontal distance between the fourth vertical plane VS4 and the first vertical plane VS1 is α, and the horizontal distance between the fourth vertical plane VS4 and the third vertical plane VS3 is also α.

The circuit arrangement lines L1, L2, L5 and L6 are positioned on the third vertical plane VS3 in parallel to each other. The circuit arrangement line L1 is positioned on the intersecting line between the first horizontal plane HS1 and the third vertical plane VS3, and the circuit arrangement line L2 is positioned right below the circuit arrangement line L1. The circuit arrangement line L5 is positioned on the intersecting line between the second horizontal plane HS2 and the third vertical plane VS3, and the circuit arrangement line L6 is positioned right above the circuit arrangement line L5. The vertical distance between the circuit arrangement lines L1 and L2 is α, and the vertical distance between the circuit arrangement lines L5 and L6 is also α. The vertical distance between the circuit arrangement lines L1 and L5 is β. The distance β is set to satisfy the relation 2α≦β≦3α. The circuit arrangement lines L3 and L7 are positioned on the fourth vertical plane VS4. The horizontal distance between the circuit arrangement line L3 and L2 is α and the horizontal distance between the circuit arrangement lines L5 and L7 is also α.

As shown in FIG. 15A, the circuit arrangement lines L1, L2 and L3 are arranged at the respective apexes of a right angled isosceles triangle respectively. Between the circuit arrangement line L1 and the circuit arrangement line L3 corresponds to an oblique line of a right angled isosceles triangle, that is, a long side. The circuit arrangement lines L1 and L2 are arranged at both ends of the first short side of the right angled isosceles triangle. The circuit arrangement lines L2 and L3 are arranged at both ends of the second short side of the right angled isosceles triangle. The circuit arrangement lines L5, L6 and L7 are also arranged at the respective apexes of the right angled isosceles triangle as shown in FIG. 15C respectively. Between the circuit arrangement line L5 and the circuit arrangement line L7 corresponds to an oblique line of a right angled isosceles triangle, that is, a long side. The circuit arrangement lines L5 and L6 are arranged at both ends of the first short side of the right angled isosceles triangle. The circuit arrangement lines L6 and L7 are arranged at both ends of the second short side of the right angled isosceles triangle.

As shown in FIG. 15A and FIG. 16, the first circuit wiring 551A for the phase A of the first circuit wiring module 550 is positioned on the circuit arrangement line L1, and extends above the gas circuit breaker 511A for the phase A, but does not extend above the gas circuit breakers 511B and 511C of the phase B and the phase C. As shown in FIG. 15A, FIG. 15B and FIG. 16, the first circuit wiring 551B for the phase B of the first circuit wiring module 550 is positioned on the circuit arrangement line L2, and extends above the gas circuit breakers 511A and 511B for the phase A and the phase B, but does not extend above the gas circuit breaker 511C for the phase C. The first circuit wiring 551C for the phase C of the first circuit wiring module 550 is positioned on the circuit arrangement line L3 as shown in FIG. 15A, FIG. 15B, FIG. 15C and FIG. 16, and extends above the gas circuit breakers 511A, 511B and 511C for the phase A, the phase B and the phase C.

As shown in FIG. 15A, FIG. 15B, FIG. 15C and FIG. 16, the second circuit wiring 561A for the phase A of the second circuit wiring module 560 is positioned on the circuit arrangement line L5, and extends above the gas circuit breakers 511A, 511B and 511C for the phase A, the phase B and the phase C. As shown in FIG. 15B, FIG. 15C and FIG. 16, although the second circuit wiring 561B for the phase B of the second circuit wiring module 560 is positioned on the circuit arrangement line L6 and extend above the gas circuit breakers 511B and 511C for the phase B and the phase C, but does not extend above the gas circuit breaker 511A. Also, as shown in FIG. 15C and FIG. 16, the second circuit wiring 561C for the phase C of the second circuit wiring module 560 is positioned on the circuit arrangement line L7 and extends above the gas circuit breaker 511C for the phase C, but does not extend above the gas circuit breakers 511A and 511B for the phase A and the phase B.

As shown in FIG. 15A, the first circuit wiring 551A for the phase A of the first circuit wiring module 550 is connected to the left end portion of the gas circuit breaker 511A for the phase A through a connecting tube 552A for connecting the first circuit wiring 551A for the phase A and the first horizontal tube 522A, the first horizontal tube 522A for the phase A, and the first vertical tube 521A. The second circuit wiring 561A for the phase A of the second circuit wiring module 560 is connected to the right end portion of the gas circuit breaker 511A for the phase A through a connecting tube 562A for connecting the second circuit wiring 561A for the phase A and the second horizontal tube 533A, the second horizontal tube 533A, the third vertical tube 532A, and the second vertical tube 531A. The electric connection between the first circuit wiring 551A for the phase A and the second circuit wiring 561A is opened and closed by the gas circuit breaker 511A for the phase A. The connecting tubes 552A and 562A are configured with the gas-insulated connecting tubes.

As shown in FIG. 15B, the first circuit wiring 551B for the phase B of the first circuit wiring module 550 is connected to the left end portion of the gas circuit breaker 511B for the phase B through a connecting tube 552B for connecting the first circuit wiring 551B for the phase B and the first horizontal tube 522B, the first horizontal tube 522B for the phase B, and the first vertical tube 521B. The second circuit wiring 561B for the phase B of the second circuit wiring module 560 is connected to the right end portion of the gas circuit breaker 511B for the phase B through connecting tubes 562B and 563B for connecting the second circuit wiring 561B for the phase B and the second horizontal tube 533B, the second horizontal tube 533B for the phase B, the third vertical tube 532B and the second vertical tube 531B. The electric connection between the first circuit wiring 551B for the phase B and the second circuit wiring 561B is opened and closed by the gas circuit breaker 511B for the phase B. The connecting tubes 552B, 562B and 563B are also configured with the gas-insulated connecting tubes.

As shown in FIG. 15C, the first circuit wiring 551C of the phase C of the first circuit wiring module 550 is connected to the left end portion of the gas circuit breaker 511C for the phase C through a connecting tube 552C for connecting the first circuit wiring 551C for the phase C and the first horizontal tube 522C, the first horizontal tube 522C for the phase C and the first vertical tube 521C. The second circuit wiring 561C for the phase C of the second circuit wiring module 560 is connected to the right end portion of the gas circuit breaker 511C for the phase C through connecting tubes 562C, 563C, 564C, 565C and 566C for connecting the second circuit wiring 561C for the phase C and the second horizontal tube 533C, the second horizontal tube 533C for the phase C, the third vertical tube 532C and the second vertical tube 531C. The electric connection between the first circuit wiring 551C for the phase C and the second circuit wiring 561C is opened and closed by the gas circuit breaker 511C for the phase C. The connecting tubes 552C, 562C, 563C, 564C, 565C and 566C are configured with the gas-insulated connecting tubes.

As shown in FIG. 15C, the connecting tubes 562C and 563C are arranged on the fourth vertical plane VS4. The connecting tube 565C extends across the third vertical plane VS3 horizontally just through the midpoint between the first and second horizontal planes HS1 and HS2. In other words, the connecting tube 565C extends just through the midpoint between the circuit arrangement lines L1 and L5 in the horizontal direction. The connecting tube 564C connects the connecting tubes 563C and 565C, and the connecting tube 566C connects the connecting tube 565C and the second horizontal tube 533C. The connecting tube 565C is arranged in the space between the circuit arrangement lines L1 and L5, that is, using the distance β between the first and second horizontal planes HS1 and HS2, so that the first and second circuit wirings 550 and 560 are arranged compactly.

The first horizontal tubes 522A, 522B and 522C for the respective phases include the disconnect switches DS corresponding respectively to the first circuit wirings 551A, 551B and 551C for the respective phases of the first circuit wiring module 550 integrated therein. The first vertical tubes 521A, 521B and 521C for the respective phases include the instrument current transformers CT corresponding respectively to the first circuit wirings 551A, 551B and 551C for the respective phases of the first circuit wiring module 550 integrated therein respectively.

The second horizontal tubes 533A, 533B and 533C for the respective phases include the disconnect switches DS corresponding respectively to the second circuit wirings 561A, 561B and 561C for the respective phases of the second circuit wiring module 560 integrated therein. The second vertical tubes 531A, 531B and 531C for the respective phases include the instrument current transformers CT corresponding to the second circuit wirings 561A, 561B and 561C for the respective phases of the second circuit wiring module 560 integrated therein.

With the gas-insulated switching unit 500 according to Embodiment 3, the gas circuit breaker 511A for the phase A opens and closes the electric connection between the first circuit wiring 551A for the phase A of the first circuit wiring module 550, and the second circuit wiring 561A for the phase A of the second circuit wiring module 560. The gas circuit breaker 511B for the phase B opens and closes the electric connection between the first circuit wiring 551B for the phase B of the first circuit wiring module 550 and the second circuit wiring 561B for the phase B of the second circuit wiring module 560. Likewise, the gas circuit breaker 511C for the phase C opens and closes the electric connection between the first circuit wiring 551C for the phase C of the first circuit wiring module 550 and the second circuit wiring 561C for the phase C of the second circuit wiring module 560.

With the gas-insulated switching apparatus 500 according to Embodiment 3, the same advantages as the Embodiment 1 is obtained. In addition, in the gas-insulated switching apparatus 500 according to Embodiment 3, the second circuit wiring module 560 includes the second circuit wirings 561A, 561B and 561C respectively for the phase A, the phase B and the phase C, and the second circuit wirings 561A, 561B and 561C for the respective phases are configured with the gas-insulated buses and are connected to the gas circuit breakers 511A, 511B and 511C for the respective phases through the second vertical tubes 531A, 531B and 531C for the respective phases respectively, second circuit wirings 561A, 561B and 561C for the respective phases extend in parallel to each other along the second direction, the second circuit wirings 561A, 561B and 561C for the respective phases are positioned at respective apexes of a right angled isosceles triangle, the second circuit wirings 561A and 561B respectively for the phase A and the phase B are positioned at both ends of the short side of the right angled isosceles triangle and arranged on the third vertical plane VS3, and the second circuit wiring 561C for the phase C is arranged on the fourth vertical plane VS4. Therefore, the vertical dimension of the second circuit wiring module 560 is reduced, and hence the vertical dimension of the gas-insulated switching apparatus 500 may be reduced.

The gas-insulated switching apparatus 500 according to Embodiment 3 further includes the third vertical tubes 532A, 532B and 532C respectively for the phase A, the phase B and the phase C connected vertically to the second vertical tubes 531A, 531B and 531C respectively for the phase A, the phase B and the phase C, and the second horizontal tubes 533A, 533B and 533C respectively for the phase A, the phase B and the phase C connected to the third vertical tubes 532A, 532B and 532C for the respective phases so as to extend in the first direction, and the second circuit wiring 561A for the phase A is connected to the gas circuit breaker 511A for the phase A through the second horizontal tube 533A for the phase A, the third vertical tube 532A for the phase A, and the second vertical tube 531A for the phase A, the second circuit wiring 561B for the phase B is connected to the gas circuit breaker for the phase B through the second horizontal tube 533B for the phase B, the third vertical tube 532B for the phase B, and the second vertical tube 531B for the phase B, the second circuit wiring 561C for the phase C is connected to the gas circuit breaker for the phase C through the second horizontal tube 533C for the phase C, the third vertical tube 532C for the phase C and the second vertical tube 531C for the phase C, respectively, so that the second circuit wiring module 560 may be connected easily to the gas circuit breakers 511A, 511B and 511C for the respective phases.

With the gas-insulated switching apparatus 500 according to Embodiment 3, the connecting tube 565C for the phase C extending in the first direction is arranged over the gas circuit breaker 511C for the phase C between the circuit arrangement line L1 for arranging the first circuit wiring 551A for the phase A and the circuit arrangement line L5 for arranging the second circuit wiring 561A for the phase A so as to extend across the third vertical plane VS3, and the second circuit wiring 561C for the phase C is connected to the gas circuit breaker 511C for the phase C through the connecting tube 565C for the phase C, the second horizontal tube 533C for the phase C, the third vertical tube 532C for the phase C, and the second vertical tube 531C for the phase C. Therefore, the second circuit wiring 561C for the phase C can be connected effectively to the gas circuit breaker 511C for the phase C.

With the gas-insulated switching apparatus 500 according to Embodiment 3, the circuit arrangement line L2 for arranging the first circuit wiring 551B for the phase B, the circuit arrangement line L1 for arranging the first circuit wiring 551A for the phase A, the connecting tube 565C for the phase C, the circuit arrangement line L5 for arranging the second circuit wiring 561A for the phase A, and the circuit arrangement line L6 for arranging the second circuit wiring 561B for the phase B are arranged in sequence upward from the bottom on the third vertical plane VS3, the distance between the circuit arrangement lines L1 and L2 on the third vertical plane VS3 is $\alpha$, the distance between the circuit arrangement lines L5 and L6 on the third vertical plane VS3 is $\alpha$, and the distance $\beta$ between the circuit arrangement lines L1 and L5 on the third vertical plane is set to satisfy the relation $\alpha \leq \beta \leq 3\alpha$. Therefore, the connecting tube 565C for the phase C may be arranged efficiently using the distance between the circuit arrangement lines 11 and L5.

With the gas-insulated switching apparatus in Embodiment 3, the distance between the first vertical plane VS1 and the fourth vertical plane VS4 is $\alpha$, the distance between the third vertical plane VS3 and the fourth vertical plane VS4 is $\alpha$, and the distance between the second vertical plane VS2 and the third vertical plane VS3 is $2\alpha$. Therefore, the respective circuit wiring modules 550 and 560 may be connected efficiently to the breaker module 510 at both ends of the third vertical plane VS3.

Various changes and modification of the present invention may be made by those skills in the art without departing from the scope and spirit of the present invention, and it should be understood that the invention is not limited to the embodiments described in the present invention.

INDUSTRIAL APPLICABILITY

The gas-insulated switching apparatus according to the present invention is used as the switching apparatus for a power system.

The invention claimed is:
1. A gas-insulated switching apparatus comprising:
a breaker module having gas circuit breakers respectively for a phase A, a phase B and a phase C and being arranged with axial lines of the gas circuit breakers for the respective phases extended in parallel to each other in the first direction on a common horizontal arrangement plane;
first vertical tubes respectively for the phase A, the phase B and the phase C connected vertically to one end portions of the respective gas circuit breakers for the respective phases;
a first circuit wiring module arranged above the breaker module and including first circuit wirings respectively for the phase A, the phase B and the phase C connected to the gas circuit breakers for the respective phases through the first vertical tubes for the respective phases;
second vertical tubes respectively for the phase A, the phase B and the phase C connected vertically to the other end portions of the respective gas circuit breakers for the respective phases, and
a second circuit wiring module including second circuit wirings for the phase A, the phase B and the phase C connected respectively to the gas circuit breakers for the respective phases through the second vertical tubes for the respective phases,
the gas circuit breaker for the phase A opening and closing the electric connection between the first circuit wiring for the phase A and the second circuit wiring for the phase A, the gas circuit breaker for the phase B opening and closing the electric connection between the first circuit wiring for the phase B and the second circuit wiring for the phase B and the gas circuit breaker for the phase C opening and closing the electric connection between the first circuit wiring for the phase C and the second circuit wiring for the phase C,
wherein the first vertical tubes for the respective phases are arranged on a first vertical plane extending orthogonally to the common horizontal arrangement plane,
the second vertical tubes for the respective phases are arranged on a second vertical plane extending in parallel to the first vertical plane,
the gas circuit breakers for the respective phases of the breaker module have the reference axial lengths having the same length between the first and second vertical planes,
the first circuit wirings for the respective phases of the first circuit wiring module are configured with gas-insulated buses extending in parallel to each other along the second direction which is orthogonal to the first direction,
the first circuit wirings for the respective phases are positioned at the respective apexes of a right angled isosceles triangle,
the first circuit wirings respectively for the phase A and the phase B are positioned at both ends of the short side of the right angled isosceles triangle and arranged on a third vertical plane extending between the first vertical plane and the second vertical plane in parallel thereto, and
the first circuit wiring for the phase C is arranged on a fourth vertical plane extending between the first vertical plane and the third vertical plane in parallel thereto.
2. The gas-insulated switching apparatus according to claim 1, wherein the third vertical plane is set to pass through midpoints of the reference axial lengths of the gas circuit breakers for the respective phases.

3. The gas-insulated switching apparatus according to claim 1, wherein the gas circuit breakers for the respective phases each include a pair of breaking open-close switches, and the respective breaking open-close switches are arranged along the axial lines of the gas circuit breakers for the respective phases.

4. The gas-insulated switching apparatus according to claim 1, further comprising a third circuit wiring module arranged above the first circuit wiring module,
wherein the third circuit wiring module includes a third circuit wirings respectively for the phase A, the phase B and the phase C, the third circuit wirings for the respective phases are configured with the gas-insulated buses, and connected to the gas circuit breakers for the respective phases through the first vertical tubes for the respective phases, and
the third circuit wirings for the respective phases extend along the second direction in parallel to each other, the third circuit wirings for the respective phases are positioned at respective apexes of a right angled isosceles triangle, the third circuit wirings respectively for the phase A and the phase B are positioned at both ends of the short side of the right angled isosceles triangle and arranged on the third vertical plane, and the third circuit wiring for the phase C is arranged on the fourth vertical plane.

5. The gas-insulated switching apparatus according to claim 1, wherein first current transformers respectively for the phase A, the phase B and the phase C are arranged respectively in the first vertical tubes for the respective phases and second current transformers respectively for the phase A, the phase B and the phase C are arranged respectively in the second vertical tubes for the respective phases.

6. The gas-insulated switching apparatus according to claim 1, wherein horizontal tubes respectively for the phase A, the phase B and the phase C connected horizontally to the upper end portions of the first vertical tubes for the respective phases are provided, the first circuit wirings for the respective phases are connected to the gas circuit breakers for the respective phases through the horizontal tubes for the respective phases and the first vertical tubes for the respective phases.

7. The gas-insulated switching apparatus according to claim 6, wherein disconnect switches respectively for the phase A, the phase B and the phase C are arranged respectively in the horizontal tubes for the respective phases.

8. The gas-insulated switching apparatus according to claim 1, wherein the first vertical tubes for the respective phases have the same vertical length, the second vertical tubes for the respective phases have the same vertical length and, in addition, the vertical lengths of the first vertical tubes for the respective phases and the vertical lengths of the second vertical tubes for the respective phases are equal.

9. The gas-insulated switching apparatus according to claim 1, wherein the first circuit wiring for the phase A extends above the gas circuit breaker for the phase A on the third vertical plane,
the first circuit wiring for the phase B extends above the respective gas circuit breakers for the phase A and the phase B on the third vertical plane,
the first circuit wiring for the phase C extends above the respective gas circuit breakers of the phase A, the phase B and the phase C on the fourth vertical plane,
the second circuit wirings respectively for the phase A, the phase B and the phase C of the second circuit wiring module are configured with the gas-insulated buses respectively,
the second circuit wiring for the phase A is arranged in parallel with the first circuit wiring for the phase A on the third vertical plane and extends above the gas circuit breakers respectively for the phase A, the phase B and the phase C,
the second circuit wiring for the phase B is arranged coaxially with the first circuit wiring for the phase A on the third vertical plane and extends above the gas circuit breakers for the phase B and the phase C, and
the second circuit wiring for the phase C is arranged coaxially with the first circuit wiring for the phase B on the third vertical plane and extends above the gas circuit breaker for the phase C.

10. The gas-insulated switching apparatus according to claim 9, further comprising third vertical tubes respectively for the phase A, the phase B and the phase C connected vertically to the second vertical tubes respectively for the phase A, the phase B and the phase C, and horizontal tubes respectively for the phase A, the phase B and the phase C connected to the third vertical tubes for the respective phases so as to extend in the first direction,
wherein the second circuit wiring for the phase A is connected to the gas circuit breaker for the phase A through the horizontal tube for the phase A, the third vertical tube for the phase A, and the second vertical tube for the phase A, the second circuit wiring for the phase B is connected to the gas circuit breaker for the phase B through the horizontal tube for the phase B, the third vertical tube for the phase B, and the second vertical tube for the phase B, the second circuit wiring for the phase C is connected to the gas circuit breaker for the phase C through the horizontal tube for the phase C, the third vertical tube for the phase C and the second vertical tube for the phase C, respectively.

11. The gas-insulated switching apparatus according to claim 10, further comprising a second breaker module including second gas circuit breakers respectively for the phase A, the phase B and the phase C and being arranged with the axial lines for the second gas circuit breakers for the respective phases extended in parallel to each other in the first direction on the common horizontal arrangement plane;
fourth vertical tubes respectively for the phase A, the phase B and the phase C connected vertically and respectively to one end portions of the second gas circuit breakers for the respective phases,
a third circuit wiring module including third circuit wirings respectively for the phase A, the phase B and the phase C arranged above the second breaker module and connected respectively to the second gas circuit breakers for the respective phases through the fourth vertical tubes for the respective phases,
fifth vertical tubes respectively for the phase A, the phase B and the phase C connected vertically and respectively to the other end portions of the second gas circuit breakers for the respective phases and
a fourth circuit wiring module including fourth circuit wirings for the phase A, the phase B, and the phase C connected respectively to the second gas circuit breakers for the respective phases through the fifth vertical tubes for the respective phases, and
the second gas circuit breaker for the phase A opening and closing the electrical connection between the third circuit wiring for the phase A and the fourth circuit wiring for the phase A, the second gas circuit breaker for the phase B opening and closing the electric connection between the third circuit wiring for the phase B and the fourth circuit wiring for the phase B, and the second gas circuit breaker for the phase C opening and closing the electric connection between the third circuit wiring for the phase C and the fourth circuit wiring for the phase C respectively, wherein the fourth vertical tubes for the respective phases are arranged on the first vertical plane, the fifth vertical tubes for the respective phases are arranged on the second vertical plane, the gas circuit breakers for the respective phases of the second breaker module have the reference axial lengths having the same length between the first and second vertical planes, and the third circuit wirings for the respective phases of the third circuit wiring module are configured with the gas-insulated buses respectively and extend in parallel to each other along the second direction, the third circuit wirings for the respective phases are positioned at respective apexes of the right angled isosceles triangle, the third circuit wirings respectively for the phase A and the phase B are positioned at both ends of the short side of the right angled isosceles triangle and arranged on the third vertical plane, and the third circuit wiring for the phase C is arranged on the fourth vertical plane.

12. The gas-insulated switching apparatus according to claim 11, wherein the third circuit wiring for the phase A extends above the second gas circuit breaker for the phase A on the third vertical plane, the third circuit wiring for the phase B extends above the respective second gas circuit breakers for the phase A and the phase B on the third vertical plane, the third circuit wiring for the phase C extends above the respective gas circuit breakers for the phase A, the phase B and the phase C on the fourth vertical plane, the fourth circuit wirings respectively for the phase A, the phase B and the phase C are configured with the gas-insulated buses respectively, the fourth circuit wiring for the phase A is arranged in parallel with the third circuit wiring for the phase A on the third vertical plane and extends above the second gas circuit breakers for the phase A, the phase B and the phase C, the fourth circuit wiring for the phase B is arranged on the third vertical plane coaxially with the third circuit wiring for the phase A and extends above the second gas circuit breakers for the phase B and the phase C, and the fourth circuit wiring for the phase C is arranged on the third vertical plane coaxially with the third circuit wiring for the phase B, and extends above the second gas circuit breaker for the phase C.

13. The gas-insulated switching apparatus according to claim 12, wherein the first circuit wiring for the phase B, the first circuit wiring for the phase A, the second circuit wiring for the phase A, the third circuit wiring for the phase A, and the third circuit wiring for the phase B are arranged above the gas circuit breaker for the phase A in sequence upward from the bottom on the third vertical plane, the distance between the first circuit wirings for the phase A and the phase B on the third vertical plane is $\alpha$, the distance between the respective third circuit wirings for the phase A and the phase B on the third vertical plane is $\alpha$, and the distance $\beta$ between the first circuit wiring for the phase A and the third circuit wiring for the phase A on the third vertical plane is set to satisfy the relation $2\alpha \leq \beta \leq 3\alpha$.

14. The gas-insulated switching apparatus according to claim 13, wherein the distance between the first vertical plane and the fourth vertical plane is $\alpha$, the distance between the third vertical plane and the fourth vertical plane is $\alpha$, and the distance between the second vertical plane and the third vertical plane is $2\alpha$.

15. The gas-insulated switching apparatus according to claim 1, wherein the second circuit wiring module includes the second circuit wirings respectively for the phase A, the phase B and the phase C, and the second circuit wirings for the respective phases are configured with the gas-insulated buses and are connected to the gas circuit breakers for the respective phases through the second vertical tubes for the respective phases, wherein the second circuit wirings for the respective phases extend in parallel to each other along the second direction, the second circuit wirings for the respective phases are positioned at the respective apexes of a right angled isosceles triangle, the second circuit wirings respectively for the phase A and the phase B are positioned at both ends of the short side of the right angled isosceles triangle and arranged on the third vertical plane, and the second circuit wiring for the phase C is arranged on the fourth vertical plane.

16. The gas-insulated switching apparatus according to claim 15, further comprising third vertical tubes respectively for the phase A, the phase B and the phase C connected vertically to the second vertical tubes respectively for the phase A, the phase B and the phase C, and horizontal tubes respectively for the phase A, the phase B and the phase C connected to the third vertical tubes for the respective phases so as to extend in the first direction, and the second circuit wiring for the phase A is connected to the gas circuit breaker for the phase A through the horizontal tube for the phase A, the third vertical tube for the phase A, and the second vertical tube for the phase A, the second circuit wiring for the phase B is connected to the gas circuit breaker for the phase B through the horizontal tube for the phase B, the third vertical tube for the phase B, and the second vertical tube for the phase B, the second circuit wiring for the phase C is connected to the gas circuit breaker for the phase C through the horizontal tube for the phase C, the third vertical tube for the phase C and the second vertical tube for the phase C, respectively.

17. The gas-insulated switching apparatus according to claim 16, wherein a connecting tube for the phase C extending in the first direction is arranged between a circuit arrangement line for arranging the first circuit wiring for the phase A and the circuit arrangement line for arranging the second circuit wiring for the phase A so as to extend across the third vertical plane above the gas circuit breaker for the phase C, and the second circuit wiring for the phase C is connected to the gas circuit breaker for the phase C through the connecting tube for the phase C, the horizontal tube for the phase C, the third vertical tube for the phase C, and the second vertical tube for the phase C.

18. The gas-insulated switching apparatus according to claim 17, wherein a circuit arrangement line for arranging the first circuit wiring for the phase B, the circuit arrangement line for arranging the first circuit wiring for the phase A, the connecting tube for the phase C, the circuit arrangement line for arranging the second circuit wiring for the phase A, and a circuit arrangement line for arranging the second circuit wiring for the phase B are arranged in sequence upward from the bottom on the third vertical plane, the distance between the circuit arrangement line for arranging the first circuit wiring for the phase A and the circuit arrangement line for arranging the first circuit wiring for the phase B is $\alpha$, the distance between the circuit arrangement line for arranging the second circuit wiring for the phase A and the circuit arrangement line for arranging the second circuit wiring for the phase B is $\alpha$, and the distance $\beta$ between the circuit arrangement line for arranging the first circuit wiring for the phase A and the circuit arrangement line for arranging the second circuit wiring for the phase A is set to satisfy the relation $2\alpha \leq \beta \leq 3\alpha$.

19. The gas-insulated switching apparatus according to claim 18, wherein the distance between the first vertical plane and the fourth vertical plane is $\alpha$, the distance between the third vertical plane and the fourth vertical plane is $\alpha$, and the distance between the second vertical plane and the third vertical plane is $2\alpha$.

* * * * *